US010723858B2

(12) United States Patent
Yao et al.

(10) Patent No.: US 10,723,858 B2
(45) Date of Patent: Jul. 28, 2020

(54) METHOD FOR PURIFICATION OF DEPOLYMERIZED POLYMERS USING SUPERCRITICAL FLUID EXTRACTION

(71) Applicant: GreenMantra Recycling Technologies Ltd., Brantford (CA)

(72) Inventors: Yuxiang Yao, Calgary (CA); Irene Fenton, Brantford (CA); Domenic Di Mondo, Brantford (CA); Gisele Azimi, Toronto (CA)

(73) Assignee: GreenMantra Recycling Technologies Ltd., Brantford (CA)

( * ) Notice: Subject to any disclaimer, the term of this patent is extended or adjusted under 35 U.S.C. 154(b) by 30 days.

(21) Appl. No.: 16/134,080

(22) Filed: Sep. 18, 2018

(65) Prior Publication Data

US 2020/0087479 A1  Mar. 19, 2020

(51) Int. Cl.
*C08G 81/00* (2006.01)
*C08J 9/36* (2006.01)

(52) U.S. Cl.
CPC ............. *C08J 9/36* (2013.01); *C08J 2323/06* (2013.01); *C08J 2323/12* (2013.01); *C08J 2325/06* (2013.01)

(58) Field of Classification Search
USPC ....................................................... 525/389
See application file for complete search history.

(56) References Cited

U.S. PATENT DOCUMENTS

| | | |
|---|---|---|
| 3,143,536 A | 8/1964 | Guzzetta et al. |
| 3,332,926 A | 7/1967 | Baron et al. |
| 3,345,352 A | 10/1967 | Baron et al. |
| 3,424,822 A | 1/1969 | Liston |
| 3,441,628 A | 4/1969 | Raetzsch et al. |
| 3,852,046 A | 12/1974 | Brown |
| 3,927,693 A | 12/1975 | Johnston |
| 4,053,141 A | 10/1977 | Gussefeld |
| 4,105,806 A | 8/1978 | Watt |
| 4,136,251 A | 1/1979 | Bice et al. |
| 4,208,252 A | 6/1980 | Yoshida et al. |
| 4,642,401 A | 2/1987 | Coenen et al. |
| 4,844,351 A | 7/1989 | Holloway |
| 4,847,209 A | 7/1989 | Lewis et al. |
| 4,902,780 A | 2/1990 | Bourrain et al. |
| 5,009,746 A | 4/1991 | Hossain et al. |
| 5,133,913 A | 7/1992 | Miyakawa et al. |
| 5,158,982 A | 10/1992 | Stapp |
| 5,169,588 A | 12/1992 | Estepp |
| 5,237,048 A | 8/1993 | Miyakawa |
| 5,238,633 A | 8/1993 | Jameson |
| 5,314,741 A | 5/1994 | Roberts et al. |
| 5,315,055 A | 5/1994 | Butcher et al. |
| 5,354,930 A | 10/1994 | Atkins et al. |
| 5,369,215 A | 11/1994 | Platz |
| 5,386,055 A | 1/1995 | Lee et al. |
| 5,422,051 A | 6/1995 | Sawyers |
| 5,481,052 A | 1/1996 | Hardman et al. |
| 5,502,263 A | 3/1996 | Ponsford et al. |
| 5,656,757 A | 8/1997 | Jenczewski et al. |
| 5,672,794 A | 9/1997 | Northemann |
| 5,728,909 A | 3/1998 | Butcher, Jr. |
| 5,731,483 A | 3/1998 | Stabel et al. |
| 5,753,086 A | 5/1998 | Guffey et al. |
| 5,821,395 A | 10/1998 | Price et al. |
| 5,824,709 A | 10/1998 | Suka |
| 5,849,964 A | 12/1998 | Holighaus et al. |
| 5,951,940 A | 9/1999 | Nosker et al. |
| 6,143,940 A | 11/2000 | Miller et al. |
| 6,150,577 A | 11/2000 | Miller et al. |
| 6,172,271 B1 | 1/2001 | Horizoe et al. |
| 6,172,275 B1 | 1/2001 | Tadauchi et al. |

(Continued)

FOREIGN PATENT DOCUMENTS

| CA | 2098778 A1 | 12/1993 |
|---|---|---|
| CA | 2202941 A1 | 10/1998 |

(Continued)

OTHER PUBLICATIONS

Gergo, P. et al. "Rheological Investigation of Rubber Bitumen Containing Various Waxes as Warm Mix Additive" Studia UBB Chemia LXII, 2 Tom II, 2017 p. 247-257.
International Search Report and Written Opinion dated Jul. 4, 2019 in connection with International Application No. PCT/CA2019/000046.
International Search Report and Written Opinion dated Jul. 12, 2019 in connection with International Application No. PCT/CA2019/050762.
International Search Report and Written Opinion dated Jul. 26, 2019 in connection with International Application No. PCT/CA2019/050761.
European Search Report dated Apr. 4, 2011 in connection with European Patent Application No. 10172039.
Extended European Search Report dated Apr. 15, 2011 in connection with European Patent Application No. 10172039.9-2104.
International Search Report and Written Opinion dated Jan. 5, 2012 in connection with International Patent Application No. PCTIB2011001642.

(Continued)

*Primary Examiner* — Terressa Boykin
(74) *Attorney, Agent, or Firm* — Cook Alex, Ltd.; Ryan M. Truesdale

(57) ABSTRACT

A method for purifying polymers made from depolymerization of plastic can include selecting a polymer for purification, adding the polymer to a reaction vessel with a solvent, heating the mixture to promote migration of contaminants from the polymer to the solvent, performing an extraction technique to remove contaminants, depressurizing the reaction vessel to isolate a purified polymer, and allowing the purified polymer to cool. In some embodiments, the polymer is a polyethylene polymer. In other embodiments, the polymer is a polypropylene polymer. In some embodiments, the polymer is a polystyrene polymer. In some embodiments, the extraction technique is supercritical fluid extraction using supercritical $CO_2$ as a solvent. Parameters including temperature, pressure, duration, agitation rate, starting solvent volume, and co-solvent addition for supercritical fluid extraction can be selected based on the properties of the polymer to be purified. The method can remove contaminating organic and inorganic compounds from the polymers.

20 Claims, 49 Drawing Sheets

(56) References Cited

U.S. PATENT DOCUMENTS

| | | | |
|---|---|---|---|
| 6,184,427 | B1 | 2/2001 | Klepfer et al. |
| 6,274,637 | B1 | 8/2001 | Schallenberg |
| 6,288,296 | B1 | 11/2001 | Miller et al. |
| 6,369,192 | B1 | 4/2002 | Dufresne et al. |
| 6,822,126 | B2 | 11/2004 | Miller et al. |
| 6,861,568 | B1 | 3/2005 | Guffey et al. |
| 7,470,767 | B2 | 12/2008 | Deorkar et al. |
| 7,834,226 | B2 | 11/2010 | Miller |
| 7,893,307 | B2 | 2/2011 | Smith |
| 7,923,506 | B2 | 4/2011 | Cohoon et al. |
| 8,168,839 | B2 | 5/2012 | Niu |
| 8,664,458 | B2 | 3/2014 | Kumar et al. |
| 9,200,130 | B2 | 12/2015 | D'Amato et al. |
| 10,000,715 | B2 | 6/2018 | Kumar et al. |
| 2003/0003554 | A1 | 1/2003 | Miller et al. |
| 2003/0199718 | A1 | 10/2003 | Miller |
| 2005/0148487 | A1 | 7/2005 | Brownscombe et al. |
| 2007/0263060 | A1 | 11/2007 | Laksin et al. |
| 2010/0227954 | A1 | 9/2010 | Naidoo et al. |
| 2010/0233408 | A1 | 9/2010 | Zickell et al. |
| 2011/0195256 | A1 | 8/2011 | Morikawa et al. |
| 2012/0016169 | A1 | 1/2012 | Kumar et al. |
| 2012/0304879 | A1 | 12/2012 | Tiessen et al. |
| 2012/0310023 | A1 | 12/2012 | Huang et al. |
| 2013/0303810 | A1 | 11/2013 | Handerek |
| 2014/0046102 | A1 | 2/2014 | D'Amato et al. |
| 2014/0182194 | A1 | 7/2014 | Unger et al. |
| 2014/0299017 | A1 | 10/2014 | Parvez et al. |
| 2015/0210611 | A1 | 7/2015 | Tippet et al. |
| 2015/0247096 | A1 | 9/2015 | Barger et al. |
| 2015/0361374 | A1 | 12/2015 | Kumar et al. |
| 2016/0024390 | A1 | 1/2016 | Ullom |
| 2016/0040074 | A1 | 2/2016 | Methling |
| 2019/0119191 | A1 | 4/2019 | Streiff et al. |

FOREIGN PATENT DOCUMENTS

| | | |
|---|---|---|
| CA | 2805570 A1 | 1/2012 |
| CA | 2822678 A1 | 2/2014 |
| CA | 2898257 A1 | 7/2014 |
| CA | 2885144 A1 | 9/2015 |
| CA | 2890874 A1 | 11/2015 |
| CA | 2822678 C | 5/2017 |
| CH | 646717 A5 | 12/1984 |
| CN | 1120347 A | 4/1996 |
| CN | 101434821 B | 5/2009 |
| CN | 103168016 A | 4/2015 |
| CN | 104877699 A | 9/2015 |
| CN | 107629565 A | 1/2018 |
| CN | 107629565 A | 1/2018 |
| DE | 1570194 A1 | 8/1969 |
| DE | 3642273 A1 | 4/1987 |
| DE | 19500425 C1 | 4/1996 |
| DE | 69323125 T2 | 8/1999 |
| DE | 10037229 A1 | 2/2000 |
| DE | 10022666 A1 | 11/2001 |
| EP | 0577279 A1 | 1/1994 |
| EP | 0717094 A1 | 6/1996 |
| EP | 0577279 B1 | 1/1999 |
| EP | 1707614 A1 | 10/2006 |
| EP | 2161299 A1 | 3/2010 |
| GB | 569043 | 5/1945 |
| GB | 569043 A | 5/1945 |
| GB | 1310260 A | 3/1973 |
| GB | 1563440 A | 3/1980 |
| GB | 2223022 A | 3/1990 |
| JP | H0457887 A | 2/1992 |
| JP | H05085964 A | 4/1993 |
| JP | H06179877 A | 6/1994 |
| JP | H08508520 A | 9/1996 |
| JP | H08253601 A | 10/1996 |
| JP | H122000512209 A | 9/2000 |
| JP | H142002167466 A | 6/2002 |
| JP | H142002224652 A | 8/2002 |
| JP | H142002256103 A | 9/2002 |
| JP | H162004131675 A | 4/2004 |
| JP | H172005170986 A | 6/2005 |
| JP | H172005200573 A | 7/2005 |
| JP | H172005527672 A | 9/2005 |
| JP | H182006056957 A | 3/2006 |
| JP | H182006143802 A | 6/2006 |
| JP | H192007529574 A | 10/2007 |
| WO | WO2000027942 A1 | 5/2000 |
| WO | WO 2000027942 A1 | 5/2000 |
| WO | WO 2005092963 A1 | 10/2005 |
| WO | WO2005092963 A1 | 10/2005 |
| WO | 2010099963 A1 | 9/2010 |
| WO | WO 2010099963 A1 | 9/2010 |
| WO | WO 2012007833 A2 | 7/2011 |
| WO | WO2012007833 A2 | 7/2011 |
| WO | WO 2012007833 A2 | 1/2012 |
| WO | 2014110644 A1 | 7/2014 |
| WO | WO 2014110644 A1 | 7/2014 |
| WO | 201461767 A2 | 10/2014 |
| WO | WO 2014161767 A2 | 10/2014 |
| WO | 2015130545 A1 | 9/2015 |
| WO | WO 2015130545 A1 | 9/2015 |
| WO | 2015164331 A1 | 10/2015 |
| WO | WO 2015164331 A1 | 10/2015 |
| WO | 2017113020 A1 | 7/2017 |
| WO | WO 2017113020 A1 | 7/2017 |
| WO | 2017136957 A1 | 8/2017 |
| WO | 2017139333 A1 | 8/2017 |
| WO | WO 2017136957 A1 | 8/2017 |
| WO | WO 2017139333 A1 | 8/2017 |
| WO | 2017161463 A1 | 9/2017 |
| WO | WO 2017161463 A1 | 9/2017 |
| WO | WO 2018058257 A1 | 4/2018 |
| WO | WO2018058257 A1 | 4/2018 |

OTHER PUBLICATIONS

International Preliminary Report on Patentability dated Aug. 1, 2012, in connection with International Application No. PCTIB2011001642.

International Search Report and Written Opinion dated Sep. 20, 2013 in connection with International Application No. PCTCA2013000041.

Office Action dated Apr. 4, 2014 in connection with Chinese Application No. 201180034887.0.

Office Action dated Jun. 16, 2015 in connection with Japanese Application No. 2013-519172.

International Preliminary Report on Patentability dated Jul. 21, 2015 in connection with International Application PCTCA2013000041.

Office Action dated Oct. 15, 2015 in connection with Malaysian Patent Application No. 2013000128.

Office Action dated Feb. 29, 2016 in connection with Chinese Application No. 201510126290.9.

Office Action dated Oct. 5, 2016 in connection with Canadian Application No. 2805570.

Office Action dated Oct. 6, 2016 in connection with Canadian Application No. 2898257.

International Search Report and Written Opinion dated Mar. 17, 2017 in connection with International PCTCA2016051555.

International Search Report and Written Opinion dated May 2, 2017 in connection with PCT/CA2017/050172.

International Search Report and Written Opinion dated Jul. 25, 2017 in connection with International Application No. PCT/CA2017/050378.

Office Action dated Nov. 30, 2017 in connection with Indian Application No. 316/KOLNP/2013.

International Search Report & Written Opinion dated Dec. 15, 2017 in connection with International Application No. PCT/CA2017/051166.

International Preliminary Report on Patentability dated Jul. 12, 2018 in connection with International Application No. PCT/CA2016/051555.

International Preliminary Report on Patentability dated Aug. 23, 2018 in connection with PCT/CA2017/050172.

International Preliminary Report on Patentability dated Oct. 4, 2018 in connection with International Application No. PCT/CA2017/050378.

(56) References Cited

OTHER PUBLICATIONS

International Search Report and Written Opinion dated Nov. 16, 2018 in connection with PCT/CA2018/051058.
International Search Report and Written Opinion dated Feb. 5, 2019 in connection with International application No. PCT/CA2018/051517.
Klesper, Chromatography with Supercritical Fluids. Angew. Chemie Int. Ed. English, 1978, vol. 17(10), pp. 738-746.
Yilgor et al., Novel Supercritical Fluid Techniques for Polymer Fractionation and Purification. Polym. Bull. 1987, vol. 29(3), pp. 119-126.
Yu, Peroxide modified polyolefin blends Part 1: Effects on LDPE/PP blends with components with similar initial viscosities, Adv. Polymer Tech., 1990, vol. 10(3), pp. 163-172.
McHugh et al., Supercritical fluid extraction : principles and practice; Butterworth-Heinemann: Boston, 1994.
Teh, A Review of polyethylene-polypropylene blend and their compatibilization, Adv. Polymer Tech., 1994, vol. 13(1), pp. 1-23.
Yang et al., Combined Temperature/Modifier Effects on Supercritical $CO_2$ Extraction Efficiencies of Polycyclic Aromatic Hydrocarbons from Environmental Samples. Anal. Chem. 1995, vol. 67(3), pp. 641-646.
Eckert et al., Supercritical fluids as solvents for chemical and materials processing. Nature, 1996, pp. 313-318.
Murty et al., Thermal Degradation Hydrogenation of Commodity Plastics and Characterization of their Liquefaction Products, Fuel Processing Technology, Oct.-Dec. 1996, vol. 49, Issues 1-3, pp. 75-90.
Rindfleisch et al., Solubility of Polymers and Copolymers in Supercritical $CO_2$. J. Phys. Chem. 1996, vol. 100(36), pp. 15581-15587.
Ding et al., Thermal and catalytic degradation of high density polyethylene and commingled post-consumer plastic waste, Fuel Processing Technology, Mar. 1997, vol. 51, Issues 1-2, pp. 47-62.
Dinoia et al., Solubility and phase behavior of PEP binders in supercritical carbon dioxide. Waste Manag. 1997, vol. 17(2-3), pp. 151-158.
Taylor et al., Hydrogen Bonding of Methanol in Supercritical $CO_2$ Studied by 13C Nuclear Spin-Lattice Relaxation. J. Phys. Chem. B 1997, vol. 101(96), pp. 5652-5658.
Uddin et al., Catalytic Degradation of Polyethylene and Polypropylene into Liquid Hydrocarbons with Mesoporous Silica, Microporous and Mesoporous Materials, May 1998, vol. 21, Issues 4-6, pp. 557-564.
Buekens et al., Catalytic plastics cracking for recovery of gasoline-range hydrocarbons from municipal plastic wastes, Resources, Conservation and Recycling, Aug. 1998, vol. 23, Issue 3, pp. 163-181.
Bartczak et al., Toughness mechanism in semi-crystalline polymer blends: II. High-density polyethylene toughened with calcium carbonate filler particles. Polymer (Guildf), 1999, vol. 40(9), pp. 2331-2346.
Kartalis et al., Recycling of post-used PE packaging film using the restabilization technique, Polymer Degradation and Stability, 2000, vol. 70(2), pp. 189-197.
Baysal et al., Supercritical $CO_2$ extraction of β-carotene and arlycopene from tomato paste waste. J. Agric. Food Chem., 2000, vol. 48(11), pp. 5507-5511.
Luo et al., Catalytic degradation of high density polyethylene and polypropylene into liquid fuel in a power-particle fluidized bed, Polymer Degradation and Stability, online, 2000, vol. 70(1), pp. 97-102.
Cooper, Polymer synthesis and processing using supercritical carbon dioxide. J. Mater. Chem. 2000, vol. 10, pp. 207-234.
Erkey, Supercritical carbon dioxide extraction of metals from aqueous solutions: a review. J. Supercrit. Fluids, 2000, vol. 17(3), pp. 259-287.
Predel, Pyrolysis of mixed polyolefins in a fluidised-bed reactor and on a pyro-GCMS to yield aliphatic waxes, Polymer Degradation and Stability, 2000, vol. 70(3), pp. 373-385.

Vargas et al., Conformational Analysis of N, N, N', N-Tetramethylsuccinamide : The Role of C—H—O Hydrogen Bonds. Society 2000, pp. 5115-5121.
You et al., Liquid-phase catalytic degradation of polyethylene wax over silica modified zeolite catalysts, Polymer Degradation and Stability, 2001, vol. 265(2), pp. 329-336.
Drohmann et al., Phase behavior of polymers containing ether groups in carbon dioxide. J. Supercrit. Fluids 2002, vol. 22(2), pp. 103-110.
Raveendran et al., Cooperative C—H•••O hydrogen bonding in $CO_2$-Lewis base complexes: Implications for solvation in supercritical $CO_2$. J. Am. Chem. Soc. 2002, vol. 124(42), pp. 12590-12599.
Seo et al., Investigation of Catalytic degradation of HDPE by hydrocarbon group type analysis, Journal of Analytical and Applied Pyrolysis, 2003, vol. 70, Issue 2, pp. 97-102.
Stubbs et al., Binary phase behavior and aggregation of dilute methanol in supercritical carbon dioxide: a Monte Carlo simulation study. J. Chem. Phys. 2004, vol. 121(3), pp. 1525-1534.
Rosa et al., Processing and thermal, mechanical and morphological characterization of post-consumer polyolefins/thermoplastic starch blends, J. of Mat. Sci., 2007, vol. 42(2), pp. 551-557.
Molnár et al., Resolution of racemic trans-1,2-cyclohexanediol with tartaric acid. Tetrahedron Asymmetry 2008, vol. 19(13), pp. 1587-1592.
Requena et al., "Encapsulation of Leu-Enkephalin in core-shell isobutylcyanoacrylate-thiolated chitosan nanoparticles for oral administration", J. Chilean Chem. Soc., 2008, vol. 53(4), pp. 1677-1681.
Abd El-Aty et al., Approaches for application of sub and supercritical fluid extraction for quantification of orbifloxacin from plasma and milk: Application to disposition kinetics. Anal. Chim. Acta 2009, vol. 631(1), pp. 108-115.
Al-Salem et al., S. Recycling and recovery routes of plastic solid waste (PSW): A review. Waste Manag. 2009, vol. 29(10), pp. 2625-2643.
Aro et al., Isolation and purification of egg yolk phospholipids using liquid extraction and pilot-scale supercritical fluid techniques. Eur. Food Res. Technol., 2009, vol. 228(6), pp. 857-863.
Garcia et al., Recycling extruded polystyrene by dissolution with suitable solvents, J. of Mat. Cycles and Waste Management, 2009, vol. 11(1), pp. 2-5.
Ghoreishi et al., Experimental and modeling investigation of supercritical extraction of mannitol from Olive leaves. Chem. Eng. Technol., 2009, vol. 32(1), pp. 45-54.
Aboulkas, Thermal degradation behaviors of polyethylene and polypropylene. Part 1: pyroloysis kinetics and mechanisms, Energy Conversion and Management, 2010, vol. 51, pp. 1363-1369.
Herrero et al., Supercritical fluid extraction: Recent advances and applications. J. Chromatogr. A 2010, vol. 1217(16), pp. 2495-2511.
Arabiourrutia, Characterization of the waxes obtained by the pyrolysis of polyolefin plastics in a conical spouted bed reactor, Journal of Analytical and Applied Pyrolysis, 2012, vol. 94, pp. 230-237.
Cismondi et al., Phase Equilibria of $CO_2$ + n-Alkane Binary Systems in Wide Ranges of Conditions: Development of Predictive Correlations Based on Cubic Mixing Rules. Ind. Eng. Chem. Res. 2012, vol. 51(17), pp. 6232-6250.
Xanthos, Recycling of the #5 polymer, Science, 2012, vol. 337, pp. 700-702.
Rochman et al., Policy: Classify plastic waste as hazardous. Nature, 2013, vol. 494(7436), pp. 169-170.
Gensler et al., Mechanical stability of bivalent transition metal complexes analyzed by single-molecule force spectroscopy. Beilstein J. Org. Chem. 2015, vol. 11, pp. 817-827.
Jambeck et al., Plastic waste inputs from land into the ocean. Sicence, Jan. 2015, vol. 347, pp. 768-770.
Kaitz et al., "Depolymerizable polymers: preparation, applications, and future outlook", MRS Comm., 2015, vol. 5, pp. 191-204.
Krendlinger et al., Waxes. In Ullmann's Encyclopedia of Industrial Chemistry; Wiley-VCH, 2015, pp. 2-46.
Farahanchi et al., Effects of ultrahigh speed twin screw extrusion on the thermal and mechanical degradation of polystyrene, Polymer Engineering, 2016, vol. 6(7), pp. 743-751.
Gürses et al., Dyes and Pigments; Sharma, S. K., Ed.; 2016.

(56) References Cited

OTHER PUBLICATIONS

Ding et al., Supercritical Fluid Extraction of Metal Chelate: A Review. Crit. Rev. Anal. Chem. 2017, vol. 47(2), pp. 99-118.
Yao et al., Supercritical Fluid Extraction of Rare Earth Elements from Nickel Metal Hydride Battery. ACS Sustain. Chem. Eng. 2018, vol. 6, pp. 1417-1426.
Office Action dated on Nov. 30, 2017 in connection with Indian Application No. 316/KOLNP/2013.
International Preliminary Report on Patentability dated Apr. 11, 2019 in connection with International Application No. PCT/CA2017/051166.
Examination Report No. 1 dated May 1, 2019 in connection with Australian application No. 2018204945.
Bartczak et al., Toughness mechanism in semi-crystalline polymer blends: II. High-density polyethylene toughened with calcium carbonate tiller particles. Polymer (Guildf), 1999, vol. 40(9), pp. 2331-2346.
Abd El-Aty et al., Approaches for application of sub and supercritical fluid extraction for quantification of orbifloxacin from plasma and milk: Application to disposition kinetics. Anal. Chim. Ada 2009, vol. 631(1), pp. 108-115.
Tordella et al., "Isomorphic Interactions of Ethylenic Polymers and Paraffin Wax", J. of Polymer Science, vol. 8, 1970, pp. 81-87.
Mpanza et al., "Influence of Different Waxes on the Physical Properties of Linear Low-density Polyethylene", South Africa J. of Chem., vol. 59, 2006, pp. 48-54.
Shang et al., "Pyrolyzed Wax from Recycled Cross-Linked Polyethylene as Warm Mix Asphalt (WMA) Additive for SBS Modified Asphalt", Construction and Building Materials, vol. 25, 2011, pp. 886-891.
"SCRA Spinout Case Study—Recycling Technologies", Sep. 2015, pp. 1-3, Retrieved from the Internet: https://warwick.ac.uk/fac/crossfac/sciencecity/casestudies/recycling-tecnnologies/ [retrieved on Aug. 22, 2019].
"Changing the Story of Waste Plastic (Crowdcube presentation)", Feb. 2018, Retrieved from the Internet: https://hkstartupresources.com/wp-content/uploads/2018/02/recycling-technologies-ltd-business-plan.pdf [retrieved on Aug. 22, 2019].
Extended European Search Report dated Aug. 23, 2019 issued in connection with European application No. 16880228.8.
Extended European Search Report dated Sep. 4, 2019 issued in connection with European application No. 17769226.6.
Notice of Acceptance issued in connection with Australian application No. 2018204945 dated Sep. 6, 2019.
Extended European Search Report dated Oct. 7, 2019 in connection with European Patent Application No. 17749885.4.
Office Action dated Jan. 13, 2020 in connection with Brazilian App. No. 11 2013 001058 4.
Canadian Office Action dated Jan. 24, 2020 issued in connection with Canadian App. No. 2898257.
Examination Report No. 1 dated Feb. 26, 2020 in connection with Australian App. No. 2017239181.
Lai et al., Depolymerization of HDPE to wax in the presence of a catalyst formed by homonuclear macrocyclic zirconium complex chemically bonded to alumina support, Journal of Molecular Applied Catalysis A: General, 2006, vol. 303 (1), pp. 9-17.
Urbaniak et al. "Waxes—Products of Thermal Degradation of Waste Plastics—Obtaining, Capabilities, and Application", Archives of Waste Management and Environmental Protection, vol. 6, 2007, pp. 71-78.

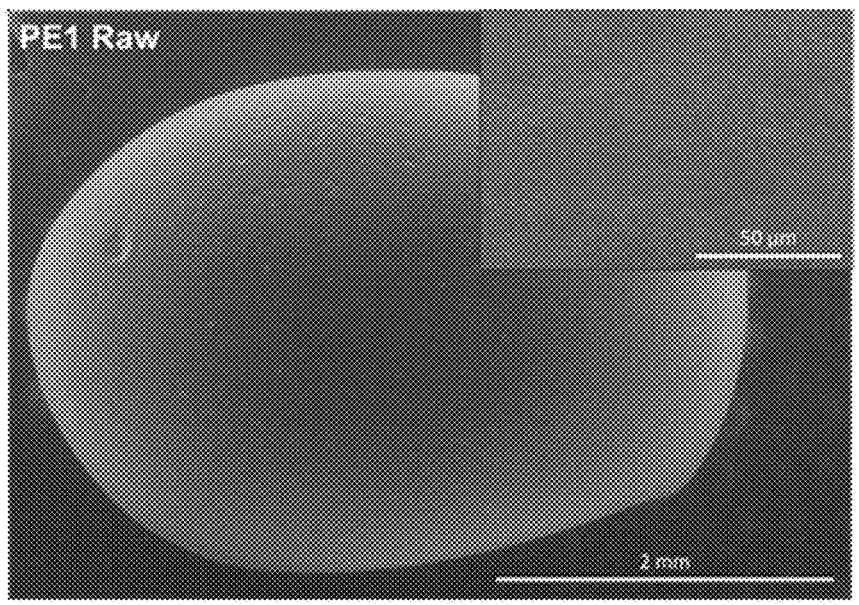
FIG. 6A
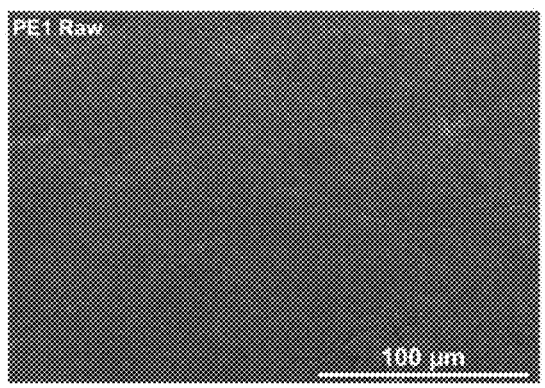 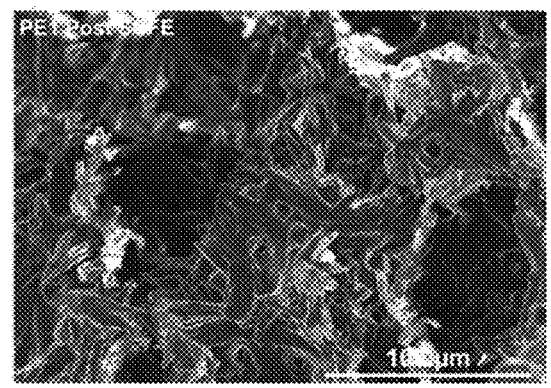
FIG. 6B					FIG. 6C

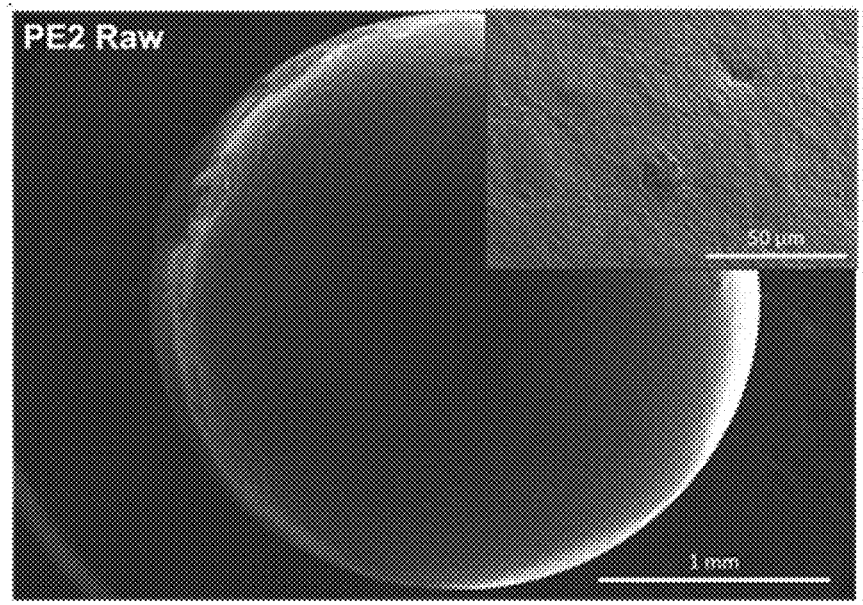
FIG. 7A
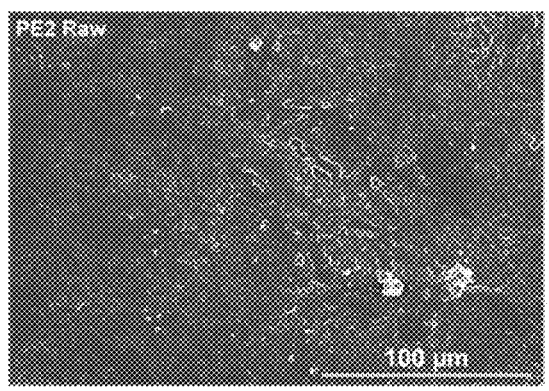 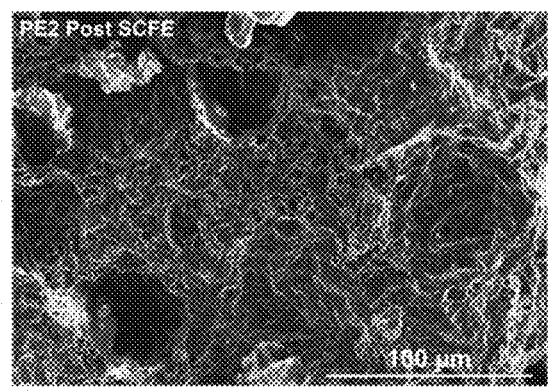
FIG. 7B          FIG. 7C

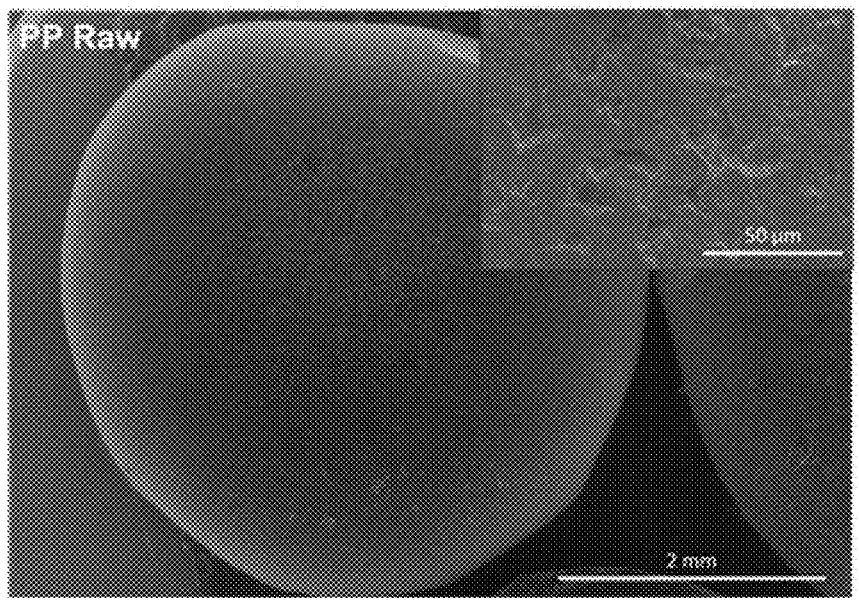
FIG. 8A
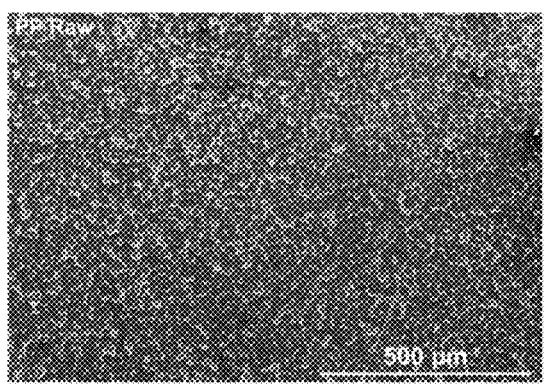 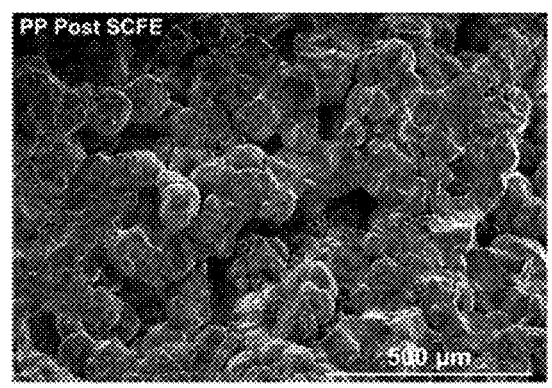
FIG. 8B        FIG. 8C

METHOD FOR PURIFICATION OF DEPOLYMERIZED POLYMERS USING SUPERCRITICAL FLUID EXTRACTION

FIELD OF THE INVENTION

The present invention relates to a method of purifying polymer products derived through depolymerization of plastic feedstock and, specifically, removing organic and/or inorganic impurities from depolymerized polyethylene, polypropylene, and polystyrene polymer products using supercritical fluid extraction. In some embodiments, the polymer products are waxes. In some embodiments, the supercritical fluid is $CO_2$.

Low to mid molecular weight polymers such as waxes and styrenated oligomers are employed in a variety of products including surface polishers and protectants, adhesives, lubricants, asphalts, inks, coatings, plastic extrusion, plastic composites, emulsions, and binders. Most types of polymers used in manufacturing and industrial applications are synthetic and derived from petroleum or fossil sources. As the demand for synthetic mid to low molecular weight polymers increases, so does the production cost due to increasing prices of petroleum feedstock. Additionally, synthetic processes utilizing a proven polymerization process are better suited for higher molecular weight plastics and are challenged to produce a broad range of products with properties tailored to an application's requirements.

A cost-effective alternative to petroleum feedstock that can be used to generate polymer products such as waxes and styrenic oligomers from plastic feedstock including recycled and waste plastic is discussed in U.S. Pat. No. 8,664,458 "Kumar" which is hereby incorporated by reference herein in its entirety. Such a process can generate polymer products such as waxes or sytrenic oligomers via thermal and/or catalytic depolymerization of plastic feedstock including polyethylene, polypropylene, and polystyrene material.

The diversity of polyethylene, polypropylene, and polystyrene feedstock materials can pose a challenge to creating uniform or purified polymer products due to the presence of various additives, such as fillers and colorants. Depending on the additive, these impurities are either degraded and/or carried through the depolymerization process into the final product. These additives and/or degraded derivatives can result in a polymer with a dark color and/or petroleum odor. The retention of impurities in polymer products such as waxes and styrenic oligomers derived from plastic feedstock can potentially limit the markets these products can be used to color agnostic applications.

Supercritical Fluid Extraction has the potential to efficiently remove contaminants from polymers without a risk of thermal oxidation and/or degradation of the polymer material. Supercritical fluids have a low viscosity, a high diffusivity (gas-like properties), and the ability to dissolve materials like a liquid. These properties enable them to penetrate and transport solutes, from different matrices at a higher rate and more efficiently compared with that in liquid phases. In addition, close to the critical point, small changes in pressure or temperature result in significant changes in density, enabling fine-tuning of supercritical fluid properties.

A method of purifying depolymerized polymer products derived from polyethylene, polypropylene, polystyrene, or other similar predominately hydrocarbon-based polymers such as EVA, PET, PVC, and the like via Supercritical Fluid Extraction to remove organic and inorganic contaminants would be commercially advantageous.

SUMMARY OF THE INVENTION

A method for purifying a polymer made from depolymerization of plastic feedstock can include:
  (a) selecting a polymer for purification;
  (b) adding a solvent to the polymer in a reaction vessel;
  (c) heating the polymer and the solvent to promote dissolution of contaminants from the polymer into the solvent;
  (d) performing an extraction technique to remove the contaminants from the polymer;
  (e) depressurizing the reaction vessel to remove the contaminants suspended in the solvent to isolate a purified polymer; and
  (f) cooling the purified polymer.

In some embodiments, the method can be continuous or semi-continuous.

In some embodiments, the polymer can be a polyethylene polymer. In some embodiments, the polymer can be a polypropylene polymer. In other embodiments, the polymer can be a polystyrene polymer.

In some embodiments, the extraction technique can be supercritical fluid extraction. In some preferred embodiments, the solvent used can be supercritical $CO_2$.

In some embodiments, the method can include selecting a temperature, pressure, duration, agitation rate, starting solvent volume, and/or co-solvent for supercritical fluid extraction based on the properties of the polymer to be purified.

In some embodiments, the selected co-solvent can be methanol.

The method can be used to remove inorganic and/or organic impurities from the polymer.

BRIEF DESCRIPTION OF THE DRAWINGS

FIG. 6A is a scanning electron microscope (SEM) image of a raw pellet of Sample PE1.

FIG. 6B is a further magnified SEM image of the raw pellet of Sample PE1 from FIG. 6A.

FIG. 6C is a magnified SEM image of an extracted pellet of Sample PE1.

FIG. 7A is a SEM image of a raw pellet of Sample PE2.

FIG. 7B is a further magnified SEM image of the raw pellet of Sample PE2 from FIG. 7A.

FIG. 7C is a magnified SEM image of an extracted pellet of Sample PE2.

FIG. 8A is a SEM image of a raw pellet of Sample PP.

FIG. 8B is a further magnified SEM image of the raw pellet of Sample PP from FIG. 8A.

FIG. 8C is a magnified SEM image of an extracted pellet of Sample PP.

DETAILED DESCRIPTION OF ILLUSTRATIVE EMBODIMENT(S)

Figure 1:
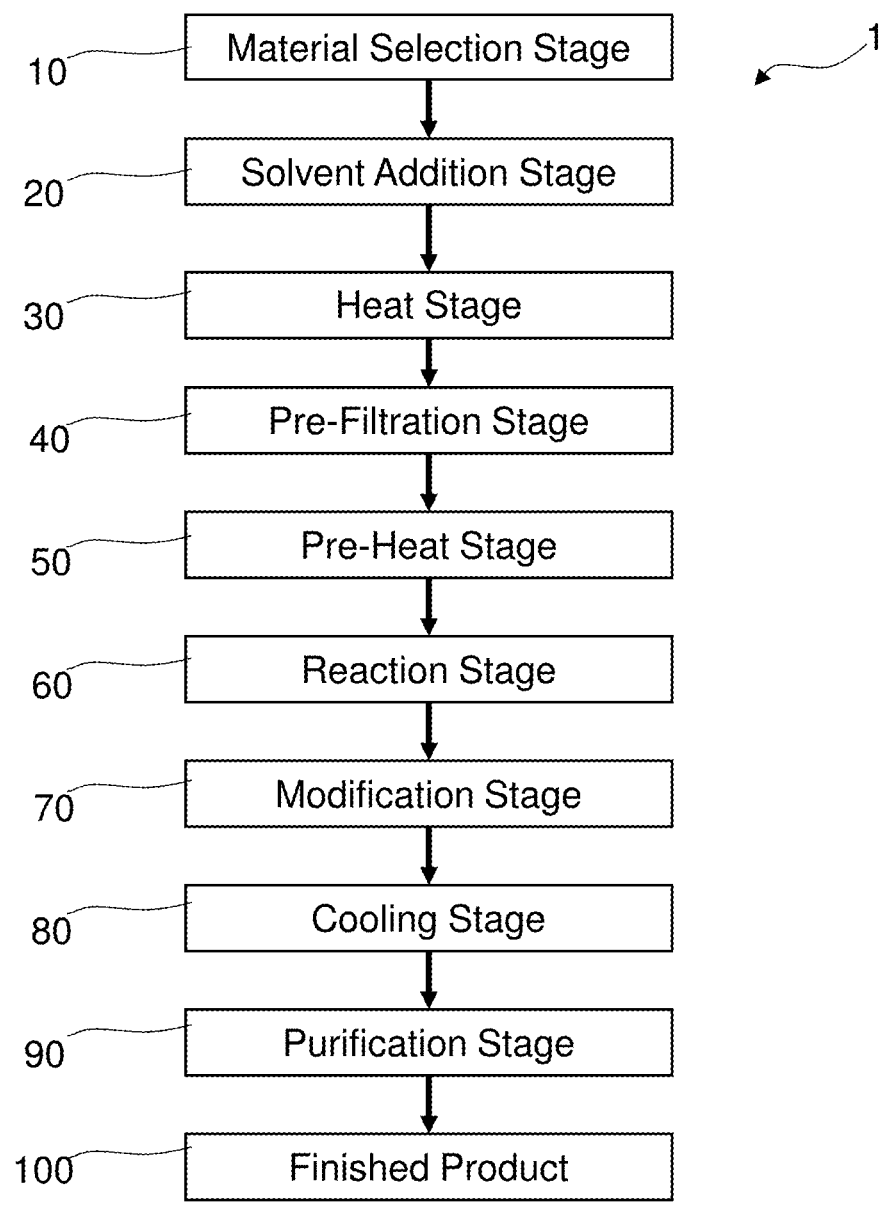
FIG. 1 is a flowchart illustrating a process for treating plastic feedstock.

Polyethylene, polystyrene, and polypropylene polymers derived from depolymerization of plastic feedstock can be purified by supercritical $CO_2$ extraction, also known as, Supercritical Fluid Extraction to remove organic and inorganic impurities.

In some embodiments, the polymer can be made by catalytic depolymerization of plastic material. In some embodiments, the polymer can be made by thermally degrading plastic material. In some embodiments, the plastic material can be polyethylene. In some embodiments, the plastic material can be polypropylene. In some embodiments, the plastic material can be polypropylene (PP), high density polyethylene (HDPE), low density polyethylene (LDPE), linear low density polyethylene (LLDPE), and/or other variations of polyethylene.

In some embodiments, the plastic material can include both polyethylene and polypropylene material. In some embodiments, the plastic material can be divided evenly by weight between polyethylene and polypropylene. In some embodiments, the plastic material can include lower levels of polystyrene, polyethylene terephthalate (PET), ethylene-vinyl acetate (EVA), (polyvinyl chloride) PVC, (ethylene vinyl alcohol) EVOH, and/or undesirable additives and/or contaminants, such as fillers, dyes, metals, various organic and inorganic additives, moisture, food waste, dirt, or other contaminating particles.

In some embodiments, the plastic material comprises recycled plastics. In some embodiments, the plastic material comprises virgin plastics. In other or the same embodiments, the plastic material comprises recycled plastics and/or virgin plastics.

In some embodiments, the plastic material can include waste plastic material feed. Suitable waste plastic material feeds can include, but are not limited to, mixed polyethylene waste, mixed polypropylene waste, and/or a mixture including mixed polyethylene waste and mixed polypropylene waste. The mixed polyethylene waste can include LDPE, LLDPE, HDPE, PP, and/or a mixture including combinations of LDPE, LLDPE, HDPE and/or PP. In some embodiments, the mixed polyethylene waste can include film bags, milk jugs or pouches, totes, pails, caps, agricultural film, and/or packaging material. In some embodiments, the waste plastic material feed can include up to 10% by weight of material that is other than plastic material, based on the total weight of the waste plastic material feed.

In some embodiments, the plastic material can be one of, or a combination of, virgin polyethylene (any one of, or combinations of, HDPE, LDPE, LLDPE and/or medium-density polyethylene (MDPE)), virgin polypropylene, and/or post-consumer or post-industrial polyethylene or polypropylene. Examples of post-consumer or post-industrial sources of polyethylene and polypropylene can include, but are not limited to, bags, jugs, bottles, pails, and/or other items containing PE and/or PP.

In some embodiments, the plastic material can include polypropylene material. In other embodiments, the plastic material can include both polyethylene and polypropylene material. In some embodiments, the plastic material can contain up to 20% PP, lower levels of polystyrene, PET, EVA, PVC, EVOH, and/or undesirable additives and/or contaminants, such as fillers, dyes, metals, various organic and inorganic additives, moisture, food waste, dirt, or other contaminating particles.

In some embodiments, it is desirable to convert the plastic feed material into lower molecular weight polymers with increased melt flow and olefin content. In some embodiments, the conversion is affected by heating the plastic feedstock to generate molten plastic material, and then contacting the molten plastic material with a catalyst material within a reaction zone disposed at a temperature between 200° C. and 425° C.

The molecular weight, polydispersity, glass transition, melt flow, and olefin content that is generated via the depolymerization depends on the residence time of the plastic material within the reaction zone.

In some embodiments the depolymerization process utilizes a catalyst such as [Fe—Cu—Mo—P]/$Al_2O_3$, Zeolite, or alumina supported systems, and/or thermal depolymerization. In some embodiments, the catalyst can be contained in a permeable container.

In some embodiments, the purification of plastic material utilizes flash separation, absorbent beds, clay polishing and/or film evaporators.

FIG. 1 illustrates Process 1 for treating plastic material. Process 1 can be run in batches or as a continuous process. The parameters of Process 1, including but not limited to temperature, flow rate of plastic, monomers/copolymers grafted during the reaction and/or modification stages, and total number of pre-heat, reaction, or cooling segments, can be modified to create end product polymers, such as waxes or styrenic oligomers with varying molecular weights between 500-300,000 Da.

In Material Selection Stage 10, plastic feed is sorted/selected and/or prepared for treatment. In some embodiments the plastic feed can be sorted/selected to include polyethylene material. In other embodiments the plastic feed can be sorted/selected to include polypropylene material. In other embodiments the plastic feed can be sorted/selected to include both polyethylene and polypropylene material. In certain embodiments, the feed can contain small quantities of polystyrene, PET, EVA, EVOH, and lower levels of undesirable additives or polymers, such as nylon, rubber, PVC, ash, filler, pigments, stabilizers, grit or other unknown particles.

In some embodiments, the plastic feed has an average molecular weight between 50,000-600,000 Da.

In some embodiments, the material selected in Material Selection Stage 10 comprises recycled plastics. In other or the same embodiments, the material selected in Material Selection Stage 10 comprises recycled plastics and/or virgin plastic material.

In Solvent Addition Stage 20, solvents, such as toluene, xylenes, cymenes, or terpinenes, can be used to dissolve or suspend the plastic feed before it undergoes depolymerization within the reactor bed/vessel. In certain embodiments, the desired product can be isolated via separation or extraction and the solvent can be recycled. In some embodiments, the solvent used to dissolve plastic feed is supercritical $CO_2$.

In some embodiments, the material selected in Material Selection Stage 10 can be heated in Heat Stage 30 in an extruder and undergoes Pre-Filtration Process 40. In some embodiments, the extruder is used to increase the temperature and/or pressure of the incoming plastic feedstock and is used to control the flow rates of the plastic feedstock. In some embodiments, the extruder is complimented by or replaced entirely by a pump/heater exchanger combination.

Pre-Filtration Process 40 can employ both screen changers and filter beds, along with other filtering techniques/devices to remove contaminants from and purify the heated material. In some embodiments, the resulting filtered material is then moved into an optional Pre-Heat Stage 50 which brings the filtered material to a higher temperature before it enters Reaction Stage 60. Pre-Heat Stage 50 can employ, among other devices and techniques, static and/or dynamic mixers and heat exchangers such as internal fins and heat pipes.

Material in Reaction Stage 60 undergoes depolymerization. This depolymerization can be a purely thermal reaction and/or it can employ catalysts. Depending on the starting material and the desired polymer end product, depolymerization can be used for a slight or extreme reduction of the molecular weight of the starting material. In some embodiments, the catalyst used is a zeolite or alumina supported system or a combination of the two. In some embodiments, the catalyst is [Fe—Cu—Mo—P]/$Al_2O_3$ prepared by binding a ferrous-copper complex to an alumina or zeolite support and reacting it with an acid comprising metals and non-metals to obtain the catalyst material. Other suitable catalyst materials include zeolite, mesoporous silica, H-mordenite and alumina. The system can also be run in the absence of a catalyst and produce lower molecular weight polymer through thermal degradation.

In some embodiments, supercritical fluid extraction can be carried out during depolymerization in Reaction Stage 60.

Reaction Stage 60 can employ a variety of techniques/devices including, among other things, fixed beds, horizontal and/or vertical reactors, and/or static mixers. In some embodiments, Reaction Stage 60 employs multiple reactors and/or reactors divided into multiple sections.

In some embodiments, Reaction Stage 60 can induce coalescence of pigments, particles, and/or other impurities such that the pigments, particles, and/or other impurities settle out from the depolymerized product for removal.

After Reaction Stage 60 the depolymerized material enters optional Modification Stage 70. Modification Stage 70 involves grafting various monomers and/or copolymers such as, but not limited to, acids, alcohols, acetates, and alkenes such as hexene onto the depolymerized product. In some embodiments, Modification Stage 70 can graft monomers and/or copolymers to depolymerized material after supercritical fluid extraction to remove organic and/or inorganic impurities from resulting polymer products. In other embodiments, Modification Stage 70 can graft monomers and/or copolymers to depolymerized material during supercritical fluid extraction of resulting polymer products.

In some embodiments, to improve compatibility and/or add function, the various monomers and/or copolymers are grafted on via the olefin fingerprint. Grafting can take place, among other places, in a reactor, in line with the stream after cooling, and/or in a separate vessel.

In some embodiments, to improve compatibility and/or add function, the various monomers and/or copolymers are grafted on via the aromatic functionality. Grafting can take place, among other places, in a reactor, in line with the stream after cooling, and/or in a separate vessel.

Cooling Stage 80 can employ heat exchangers, along with other techniques/devices to bring the depolymerized material down to a workable temperature before it enters optional Purification Stage 90. In some embodiments, cleaning/purification of the resulting polymers via such methods such as nitrogen stripping occurs before Cooling Stage 80. In some embodiments, the desired polymer product can undergo supercritical fluid extraction to remove organic and inorganic impurities using the solvent added during Solvent Addition Stage 20.

Optional Purification Stage 90 involves the refinement and/or decontamination of polymer materials including end products such as polypropylene and/or polyethylene waxes or styrenic oligomers. Techniques/devices that can used in Purification Stage 90 include, but are not limited to, flash separation, absorbent beds, clay polishing, distillation, vacuum distillation, and filtration to remove solvents, oils, color bodies, ash, inorganics, and coke. In some embodiments, a thin or wiped film evaporator is used to remove gas, oil and/or grease, and/or lower molecular weight functionalized polymers. In some embodiments, the oil, gas, and lower molecular weight functionalized polymers can in turn be burned to help run various Stages of Process 1. In certain embodiments, the desired product can be isolated via separation or extraction and the solvent can be recycled.

Process 1 ends at Finished Product Stage 100 in which the initial starting material selected in Material Selection Stage 10 has been turned into a polypropylene or polyethylene waxes or styrenic oligomers. In at least some embodiments, the resulting polymer does not need additional processing and/or refining. In other embodiments, the polymers created at Finished Product Stage 100 need additional modifications.

Purification of Polymers Derived from Plastic Feedstock

Polypropylene or polyethylene polymers or styrenic oligomers derived from depolymerization of plastic feedstock can include organic and/or inorganic impurities. Impurities can include, but are not limited to, alkanes, alkenes, compounds containing nitrogen, oxygen, fillers, dyes, pigments, metals, stabilizers, anti-oxidants, process aids, moisture, food waste, dirt, or other contaminating particles.

Figure 2:
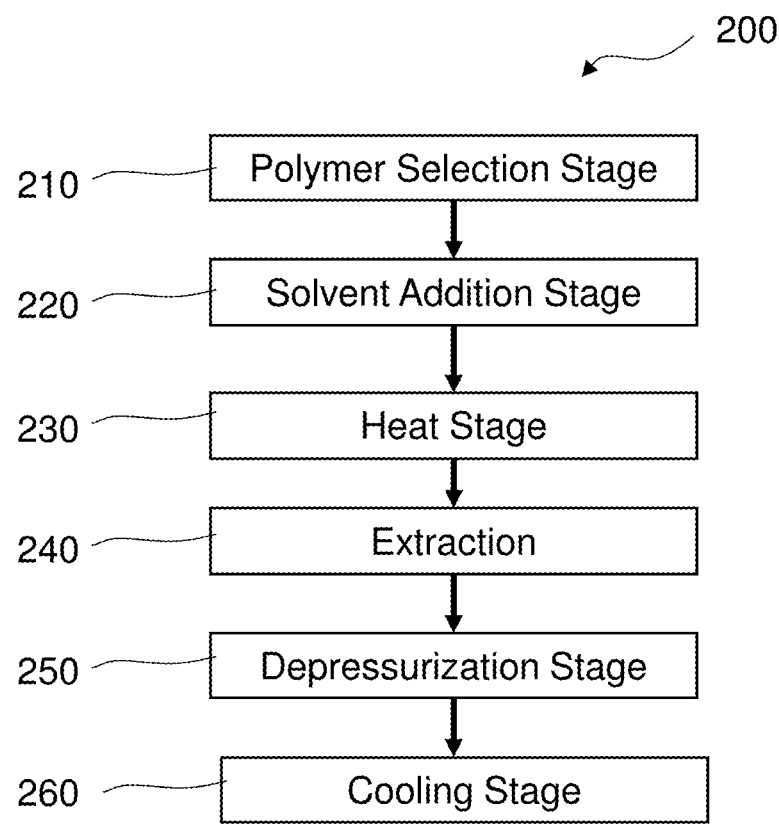
FIG. 2 is a flowchart illustrating a process for purifying a polymer.

In some embodiments, polyethylene and polypropylene polymers can undergo purification via Supercritical Fluid Extraction to remove organic and inorganic impurities. FIG. 2 illustrates an embodiment of a process, process 200, for purifying polyethylene and/or polypropylene polymers derived via depolymerization of plastic feedstock. In Polymer Selection Stage 210, a polypropylene or polyethylene depolymerized polymer is selected for purification. In some embodiments, styrenic oligomers are selected for purification. In at least some embodiments, the selected polymer can be in solid phase at ambient conditions.

In Solvent Addition Stage 220, solvents for Supercritical Fluid Extraction can be added. In some embodiments, supercritical $CO_2$ is added as a solvent. In certain embodiments, methanol or similar solvents can be added as a co-solvent. In some embodiments, the density supercritical $CO_2$ can be in the inclusive range of 0.33-0.57 g/mL and the viscosity can be in the inclusive range of 0.03-0.045 cp. In some embodiments, the physical properties of supercritical $CO_2$ promote suspension of fine metal particulates.

During Heat Stage 230, the operating temperature of the reaction vessel is increased above the melting point of the polymer or oligomer causing the polymer to melt. At least in some embodiments, in the liquid phase, impurity particles in the polymer or oligomer matrix have higher mobility and increased vapor pressure. In some embodiments, such conditions promote dissolution of organic and inorganic impurities into the supercritical phase. In some embodiments, heat Stage 230 also promotes penetration of supercritical $CO_2$ into the liquid polymer or oligomer matrix.

In some embodiments during Extraction Stage 240, Supercritical Fluid Extraction removes organic and inorganic impurities from the liquid polymer matrix. In some embodiments, operating parameters including, but not limited to, temperature, pressure, extraction duration, pressure, agitation rate, $CO_2$:sample ratio, and methanol addition can be modified during polymer extraction.

In some illustrated embodiments, 37-84% of the measured impurities in some polyethylene polymers can be extracted.

In some illustrated embodiments, 41-92% of the measured impurities in some polyethylene polymers can be extracted.

In some illustrated embodiments, 37-97% of the measured impurities in a polypropylene polymer can be extracted.

In some embodiments, during Depressurization Stage 250, inorganic and organic impurities are vented with the supercritical phase, leaving behind the purified polymer. In some embodiments, upon depressurization, an outlet pipe exerts a force to remove organic and inorganic particulates suspended in the supercritical $CO_2$. In some embodiments, the outlet pipe is situated at the top of the reactor and exerts an upward vertical force.

In some embodiments, during Cooling Stage 260, the purified polymer is cooled back to ambient conditions and solidifies.

In some embodiments, Supercritical Fluid Extraction can remove inorganic impurities including, but not limited to, metal or counter ions, Ca, Al, Na, Mg, Fe, Ti, and/or S, from polyethylene depolymerized polymers.

In some illustrated embodiments, the average efficiency of Ca extraction from polyethylene depolymerized polymer can be up to and inclusive of 91%.

In some illustrated embodiments, the average efficiency of Al extraction from polyethylene depolymerized polymer can be up to and inclusive of 65%.

In some illustrated embodiments, the average efficiency of Na extraction from polyethylene depolymerized polymer can be up to and inclusive of 69%.

In some illustrated embodiments, the average efficiency of Mg extraction from polyethylene depolymerized polymer can be up to and inclusive of 24%.

In some illustrated embodiments, the average efficiency of Fe extraction from polyethylene depolymerized polymer can be up to and inclusive of 15%.

In some illustrated embodiments, the average efficiency of Ti extraction from polyethylene depolymerized polymer can be up to and inclusive of 53%.

In some illustrated embodiments, the average efficiency of S extraction from polyethylene depolymerized polymer can be up to and inclusive of 44%.

In some illustrated embodiments, Supercritical Fluid Extraction can remove inorganic impurities, including but not limited to, Ca, Al, Na, Mg, Fe, and/or Ti, from polypropylene depolymerized polymers.

In some illustrated embodiments, the average efficiency of Ca extraction from polypropylene depolymerized polymer can be up to and inclusive of 7%.

In some illustrated embodiments, the average efficiency of Na extraction from polypropylene depolymerized polymer can be up to and inclusive of 64%.

In some illustrated embodiments, the average efficiency of Al extraction from polypropylene depolymerized polymer can be up to and inclusive of 59%.

In some illustrated embodiments, the average efficiency of Mg extraction from polypropylene depolymerized polymer can be up to and inclusive of 12%.

In some illustrated embodiments, the average efficiency of Fe extraction from polypropylene depolymerized polymer can be up to and inclusive of 27%.

In some illustrated embodiments, the average efficiency of Ti extraction from polypropylene depolymerized polymer can be up to and inclusive of 33%.

Figure 3:
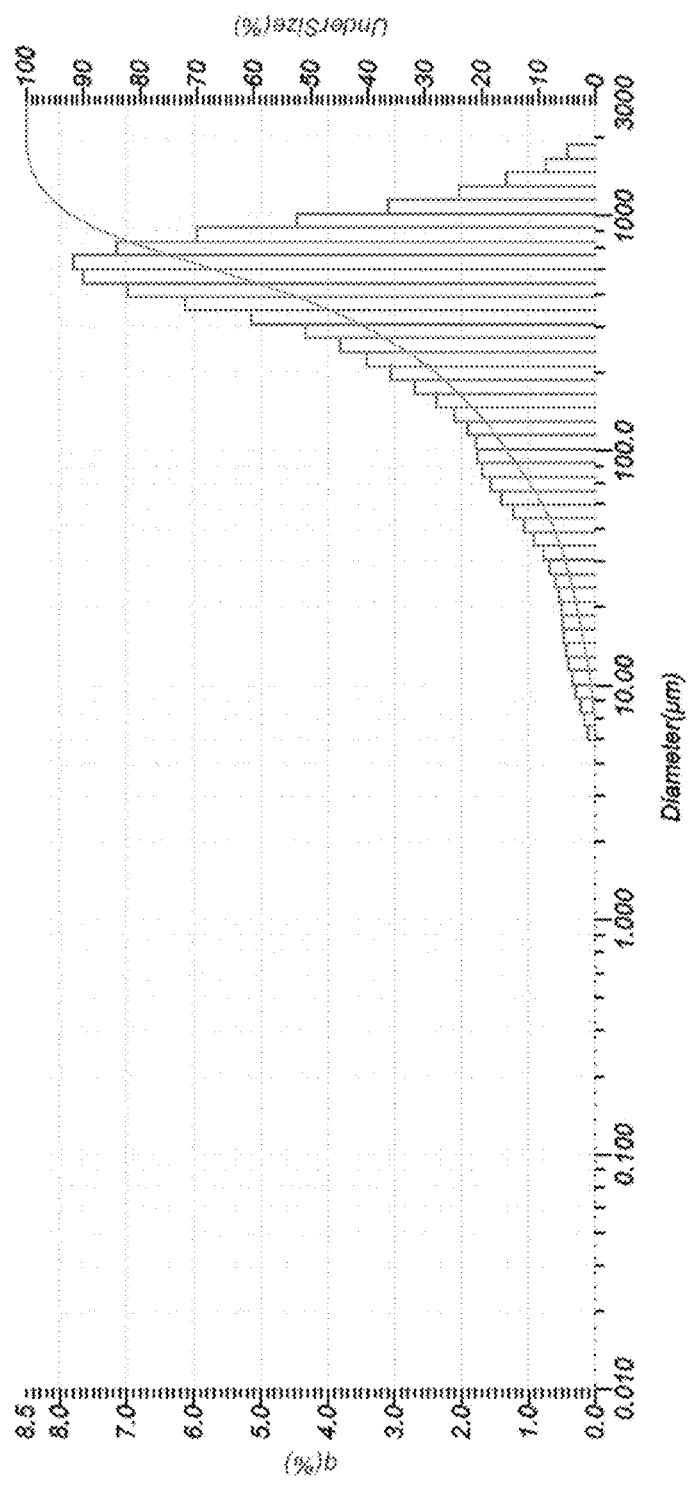
FIG. 3 is a graph illustrating particle size distribution of a ground polyethylene polymer material (Sample PE1).
Figure 4:
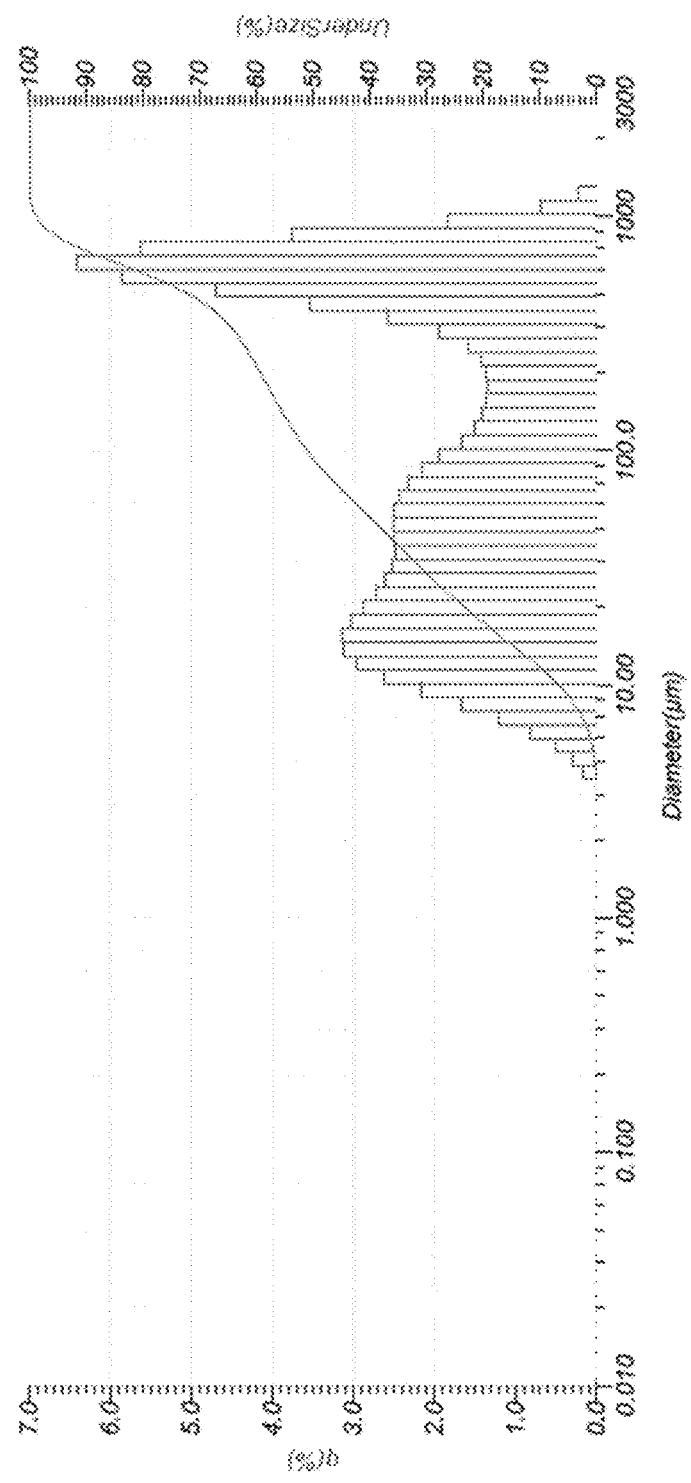
FIG. 4 is a graph illustrating particle size distribution of a ground polyethylene polymer material (Sample PE2)
Figure 5:
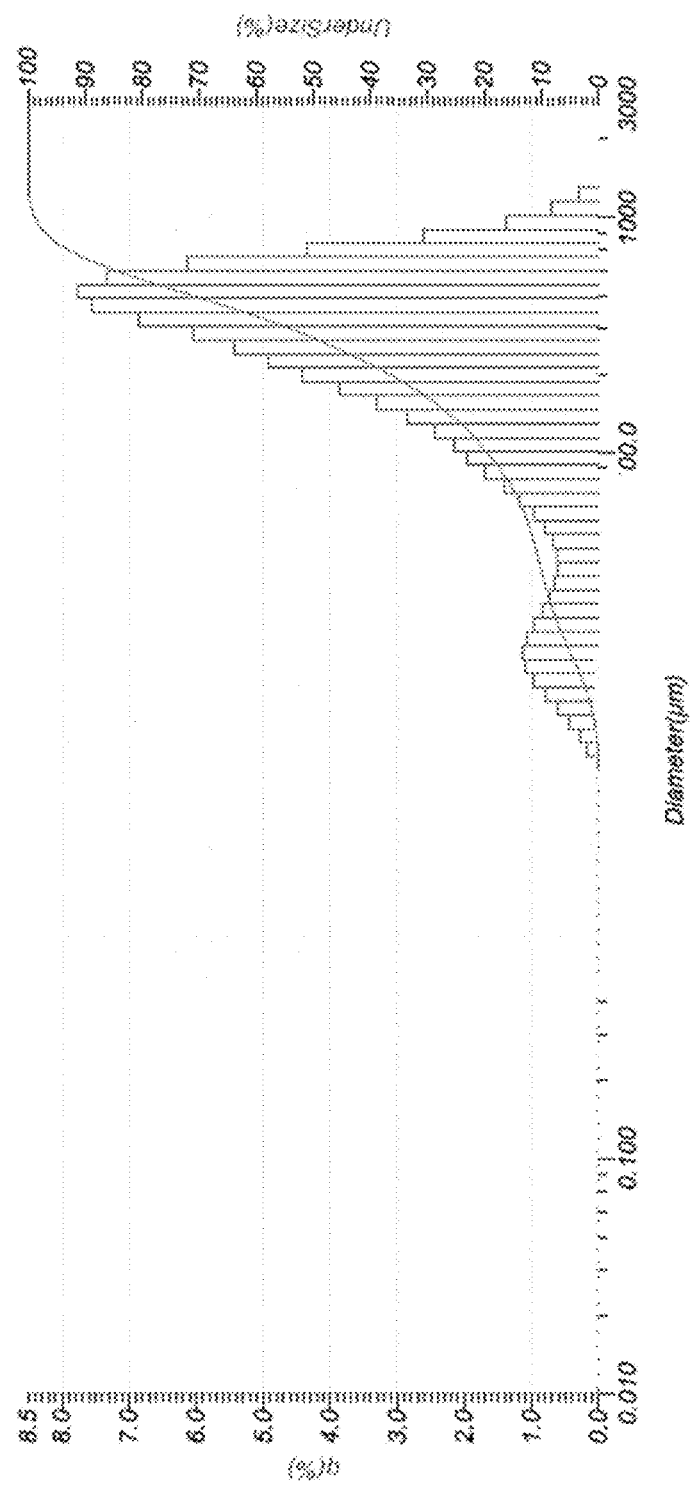
FIG. 5 is a graph illustrating particle size distribution of a ground polypropylene polymer material (Sample PP).

In an illustrative embodiment, three polymers produced via catalytic depolymerization of plastic feedstock were investigated to determine operating parameters for supercritical fluid extraction. As set forth in Table 1, the particle size of two polyethylene polymers, PE1 and PE2, and one polypropylene polymer, PP, was determined using Particle Size Analysis on powdered samples. Particle size distribution of ground polymer samples are shown in FIG. 3 (PE1), FIG. 4 (PE2), and FIG. 5 (PP).

TABLE 1

Sample Components and Particle Size

| Sample | Grade/Type | Source | Median Particle Size (μm) | Mean Particle Size (μm) |
|---|---|---|---|---|
| PE1 | Polyethylene Polymer | GreenMantra (Applicant) | 428 | 476 |
| PE2 | Polyethylene Polymer | GreenMantra (Applicant) | 93 | 264 |
| PP | Polypropylene Polymer | GreenMantra (Applicant) | 30 | 338 |

Supercritical Fluid Extraction was performed on each polymer sample. In some embodiments, a specified volume of methanol was added to a reactor chamber. The reactor head was tightened, both of the static/dynamic valves and the restrictor valve were closed, and a $CO_2$ gate value was opened. When the pressure in the reactor chamber reached the same pressure in the $CO_2$ tank, heating was initiated using an electric heating jacket controlled by a reactor controller. After a desired temperature was reached, liquid $CO_2$ was pumped into the chamber until a desired pressure was reached. Soluble organic impurities were extracted into the supercritical $CO_2$ phase, and later vented by opening both of the static/dynamic valves and the restrictor valve. For sample runs in which methanol was added as the co-solvent, the methanol amount was determined based on the mole amount of $CO_2$ in the reactor chamber. The density of supercritical $CO_2$ was obtained from the National Institute of Standards and Technology database.

$$V_{CH_3OH} = \left(x\% \times \frac{V_{CO_2}\rho_{CO_2}}{MW_{CO_2}}\right)\frac{MW_{CH_3OH}}{\rho_{CH_3OH}} \quad \text{Equation 1}$$

The experimental parameter settings for Supercritical Fluid Extraction analysis were constructed using fractional factorial design (FFD) methodology to develop an empirical model that describes the effect of each operating parameter on the extraction of organic impurities in the systems. The following operating parameters were investigated: temperature, pressure, residence time, agitation rate, $CO_2$ to sample ratio ($CO_2$:S) ratio, and the presence or absence of methanol. The parameter settings were normalized and coded between -1 (low level) and +1 (high level) to allow for direct comparison of the relative impact of each parameter on the system response by direct comparison of the magnitude of the model coefficients. Table 2 summarizes the levels associated to each of the six operating parameters for PE1, PE2, and PP.

TABLE 2

Coded Factor Effects & Corresponding Levels

| Factor | Sample | -1 Level | 0 Level | +1 Level |
|---|---|---|---|---|
| Temperature (° C.) | PE1 | 130 | 140 | 150 |
| | PE2 | 135 | 140 | 145 |
| | PP | 165 | 175 | 185 |
| Pressure (MPa) | PE1 | 20.7 | 25.9 | 31 |
| | PE2 | 23.33 | 25.9 | 28.48 |
| | PP | 24.1 | 27.6 | 31 |
| Duration (min) | PE1 | 5 | 10 | 15 |
| | PE2 | 7.5 | 10 | 12.5 |
| | PP | 10 | 15 | 20 |
| Agitation Rate (rpm) | PE1 | 250 | 500 | 750 |
| | PE2 | 375 | 500 | 625 |
| | PP | 50 | 150 | 250 |
| $CO_2$:S ratio (wt/wt) | PE1 | 20 | 30 | 40 |
| | PE2 | 25 | 30 | 35 |
| | PP | 10 | 20 | 30 |
| Methanol addition (mol %) | PE1 | 0 | 1 | 2 |
| | PE2 | 0.5 | 1 | 1.5 |
| | PP | 0 | 0.75 | 1.5 |

Using the results of Supercritical Fluid Extraction analysis, the following empirical models were built to describe the extraction (ŷi) of the elements tested as a function of the six operating parameters: temperature (Temp), pressure (P), residence time (T), agitation rate (rate), the $CO_2$:sample ratio (Ratio), and methanol addition (MethanolAdd)

$$\hat{y}_i = \beta_0 + \beta_1\text{Temp} + \beta_2 P + \beta_3 T + \beta_4\text{Rate} + \beta_5\text{Ratio} + \beta_6\text{MethanolAdd} + \hat{\beta}_{13}\text{Temp}T + \hat{\beta}_{14}\text{TempRate} + \hat{\beta}_{15}\text{Temp Ratio} + \hat{\beta}_{16}\text{Temp MethanolAdd} + \hat{\beta}_{24}P^*\text{Rate} + \hat{\beta}_{26}T \text{ MethanolAdd} \quad \text{Equation 2:}$$

Where (assuming $3^{rd}$ order and higher interactions are negligible):

$$\hat{\beta}_{13} = \beta_{13} + \beta_{25} \quad \hat{\beta}_{14} = \beta_{14} + \beta_{56} \quad \hat{\beta}_{15} = \beta_{15} + \beta_{23}\beta_{46}$$

$$\hat{\beta}_{16} = \beta_{16} + \beta_{45} \quad \hat{\beta}_{24} = \beta_{24} + \beta_{36} \quad \hat{\beta}_{26} = \beta_{26} + \beta_{34} \quad \text{Equation 3:}$$

$$\hat{\beta} = (X^T X)^{-1}(X^T Y_i) \quad \text{Equation 4:}$$

The experimental data was fit to the empirical model using multiple Linear Least Squares Regression according to Equation 1. $\hat{\beta}$ is the model parameter vector, containing each of the model parameters ($\hat{\beta}_0$, $\hat{\beta}_1$, $\hat{\beta}_2$, ... ), X is the experimental design matrix, and $Y_i$ is the response vector, containing each of the measured experimental extraction efficiencies.

Color quantification of raw and extracted polymer samples was conducted using a Digital Single-lens Reflex (DSLR) camera equipped with a macro lens. A colorchecker was used to quantify the color. Photos were post processed using image processing software.

The concentrations of organic impurities in raw and extracted polymer samples were determined using Soxhlet Extraction followed by Gas chromatography-mass spectrometry (GC-MS). Soxhlet extraction utilized dichloromethane as the solvent with the extraction time of 7 h with 5 min/cycle. Soxhlet extracted samples were filtered and diluted in volumetric flasks. The GC oven was programmed from 50° C., ramping rate of 15° C./min, to 300° C., dwelling at 300° C. for 2 min for polyethylene samples, and programmed from 50° C., ramping rate of 12° C./min to 300° C., dwelling at 300° C. for 2 min for polypropylene samples. Helium was used as the carrier gas at a flow rate of 1.5 mL/min. Splitless injection was performed for the samples. The organic impurities in the polymer samples were identified by comparing their mass spectra with the National Institute of Standards and Technology database.

To determine the concentration of inorganic (metal) impurities in raw and extracted polymer samples, aqua region digestion was performed at 200° C. followed by Inductively Coupled Plasma Optical Emission Spectrometry.

Morphological and Particle Size Analysis of raw and extracted polymer samples were conducted using scanning electron microscopy with back scattered imaging (SEM-BSE). Particle size of ground polymer samples were measured using a laser particle size analyzer.

The morphology of raw polymer samples, PE1, PE2, and PP, characterized using SEM is shown in FIGS. 6A, 7A, and 8A. Under low magnification, the particle size for each polymer sample pellet varied from 2-4 mm. Under higher magnification (shown in the inset photos of FIGS. 6A, 7A, and 8A), polyethylene polymers, PE1 and PE2, had smoother surfaces as compared to polypropylene polymer, PP.

Figure 9A:
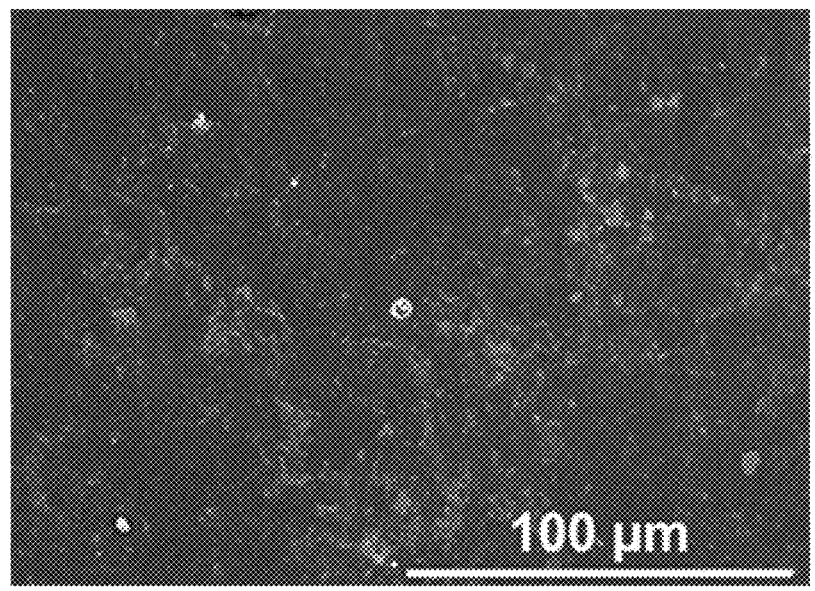
FIG. 9A is a backscattered electron image taken with a scanning electron microscope. SEM-BSE image of a raw pellet of Sample PE1.
Figure 10A:
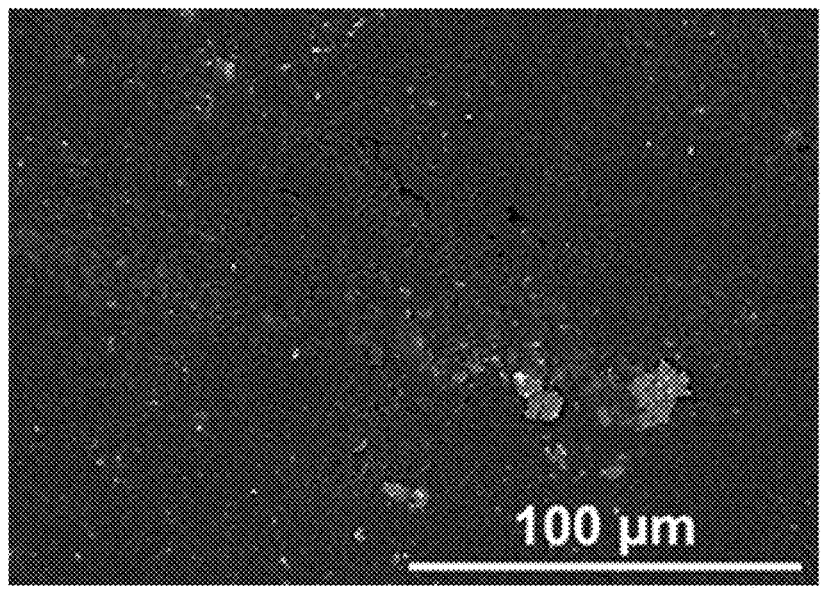
FIG. 10A is a SEM-BSE image of a raw pellet of Sample PE2.
Figure 11A:
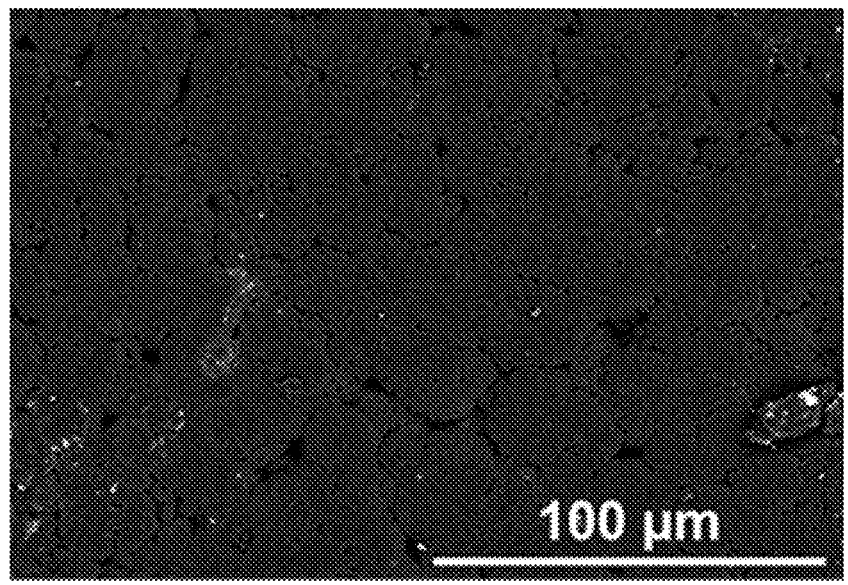
FIG. 11A is a SEM-BSE image of a raw pellet of Sample PP.

SEM-BSE results, illustrated in FIGS. 9A, 10A, and 11A, demonstrates that inorganic impurities are distributed unevenly on the surfaces of PE1 (FIG. 9A), PE2 (FIG. 10A), and PP (FIG. 11A).

Figure 9B:
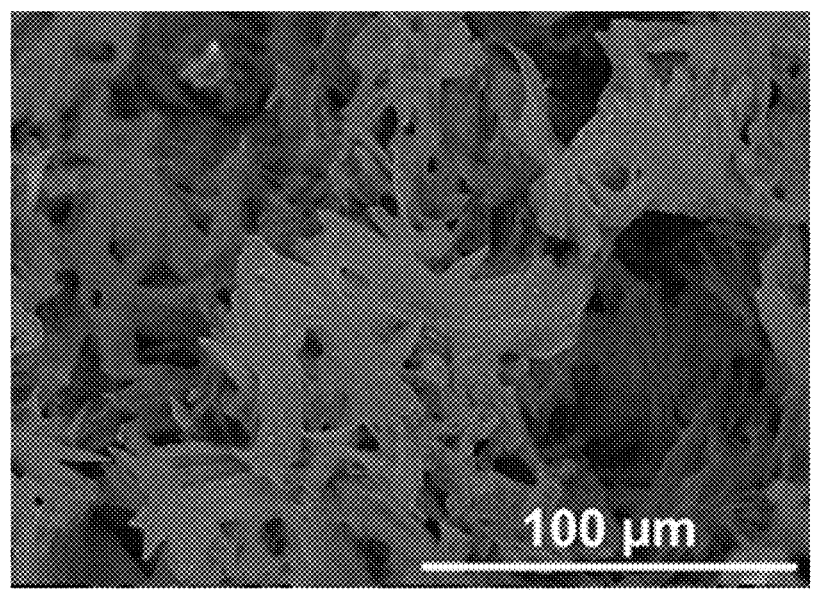
FIG. 9B is a SEM-BSE image of an extracted pellet of Sample PE1.
Figure 10B:
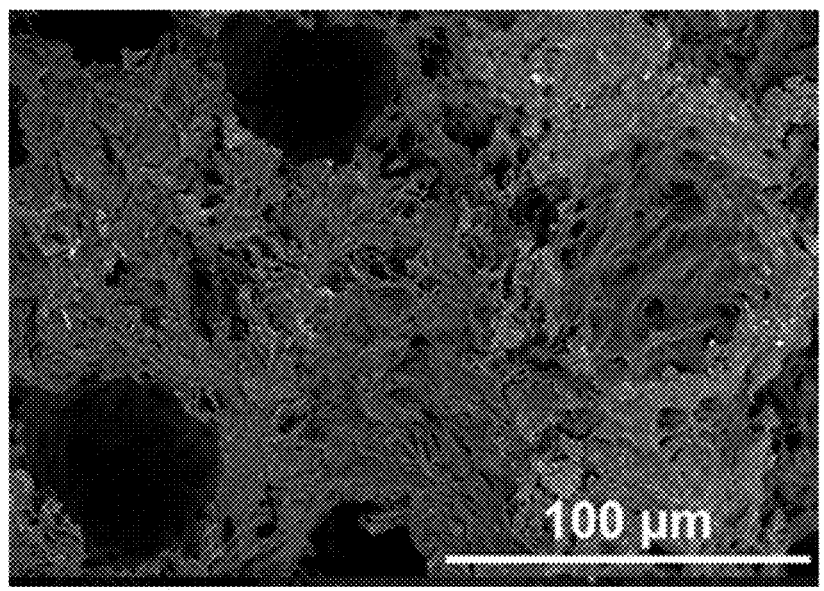
FIG. 10B is a SEM-BSE image of an extracted pellet of Sample PE2.
Figure 11B:
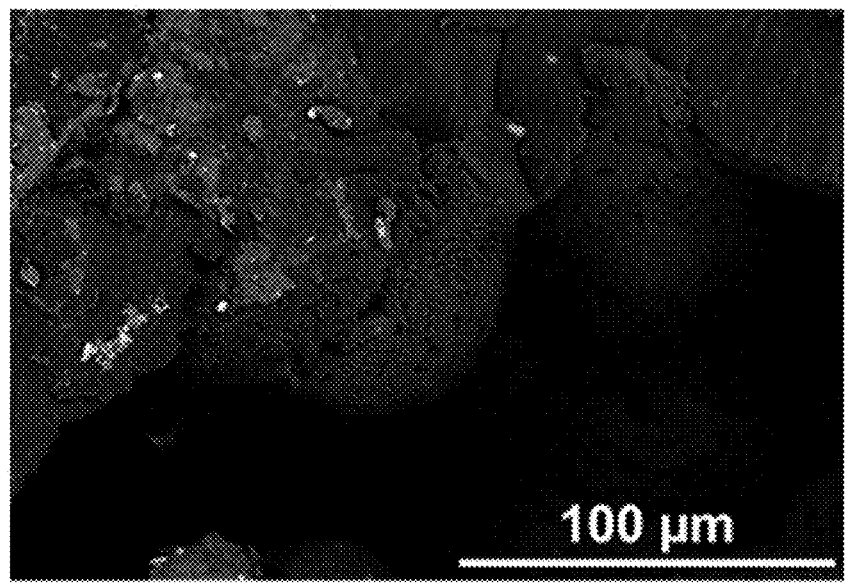
FIG. 11B is a SEM-BSE image of an extracted pellet of Sample PP.
Figure 12A:
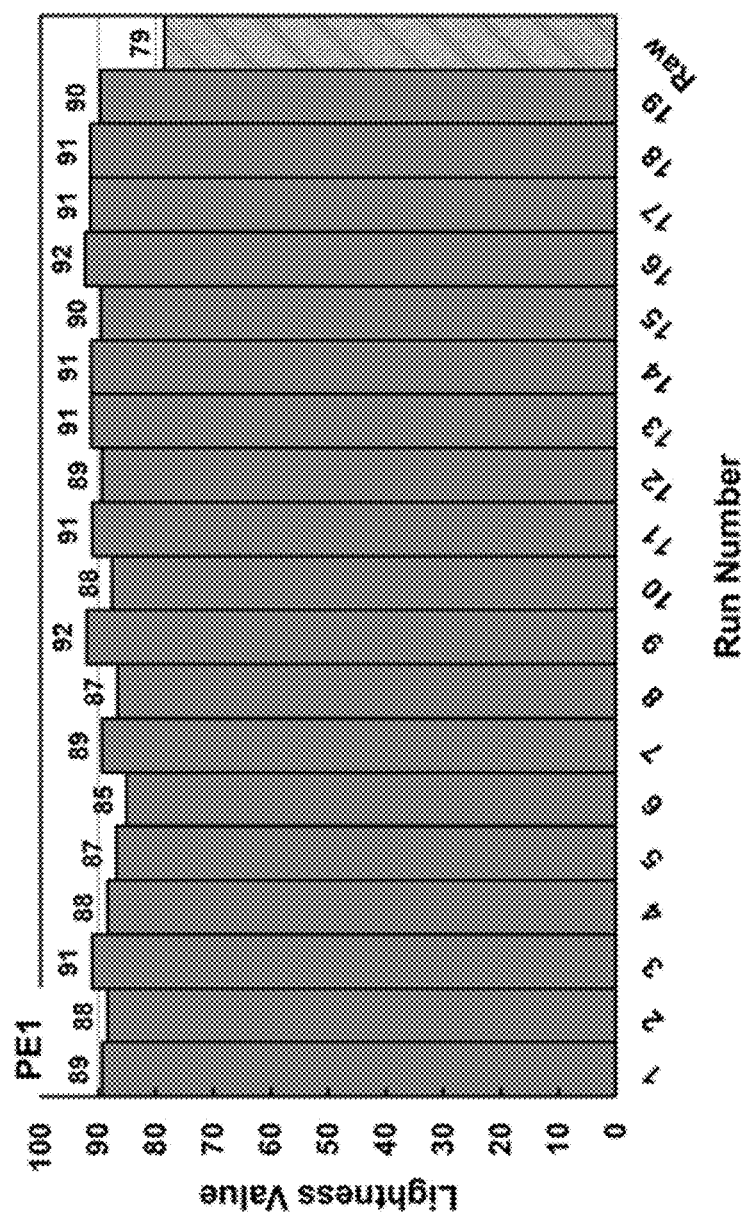
FIG. 12A is a bar graph illustrating color intensity of each extraction run of PE1 polymer samples.
Figure 12B:
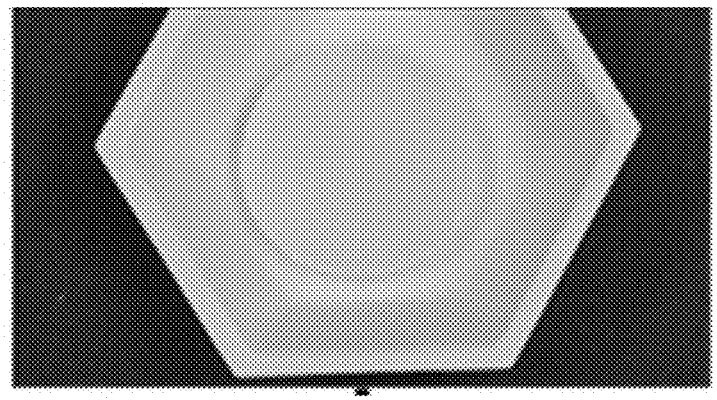
FIG. 12B is a photograph illustrating the color of a pellet of Sample PE1 before supercritical fluid extraction.
Figure 12C:
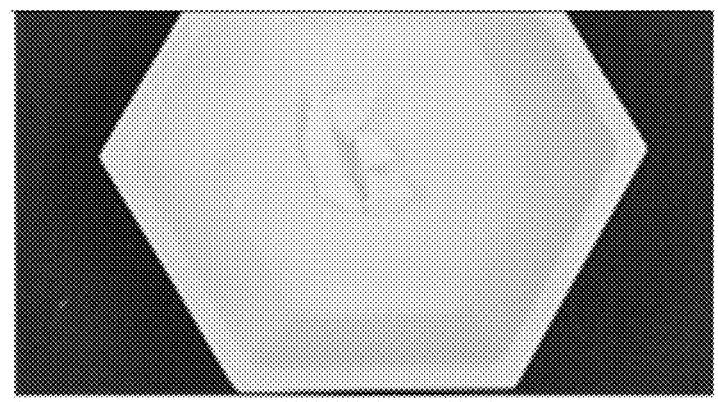
FIG. 12C is a photograph illustrating the color of a pellet of Sample PE1 after supercritical fluid extraction.
Figure 13A:
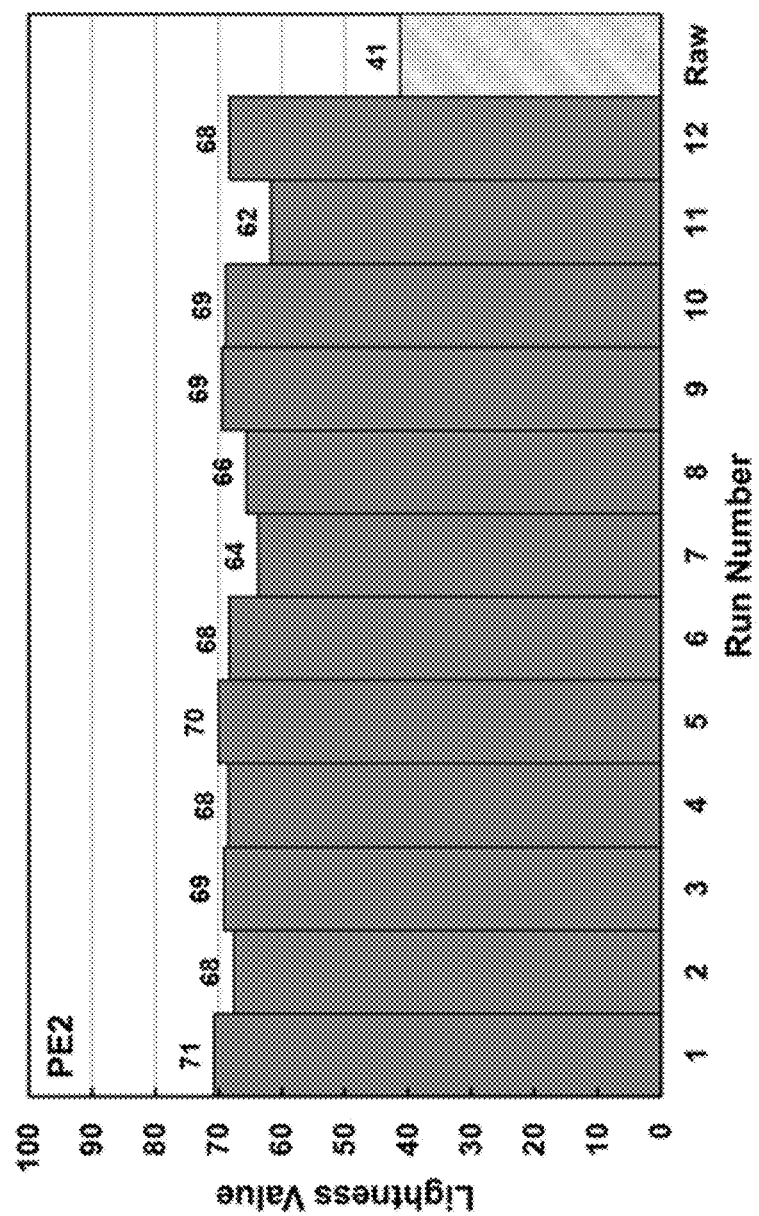
FIG. 13A is a bar graph illustrating color intensity of each extraction run for PE2 polymer samples.
Figure 13B:
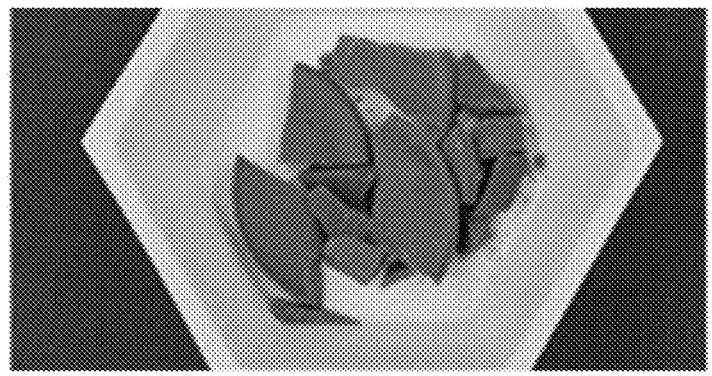
FIG. 13B is a photograph illustrating the color of a pellet of Sample PE2 before supercritical fluid extraction.
Figure 13C:
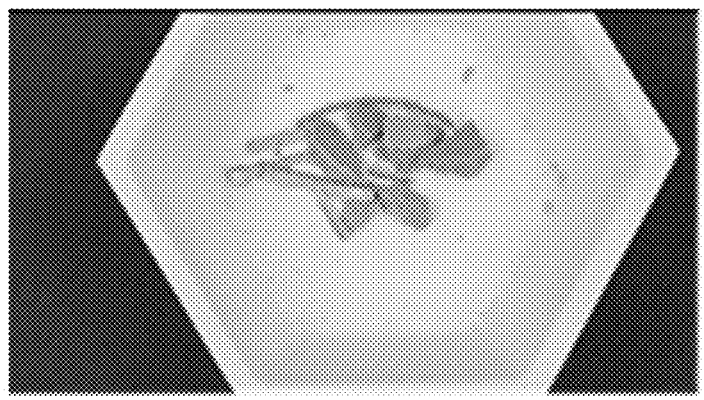
FIG. 13C is a photograph illustrating the color of a pellet of Sample PE2 after supercritical fluid extraction.
Figure 14A:
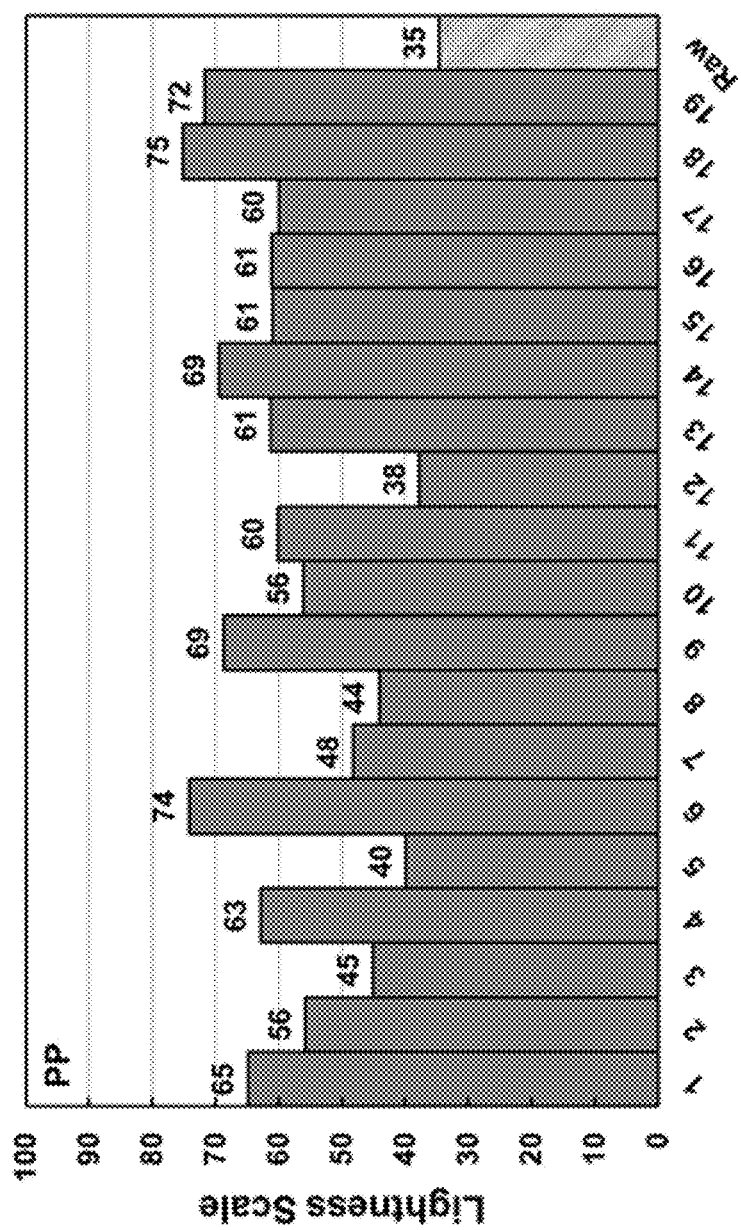
FIG. 14A is a bar graph illustrating color intensity of each extraction run for PP polymer samples.
Figure 14B:
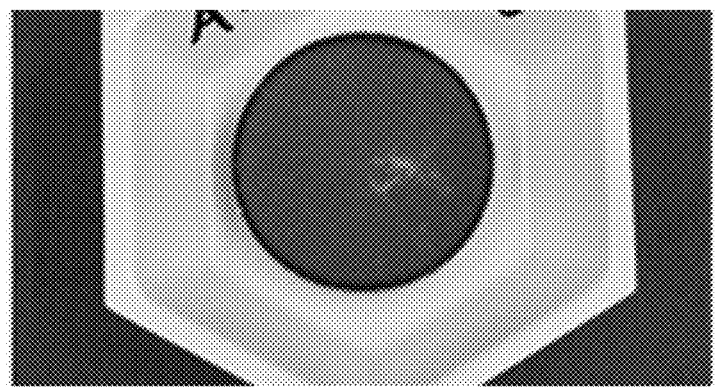
FIG. 14B is a photograph illustrating the color of a pellet of Sample PP before supercritical fluid extraction.
Figure 14C:
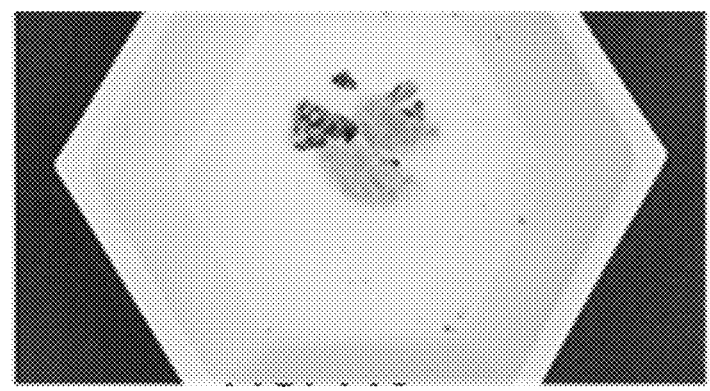
FIG. 14C is a photograph illustrating the color of a pellet of Sample PP after supercritical fluid extraction.
Figure 14D:
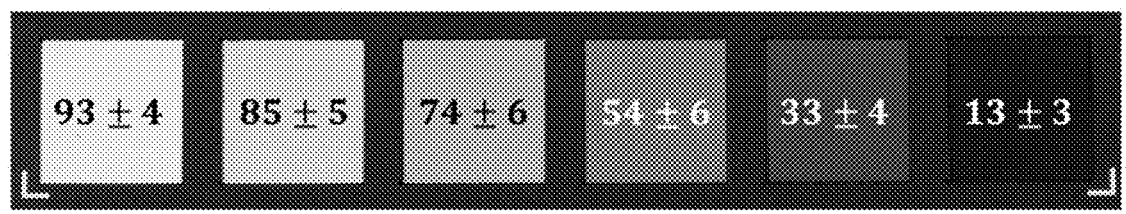
FIG. 14D is a photograph illustrating the ColorChecker used for color quantification of Sample PE1, Sample PE2, and Sample PP pellets.

SEM-BSE results of Supercritical Fluid Extraction extracted samples are shown in FIGS. 9B, 10B, and 11B. The extracted PEI sample (FIG. 9B) showed a visible reduction in metallic particles (shown as bright spots on SEM-BSE images), while PE2 (FIG. 10B) and PP (FIG. 11B) did not.

Results for aqua region digestion followed by Inductively Coupled Plasma Optical Emission Spectrometry are shown in Table 3. For PE1, three metals were identified, calcium (Ca), sodium (Na), and aluminum (Al). For PE2, seven metals were identified, Ca, sulfur (S), titanium (Ti), Na, magnesium (Mg), iron (Fe), and Al. For PP, six metals were identified, Ca, Mg, Na, Al, Fe, and Ti. Among all polymers, PP had the highest total inorganic impurity content of 1.1 wt %, PE1 had the second highest of 0.35 wt %, and PE2 had the lowest of 0.21 wt %. Ca was the major inorganic impurity in the polymers, with concentration level much higher than the other metals. This is likely due to the addition of fillers, most likely $Ca_2CO_3$, in the primary polymer production process. Point analysis of metal composition of selected regions of raw polymer samples PE1 and PP, identified during BSE, is included in Table 3.

TABLE 3

Metal Impurity Composition of Raw Polymer Samples

| | Polymer Sample Impurities (wt %) | |
|---|---|---|
| Element/Compound | PE1 | PP |
| C | 67.1 | 62.7 |
| O | 21.6 | 18.6 |
| Ca | Not detected | 18.3 |
| Cl | 3.8 | Not detected |
| K | 3.5 | Not detected |
| Na | 2.9 | Not detected |
| Mg | Not detected | 0.2 |
| Al | Not detected | 0.2 |

Several organic impurities were identified in the polymers via gas chromatography-mass spectrometry. The organic impurities found in polyethylene polymers, PE1 and PE2, consisted mostly of n-alkanes, from C8 to C31. The total n-alkane organic impurities measured was 1.21 wt % for PE1 and 1.22 wt % for PE2. The polypropylene polymer, PP, had a different impurity profile compared to polyethylene polymer.

The experimental design matrix and extraction efficiency results for Supercritical Fluid Extraction of polymer samples are shown in Tables 4-6. For PE1 and PP, $2_{IV}^{6-2}$ FFD was selected to investigate the relative effect of each of the six operating parameters. For PE2, $2_{III}^{6-3}$ FFD was selected. The accuracy of the three empirical models were verified by validation tests, allowing independent comparison of experimental results and model predicted results. The saturated $2_{III}^{6-3}$ and $2_{IV}^{6-2}$ organic extraction results were used to construct empirical extraction models which were subsequently verified with validation tests.

TABLE 4

Experimental Design Matrix & Operating Parameters for PE1

| | Operating Parameters | | | | | | | Inorganic Extraction Efficiency (%) | | |
|---|---|---|---|---|---|---|---|---|---|---|
| Run Number | Temp. (° C.) | Pressure (MPa) | Time (min) | Rate (rpm) | Ratio (wt/wt) | Meth (mol %) | Organic Extraction Efficiency (%) | Ca | Al | Na |
| 1 | 130 | 20.7 | 5 | 250 | 20 | 0 | 54 | 91 | 71 | 68 |
| 2 | 150 | 20.7 | 5 | 250 | 40 | 0 | 43 | 93 | 45 | 75 |
| 3 | 130 | 31 | 5 | 250 | 40 | 2 | 79 | 92 | 67 | 74 |
| 4 | 150 | 31 | 5 | 250 | 20 | 2 | 51 | 90 | 69 | 63 |
| 5 | 130 | 20.7 | 15 | 250 | 40 | 2 | 62 | 89 | 62 | 62 |
| 6 | 150 | 20.7 | 15 | 250 | 20 | 2 | 77 | 94 | 76 | 70 |
| 7 | 130 | 31 | 15 | 250 | 20 | 0 | 80 | 93 | 67 | 72 |

TABLE 4-continued

Experimental Design Matrix & Operating Parameters for PE1

| | Operating Parameters | | | | | Organic Extraction | Inorganic Extraction Efficiency (%) | | |
|---|---|---|---|---|---|---|---|---|---|
| Run Number | Temp. (° C.) | Pressure (MPa) | Time (min) | Rate (rpm) | Ratio (wt/wt) | Meth (mol %) | Efficiency (%) | Ca | Al | Na |

| Run Number | Temp. (° C.) | Pressure (MPa) | Time (min) | Rate (rpm) | Ratio (wt/wt) | Meth (mol %) | Organic Extraction Efficiency (%) | Ca | Al | Na |
|---|---|---|---|---|---|---|---|---|---|---|
| 8 | 150 | 31 | 15 | 250 | 40 | 0 | 72 | 86 | 68 | 71 |
| 9 | 130 | 20.7 | 5 | 750 | 20 | 2 | 51 | 93 | 69 | 74 |
| 10 | 150 | 20.7 | 5 | 750 | 40 | 2 | 45 | 91 | 71 | 62 |
| 11 | 130 | 31 | 5 | 750 | 40 | 0 | 58 | 82 | 56 | 65 |
| 12 | 150 | 31 | 5 | 750 | 20 | 0 | 81 | 94 | 66 | 75 |
| 13 | 130 | 20.7 | 15 | 750 | 40 | 0 | 46 | 89 | 60 | 68 |
| 14 | 150 | 20.7 | 15 | 750 | 20 | 0 | 37 | 95 | 82 | 68 |
| 15 | 130 | 31 | 15 | 750 | 20 | 2 | 68 | 93 | 69 | 75 |
| 16 | 150 | 31 | 15 | 750 | 40 | 2 | 74 | 92 | 65 | 73 |
| 17 | 140 | 25.9 | 10 | 500 | 30 | 1 | 84 | 95 | 54 | 79 |
| 18 | 140 | 25.9 | 10 | 500 | 30 | 1 | 84 | 93 | 63 | 67 |
| 19 | 140 | 25.9 | 10 | 500 | 30 | 1 | 82 | 93 | 63 | 67 |
| Validation 1 | 150 | 31.0 | 5 | 250 | 20 | 0 | 65 | 93 | 64 | 72 |
| Validation 2 | 150 | 20.7 | 15 | 750 | 20 | 0 | 62 | 94 | 51 | 78 |

TABLE 5

Experimental Design Matrix & Operating Parameters for PE2

| | Operating Parameters | | | | | | | Inorganic Extraction Efficiency (%) | | | | | | |
|---|---|---|---|---|---|---|---|---|---|---|---|---|---|---|
| Run Number | Temp. (° C.) | Pressure (MPa) | Time (min) | Rate (rpm) | Ratio (wt/wt) | Meth (mol %) | Organic Extraction Efficiency (%) | Ca | S | Ti | Na | Mg | Fe | Al |
| 1 | 135 | 23.325 | 7.5 | 625 | 35 | 1.5 | 41 | 30 | 40 | 59 | 4.8 | 40 | 24 | 21 |
| 2 | 145 | 23.325 | 7.5 | 375 | 25 | 1.5 | 92 | 8.6 | 48 | 52 | 11 | 0 | 18 | 15 |
| 3 | 135 | 28.475 | 7.5 | 375 | 35 | 0.5 | 81 | 20 | 39 | 18 | 0 | 29 | 30 | 8.1 |
| 4 | 145 | 28.475 | 7.5 | 625 | 25 | 0.5 | 68 | 19 | 24 | 59 | 0.78 | 0 | 0 | 14 |
| 5 | 135 | 23.325 | 12.5 | 625 | 25 | 0.5 | 41 | 0 | 27 | 50 | 0 | 0 | 0.7 | 0 |
| 6 | 145 | 23.325 | 12.5 | 375 | 35 | 0.5 | 77 | 23 | 55 | 41 | 0 | 34 | 38 | 8.8 |
| 7 | 135 | 28.475 | 12.5 | 375 | 25 | 1.5 | 72 | 67 | 56 | 100 | 37 | 66 | 0 | 76 |
| 8 | 145 | 28.475 | 12.5 | 625 | 35 | 1.5 | 47 | 25 | 50 | 22 | 12 | 32 | 25 | 0.3 |
| 9 | 140 | 25.9 | 10 | 500 | 30 | 1 | 62 | 0 | 47 | 67 | 14 | 0 | 0 | 0 |
| 10 | 140 | 25.9 | 10 | 500 | 30 | 1 | 57 | 7.9 | 51 | 51 | 0 | 6.5 | 30 | 0 |
| 11 | 140 | 25.9 | 10 | 500 | 30 | 1 | 53 | 34 | 43 | 59 | 0 | 52 | 0 | 24 |
| Validation | 145 | 23.325 | 7.5 | 375 | 35 | 0.5 | 49 | 31 | 48 | 47 | 0 | 41 | 39 | 3.9 |

TABLE 6

Experimental Design Matrix & Operating Parameters for PP

| | Operating Parameters | | | | | | Organic Extraction Efficiency (%) | Inorganic Extraction Efficiency (%) | | | | | |
|---|---|---|---|---|---|---|---|---|---|---|---|---|---|
| Run Number | Temp. (° C.) | Pressure (MPa) | Time (min) | Rate (rpm) | Ratio (wt/wt) | Meth (mol %) | | Ca | Mg | Na | Al | Fe | Ti |
| 1 | 175 | 27.6 | 15 | 150 | 20 | 0.75 | 89 | 11 | 18 | 70 | 64 | 20 | 39 |
| 2 | 185 | 31 | 10 | 250 | 10 | 0 | 37 | 0 | 11 | 66 | 64 | 31 | 83 |
| 3 | 165 | 24.1 | 10 | 50 | 10 | 0 | 63 | 0 | 0 | 44 | 47 | 0 | 0 |
| 4 | 175 | 27.6 | 15 | 150 | 20 | 0.75 | 90 | 36 | 42 | 94 | 84 | 54 | 93 |
| 5 | 165 | 24.1 | 20 | 250 | 30 | 0 | 97 | 0 | 0 | 56 | 61 | 9.5 | 66 |
| 6 | 185 | 24.1 | 10 | 50 | 30 | 0 | 37 | 0 | 0 | 65 | 50 | 12 | 0 |
| 7 | 165 | 31 | 10 | 250 | 30 | 0 | 95 | 46 | 46 | 88 | 69 | 49 | 61 |
| 8 | 165 | 31 | 20 | 250 | 10 | 1.5 | 93 | 13 | 20 | 85 | 68 | 37 | 55 |
| 9 | 185 | 31 | 10 | 50 | 10 | 1.5 | 58 | 0 | 0 | 33 | 35 | 0 | 29 |
| 10 | 165 | 31 | 10 | 50 | 30 | 1.5 | 89 | 0 | 0 | 67 | 48 | 12 | 0 |
| 11 | 185 | 31 | 20 | 250 | 30 | 1.5 | 67 | 1.9 | 15 | 61 | 63 | 19 | 0 |
| 12 | 175 | 27.6 | 15 | 150 | 20 | 0.75 | 87 | 18 | 31 | 84 | 69 | 48 | 55 |

TABLE 6-continued

Experimental Design Matrix & Operating Parameters for PP

| Run Number | Operating Parameters | | | | | | Organic Extraction Efficiency | Inorganic Extraction Efficiency (%) | | | | | |
|---|---|---|---|---|---|---|---|---|---|---|---|---|---|
| | Temp. (° C.) | Pressure (MPa) | Time (min) | Rate (rpm) | Ratio (wt/wt) | Meth (mol %) | (%) | Ca | Mg | Na | Al | Fe | Ti |
| 13 | 165 | 31 | 20 | 50 | 10 | 0 | 87 | 0 | 3.6 | 42 | 52 | 24 | 0 |
| 14 | 165 | 24.1 | 20 | 50 | 30 | 1.5 | 91 | 0 | 14 | 61 | 61 | 39 | 40 |
| 15 | 185 | 24.1 | 20 | 250 | 10 | 0 | 87 | 0.3 | 19 | 62 | 60 | 38 | 40 |
| 16 | 185 | 24.1 | 10 | 250 | 30 | 1.5 | 75 | 0 | 0 | 59 | 58 | 21 | 35 |
| 17 | 165 | 24.1 | 10 | 250 | 10 | 1.5 | 65 | 0 | 8.3 | 61 | 60 | 32 | 37 |
| 18 | 185 | 31 | 20 | 50 | 30 | 0 | 90 | 0 | 0 | 58 | 52 | 32 | 0 |
| 19 | 185 | 24.1 | 20 | 50 | 10 | 1.5 | 44 | 0 | 59 | 62 | 59 | 26 | 28 |
| Validation 1 | 185 | 31 | 10 | 0 | 10 | 1.5 | 43 | 17 | 31 | 69 | 67 | 44 | 45 |
| Validation 2 | 165 | 24.1 | 10 | 0 | 10 | 0 | 45 | 64 | 60 | 88 | 76 | 71 | 32 |

PE1 demonstrated the highest inorganic extraction results, with average extraction efficiencies from the 19 runs of 91% Ca, 65% Al, and 69% Na. While PE2 showed a lower inorganic concentration compared to PE1, it had a more complex inorganic impurities profile containing S, Ti, Mg, and Fee in addition to Ca, Al, and Na. The average inorganic extraction efficiencies from the 11 runs of PE2 were 21% Ca, 7% Na, 15% Al, 24% Mg, 15% Fe, 53% Ti, and 44% S. The average inorganic extraction efficiencies from the 19 runs of PP were 7% Ca, 64% Na, 59% Al, 12% Mg, 27% Fe, and 33% Ti.

All polymer samples increased (improved) in lightness on the CIELAB color scale as shown in FIGS. 12A-C, 13A-C, and 14A-D. In an exemplary run (18) for PP, the extracted polymer increased in lightness by 40 units. The average post-extraction lightness value for PP was 24. In an exemplary run (1) for PE2, the extracted polymer increased in lightness by 30 units. The average post-extraction lightness value for PE2 was 26. In exemplary runs (9 and 16) for PE1, the extracted polymer increased in lightness by 13 units. The average post-extraction lightness value for PE1 was 11. It was anticipated that PP and PE2 would show the greatest improvement in color lightness following extraction as the pre-extraction lightness value of each polymer sample was lower (indicating darker sample color) and therefore greater improvements would be observed as compared to PE1 which had a higher (indicating a lighter sample color) pre-extraction lightness value.

Figure 15A:
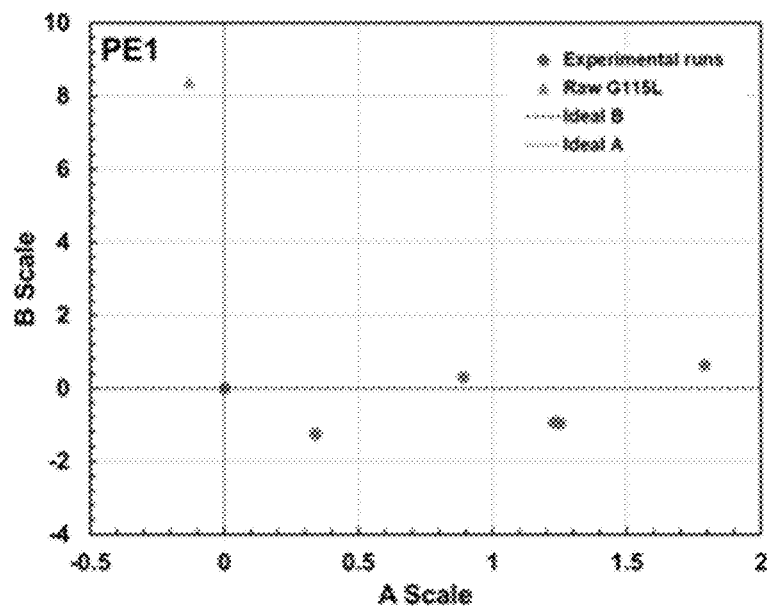
FIG. 15A is a graph illustrating AB color space of PE1 polymer samples.
Figure 15B:
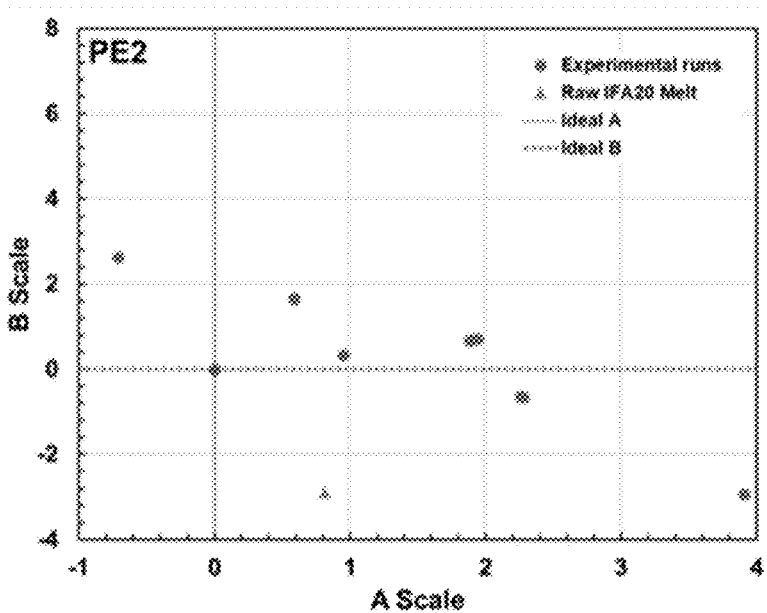
FIG. 15B is a graph illustrating AB color space of PE2 polymer samples.
Figure 15C:
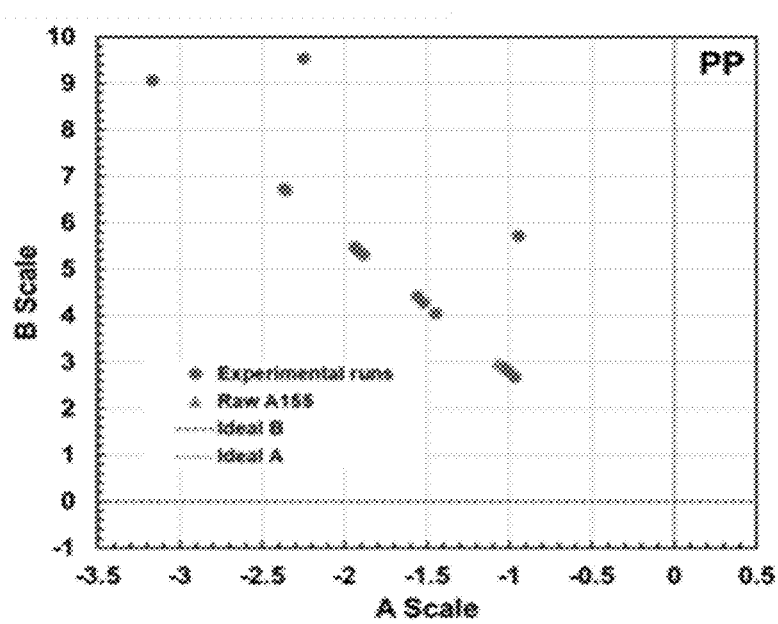
FIG. 15C is a graph illustrating AB color space of PP polymer samples.

FIGS. 15A-C illustrate AB color space results for post-Supercritical Fluid Extraction polymer samples. PP showed more than 5 positive shifts on the B scale, while PE1 and PE2 showed less than 5 values on the A and B color space, indicating bias is minimized for green-red and blue-yellow components.

Figure 16:
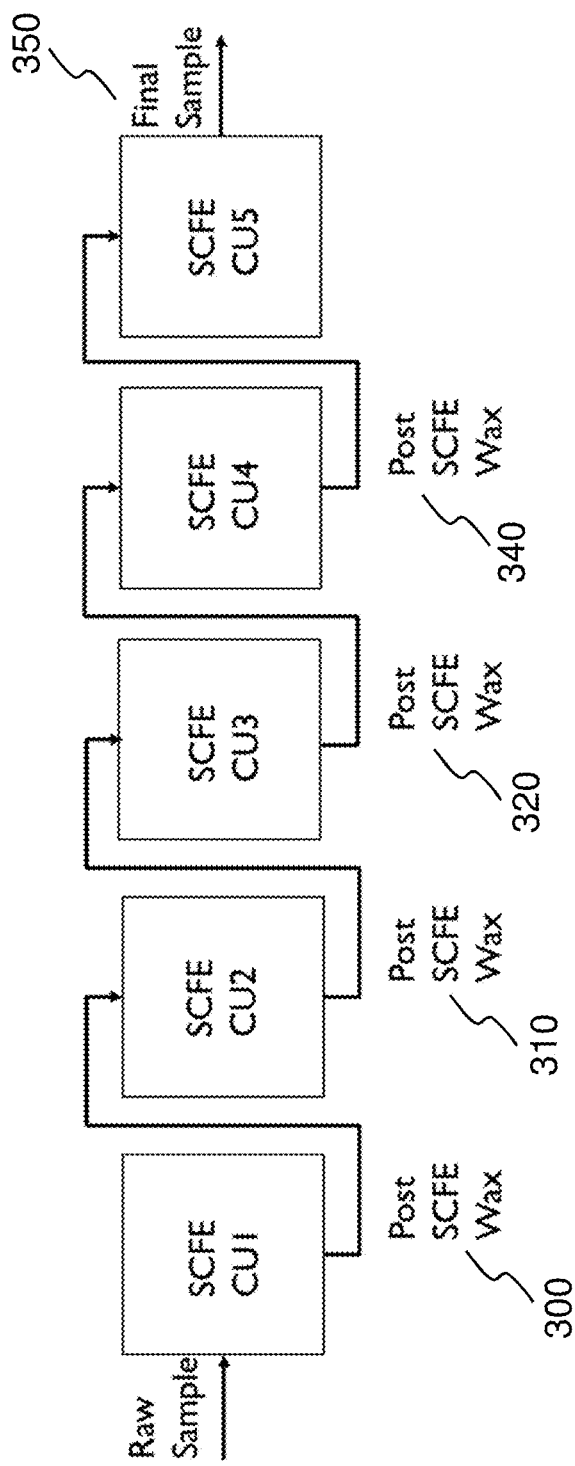
FIG. 16 is a flowchart illustrating sample selection between Supercritical Fluid Extraction runs for color ultimatum analysis of extracted polymer samples.
Figure 17A:
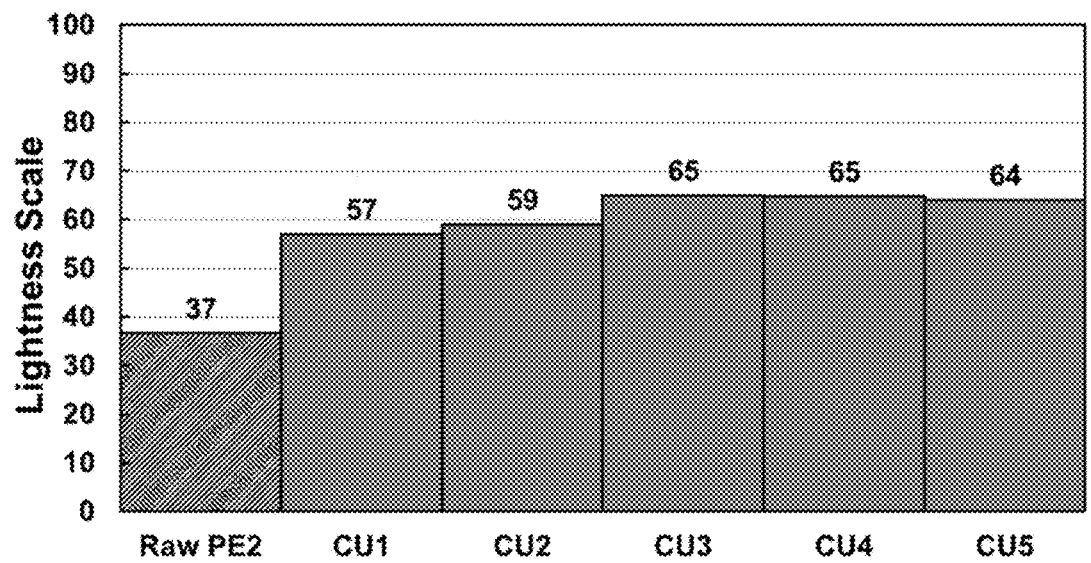
FIG. 17A is a bar graph illustrating color ultimatum results of extracted PE2 polymer samples.
Figure 17B:
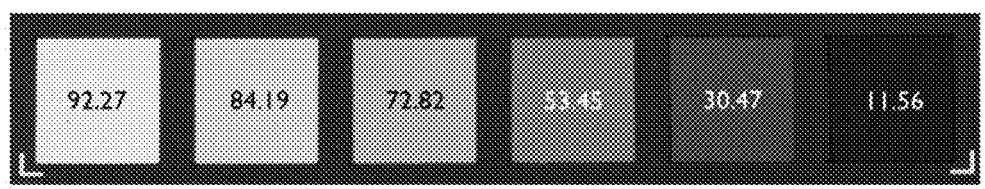
FIG. 17B is a photograph illustrating the ColorChecker used for color ultimatum quantification.
Figure 17C:
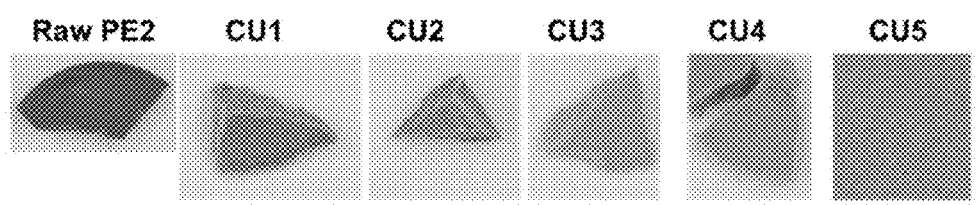
FIG. 17C is a photograph illustrating the color change in pellets of PE2 polymer after each Supercritical Fluid Extraction run.
Figure 18A:
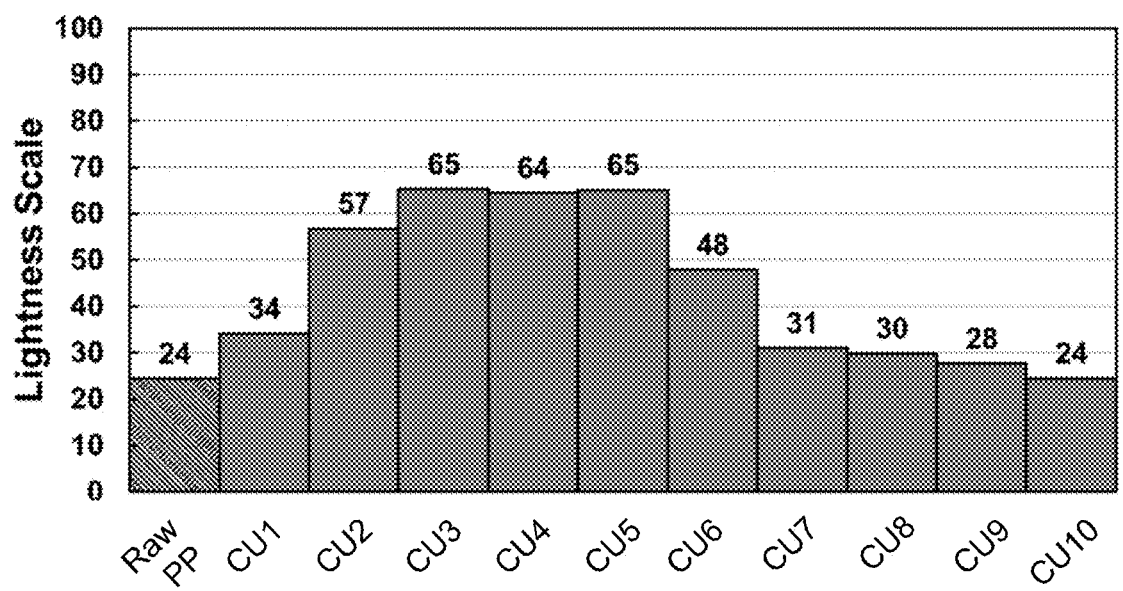
FIG. 18A is a bar graph illustrating color ultimatum results of extracted PP polymer samples.
Figure 18B:
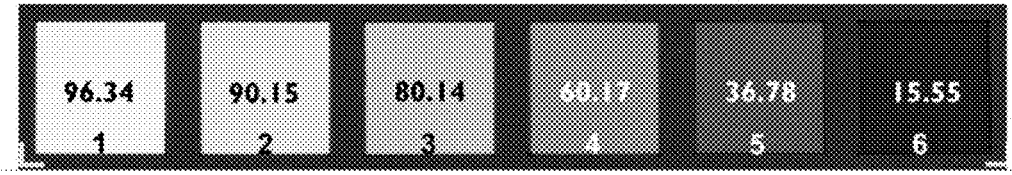
FIG. 18B is a photograph illustrating the ColorChecker used for color ultimatum quantification.
Figure 18C:
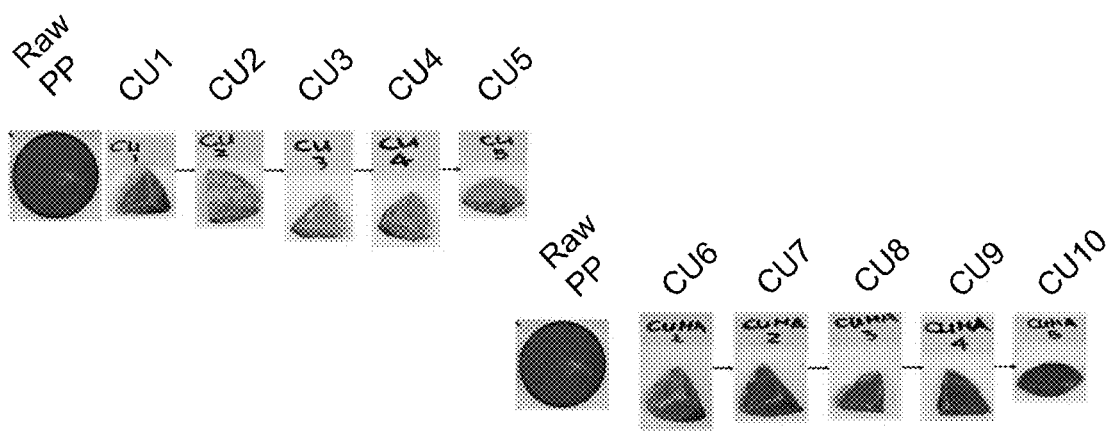
FIG. 18C is a photograph illustrating the color change in pellets of PP polymer after each Supercritical Fluid Extraction run.
Figure 19A:
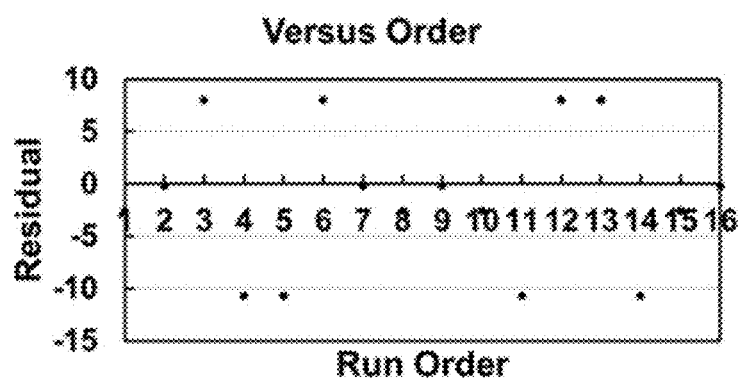
FIG. 19A illustrates a versus order plot for extracted PE1 polymer samples.
Figure 19B:
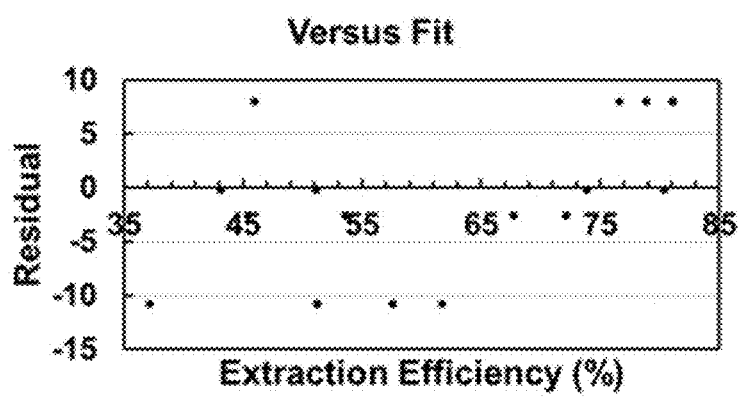
FIG. 19B illustrates a versus fit plot for extracted PE1 polymer samples.
Figure 20A:
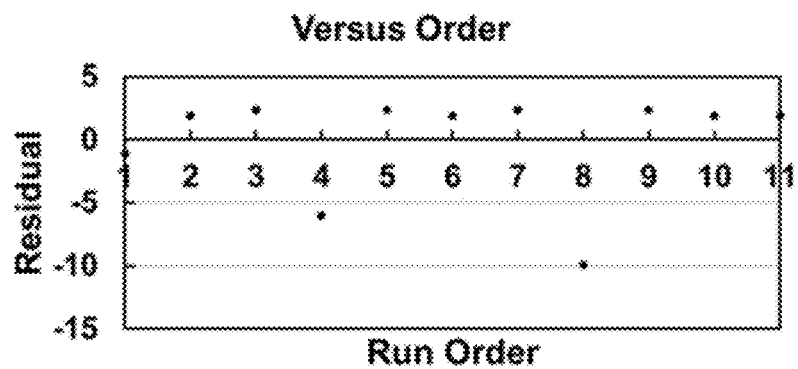
FIG. 20A illustrate a versus order plot for extracted PE2 polymer samples.
Figure 20B:
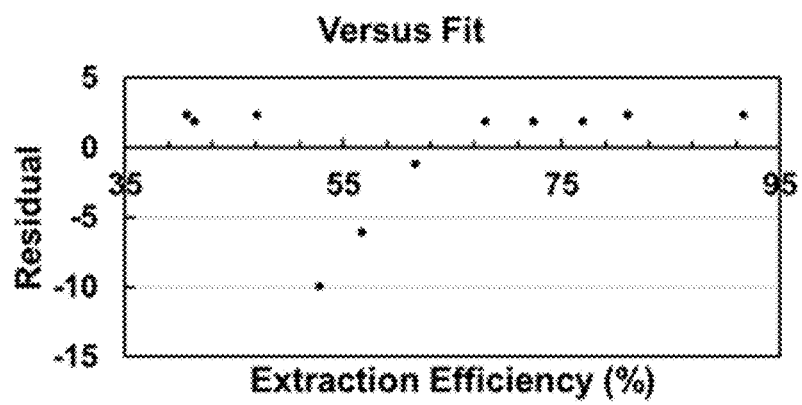
FIG. 20B illustrates a versus fit plot for extracted PE2 polymer samples.
Figure 21A:
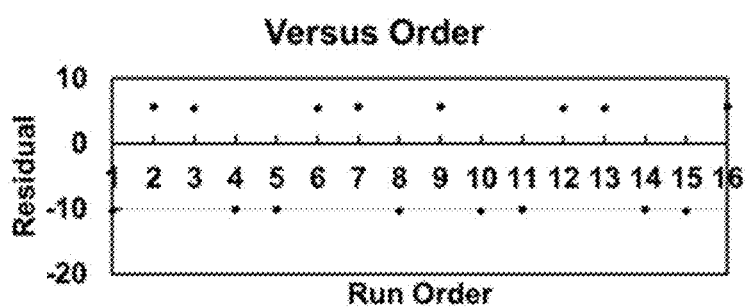
FIG. 21A illustrate a versus order plot for extracted PP polymer samples.
Figure 21B:
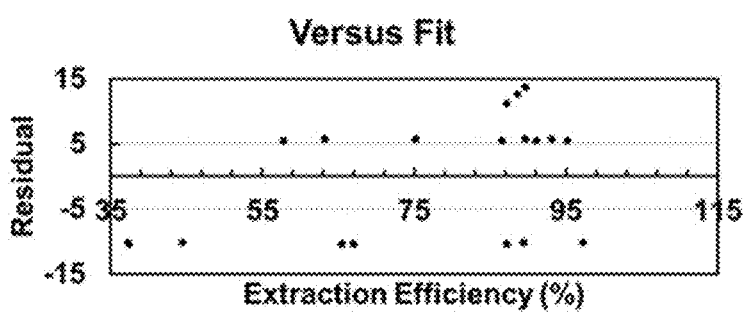
FIG. 21B illustrates a versus fit plot for extracted PP polymer samples.
Figure 22A:
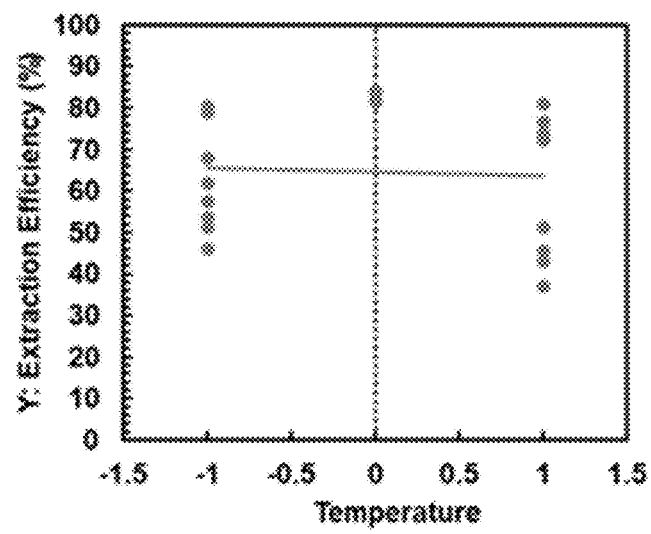
FIG. 22A is a visual plot of the code factor effect for the temperature operating parameter for PE1 polymer samples. The line represents the linear fit of the extraction data for temperature.
Figure 22B:
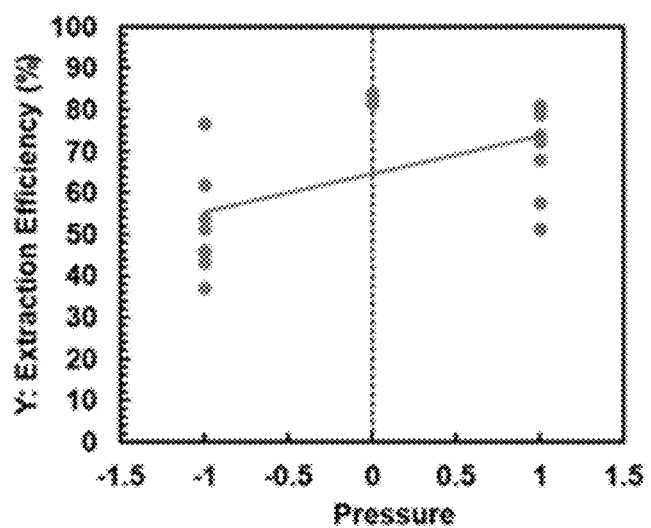
FIG. 22B is a visual plot of the code factor effects for the pressure operating parameter for PE1 polymer samples. The line represents the linear fit of the extraction data for pressure.
Figure 22C:
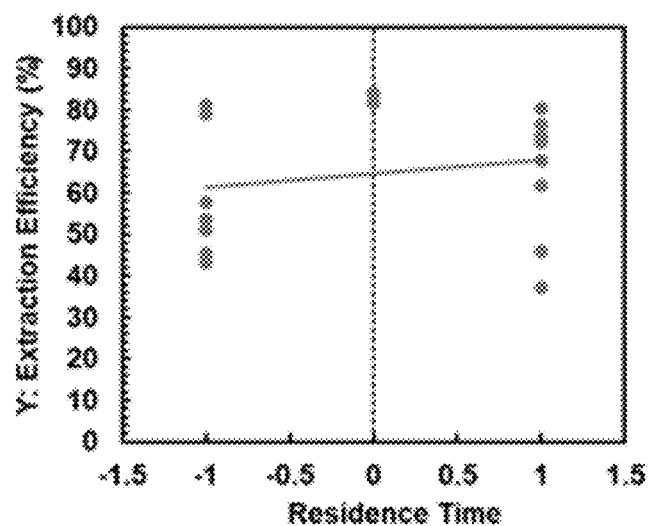
FIG. 22C is a visual plot of the code factor effects for the residence time (duration) operating parameter for PE1 polymer samples. The line represents the linear fit of the extraction data for residence time.
Figure 22D:
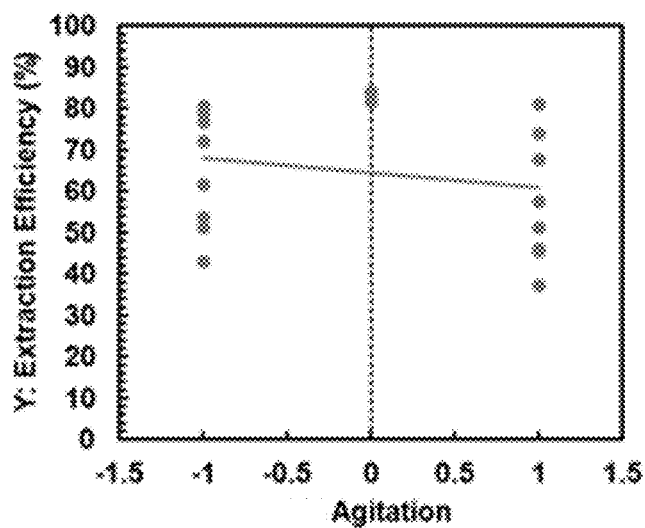
FIG. 22D is a visual plot of the code factor effects for the agitation rate operating parameter for PE1 polymer samples. The line represents the linear fit of the extraction data for agitation rate.
Figure 22E:
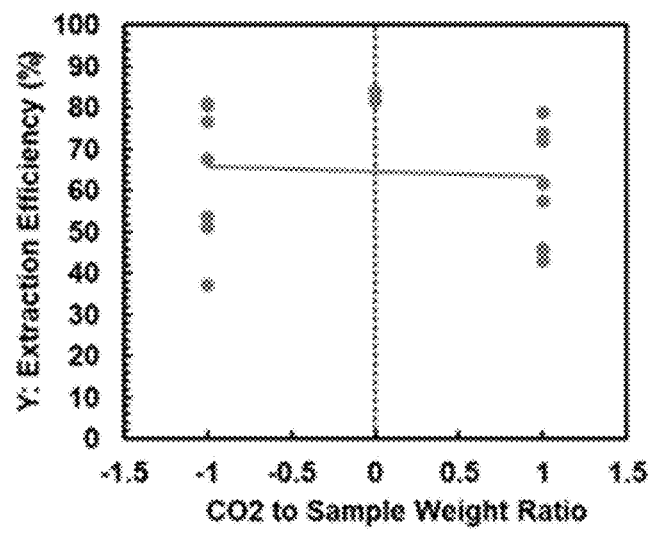
FIG. 22E is a visual plot of the code factor effects for the $CO_2$:sample weight operating parameter for PE1 polymer samples. The line represents the linear fit of the extraction data for $CO_2$:sample weight.
Figure 22F:
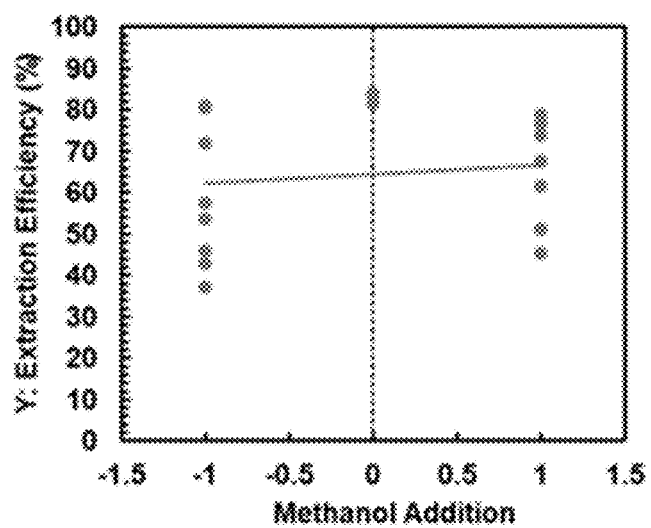
FIG. 22F is a visual plot of the code factor effects for the methanol addition operating parameter for PE1 polymer samples. The line represents the linear fit of the extraction data for methanol addition.
Figure 23A:
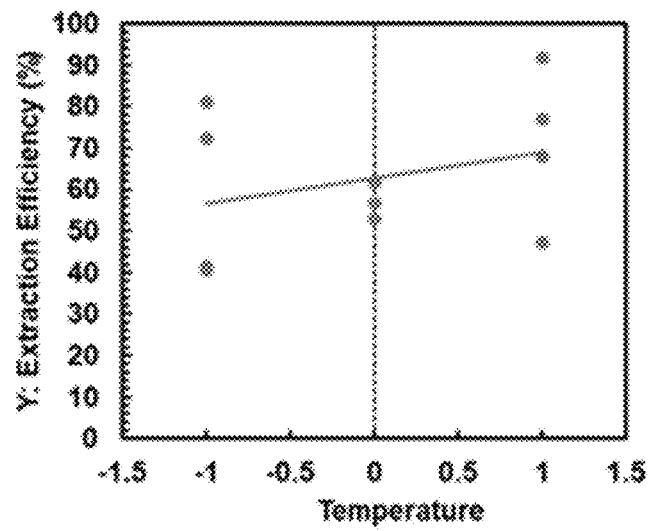
FIG. 23A is a visual plot of the code factor effect for the temperature operating parameter for PE2 polymer samples. The line represents the linear fit of the extraction data for temperature.
Figure 23B:
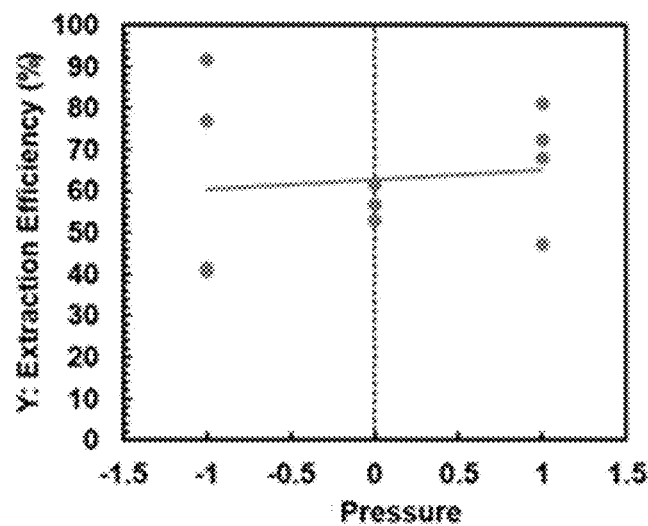
FIG. 23B is a visual plot of the code factor effects for the pressure operating parameter for PE2 polymer samples. The line represents the linear fit of the extraction data for pressure.
Figure 23C:
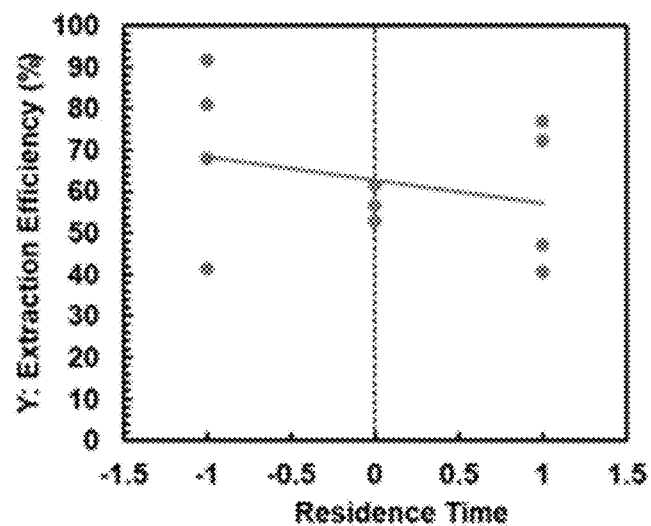
FIG. 23C is a visual plot of the code factor effects for the residence time (duration) operating parameter for PE2 polymer samples. The line represents the linear fit of the extraction data for residence time.
Figure 23D:
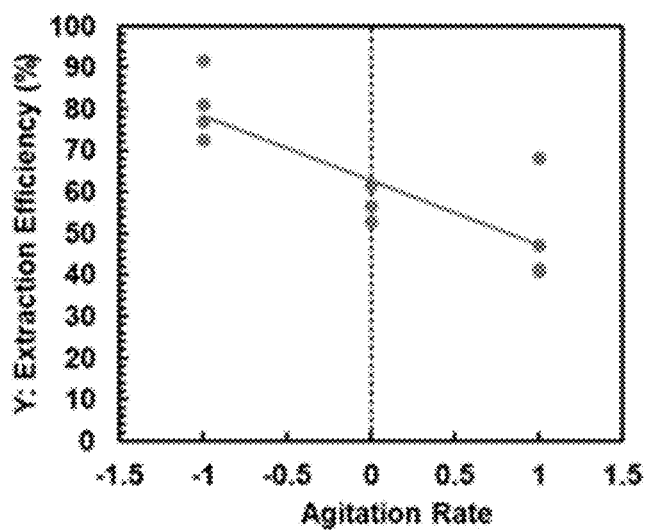
FIG. 23D is a visual plot of the code factor effects for the agitation rate operating parameter for PE2 polymer samples. The line represents the linear fit of the extraction data for agitation rate.
Figure 23E:
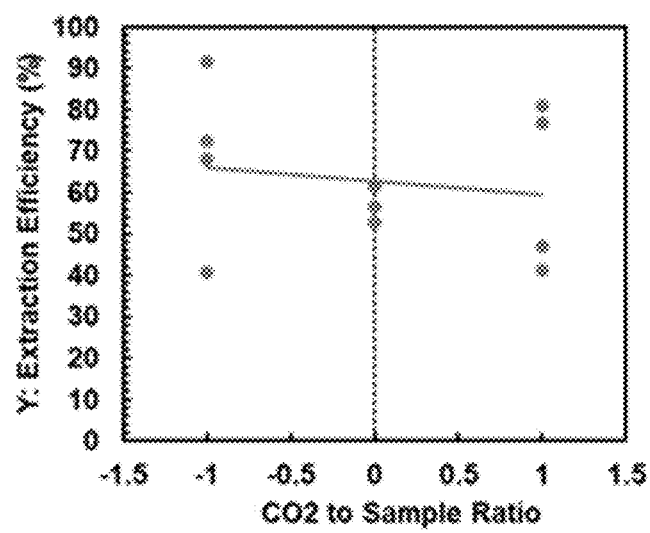
FIG. 23E is a visual plot of the code factor effects for the $CO_2$:sample weight operating parameter for PE2 polymer samples. The line represents the linear fit of the extraction data for $CO_2$:sample weight.
Figure 23F:
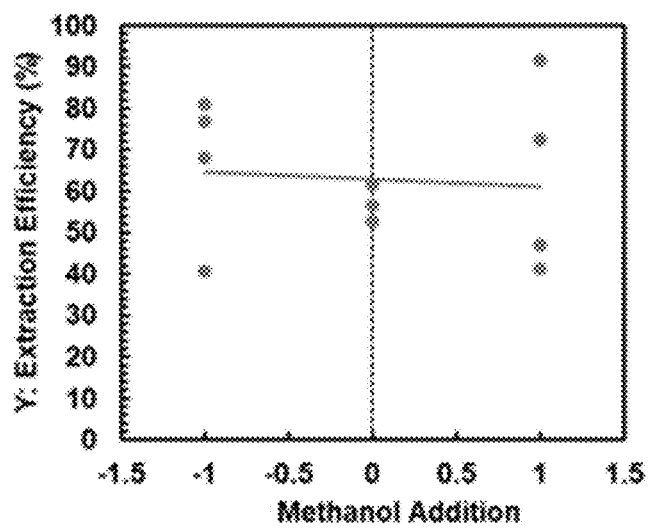
FIG. 23F is a visual plot of the code factor effects for the methanol addition operating parameter for PE2 polymer samples. The line represents the linear fit of the extraction data for methanol addition.
Figure 24A:
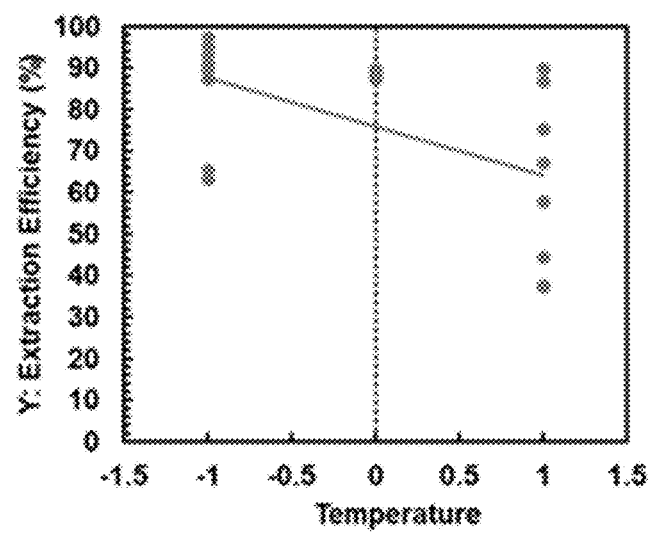
FIG. 24A is a visual plot of the code factor effect for the temperature operating parameter for PP polymer samples. The line represents the linear fit of the extraction data for temperature.
Figure 24B:
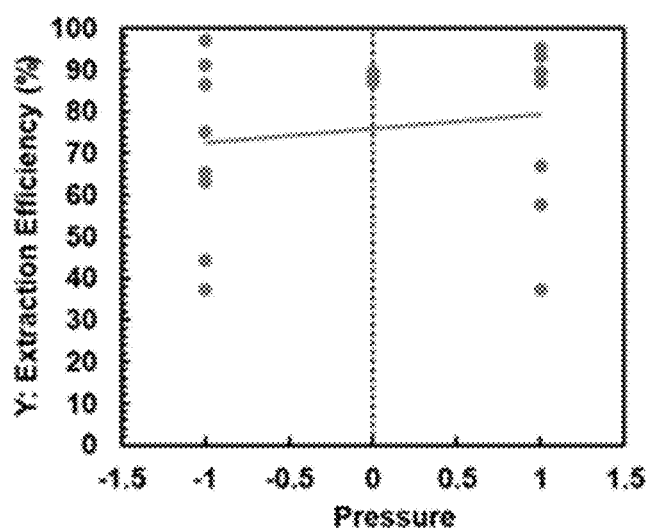
FIG. 24B is a visual plot of the code factor effects for the pressure operating parameter for PP polymer samples. The line represents the linear fit of the extraction data for pressure.
Figure 24C:
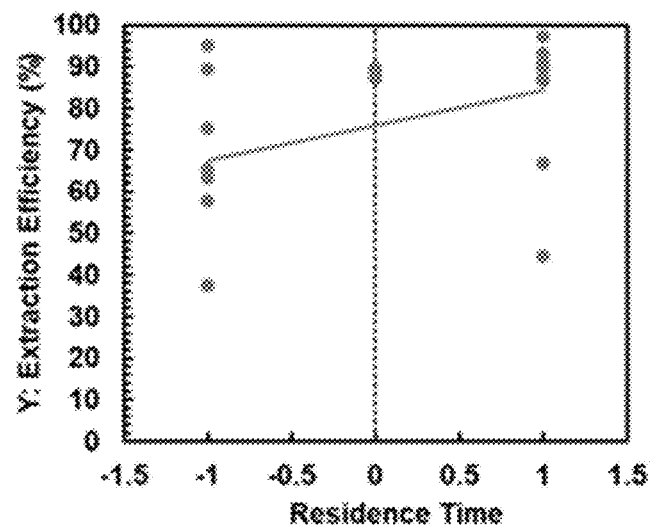
FIG. 24C is a visual plot of the code factor effects for the residence time (duration) operating parameter for PP polymer samples. The line represents the linear fit of the extraction data for residence time.
Figure 24D:
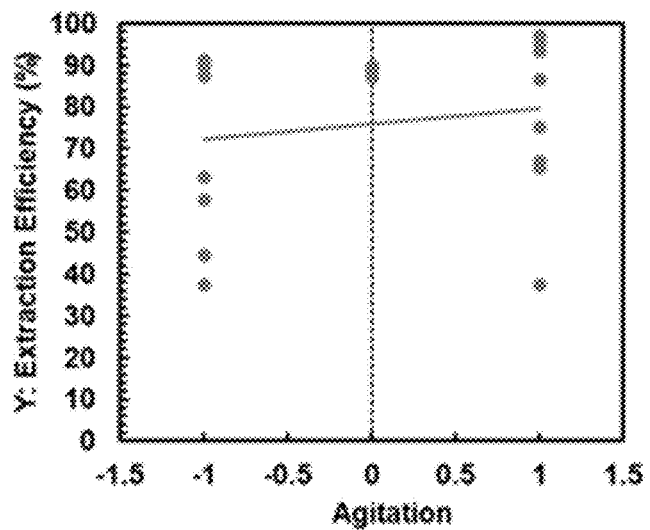
FIG. 24D is a visual plot of the code factor effects for the agitation rate operating parameter for PP polymer samples. The line represents the linear fit of the extraction data for agitation rate.
Figure 24E:
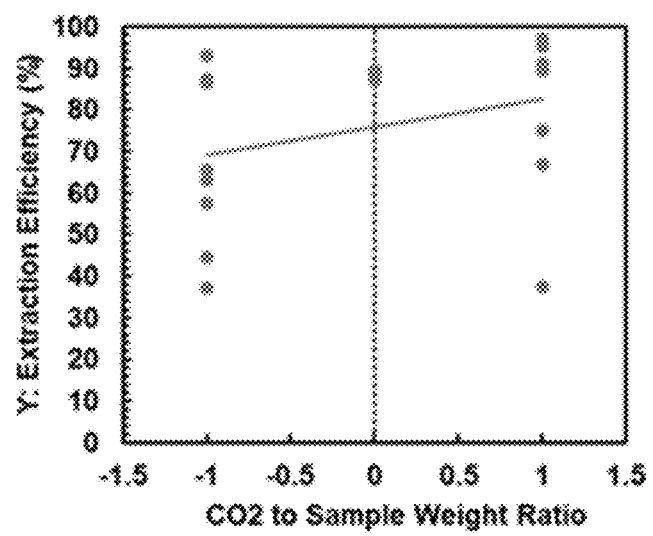
FIG. 24E is a visual plot of the code factor effects for the $CO_2$:sample weight operating parameter for PP polymer samples. The line represents the linear fit of the extraction data for $CO_2$:sample weight.
Figure 24F:
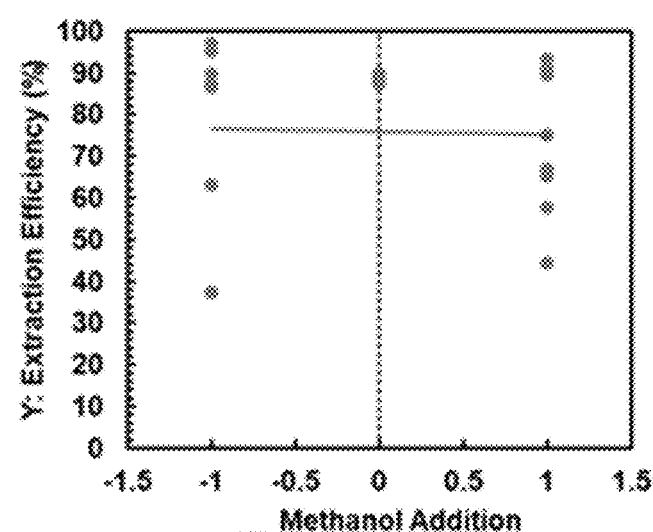
FIG. 24F is a visual plot of the code factor effects for the methanol addition operating parameter for PP polymer samples. The line represents the linear fit of the extraction data for methanol addition.

To determine the technical limit of Supercritical Fluid Extraction on color improvement, color ultimatum runs (CU) were conducted on PE2 and PP polymer samples using the operating parameters detailed in Table 7 and Table 8. Five Supercritical Fluid Extraction runs were performed with samples taken between runs for color ultimatum analysis. The optimum condition identified from empirical modeling was used for each operating parameter except $CO_2$:S ratio which was varied. As shown in FIG. 16 post-Supercritical Fluid Extraction polymer sample 300 was taken after run #1 (CU1), post-Supercritical Fluid Extraction polymer sample 310 was taken after run #2 (CU2), post-Supercritical Fluid Extraction polymer sample 320 was taken after run #3 (CU3), post-Supercritical Fluid Extraction polymer sample 340 was taken after run #4 (CU4), and post-Supercritical Fluid Extraction polymer sample 350 was taken after run #5 (CU5). Raw PP polymer samples were run under both low (Runs 1-5) and high (Runs 6-10) agitation conditions.

These data indicate that Supercritical Fluid Extraction removes organic and inorganic impurities from the polyethylene and polypropylene raw polymer samples resulting in improved color lightness. Furthermore, these data demonstrate Supercritical Fluid Extraction can be used to improve the purity of polyethylene and polypropylene polymers produced via the depolymerization of plastic feedstock by removing organic and inorganic impurities.

TABLE 7

Operating Parameters to Measure Color Ultimatum of PE2

| | Operating Parameter | | | | | |
|---|---|---|---|---|---|---|
| CU Run # | Temperature (° C.) | Pressure (MPa) | Time (min) | Agitation (rpm) | $CO_2$:S ratio | Methanol Addition (mol %) |
| 1 | 145 | 23.325 | 7.5 | 375 | 10:1 | 1.5 |
| 2 | 145 | 23.325 | 7.5 | 375 | 12:1 | 1.5 |
| 3 | 145 | 23.325 | 7.5 | 375 | 14:1 | 1.5 |
| 4 | 145 | 23.325 | 7.5 | 375 | 17.5:1 | 1.5 |
| 5 | 145 | 23.325 | 7.5 | 375 | 25:1 | 1.5 |

TABLE 8

Operating Parameters to Measure Color Ultimatum of PP

| | Operating Parameter | | | | | |
|---|---|---|---|---|---|---|
| CU Run # | Temperature (° C.) | Pressure (MPa) | Time (min) | Agitation (rpm) | $CO_2$:S ratio | Methanol Addition (mol %) |
| 1 | 165 | 24.1 | 20 | 50 | 5:1 | 0 |
| 2 | 165 | 24.1 | 20 | 50 | 7:1 | 0 |
| 3 | 165 | 24.1 | 20 | 50 | 12:1 | 0 |
| 4 | 165 | 24.1 | 20 | 50 | 15:1 | 0 |
| 5 | 165 | 24.1 | 20 | 50 | 19:1 | 0 |
| 6 | 165 | 24.1 | 20 | 250 | 5:1 | 0 |
| 7 | 165 | 24.1 | 20 | 250 | 6.5:1 | 0 |
| 8 | 165 | 24.1 | 20 | 250 | 9:1 | 0 |
| 9 | 165 | 24.1 | 20 | 250 | 11:1 | 0 |
| 10 | 165 | 24.1 | 20 | 250 | 14:1 | 0 |

CU results are shown in FIGS. 17A-C and 18A-C. In exemplary runs (3 and 4) for PE2, the extracted polymer increased in lightness by 28 units. In exemplary runs (3 and 5) for PP, the extracted polymer increased in lightness by 41 units. High agitation (Runs 6-10) significantly reduced the lightness improvements for PP polymer. For both PE2 and PP, color improvements peaked after Run 3, with no further improvement observed in subsequent runs.

To further test the robustness of Supercritical Fluid Extraction on polymer purification, organic extraction analysis was performed on CU1 (run #2) and CU5 (run #5) for PP post-Supercritical Fluid Extraction samples. Organic extraction efficiencies of 51% and 96% were obtained for CU1 and CU5, respectively.

These data further demonstrate that these Supercritical Fluid Extraction operating parameters can be used to improve polymer purity by removing organic impurities. When applied to an industrial setting, rather than purifying polyethylene and or polypropylene polymer derived via depolymerization of plastic feedstock through multiple rounds of Supercritical Fluid Extraction, a single, continuous extraction process could be implemented.

Empirical Extraction Modeling

Multiple Linear Least Squares Regression was used to determine the relative effects of primary and secondary-order interactions. FIGS. 19A-B, 20A-B, and 21A-B illustrate the ordered charts of model parameters with model accuracy as the insertion. The estimated $(1-\alpha)$ confidence interval was set as the exact length of the error bars. Data points for PE1 (FIGS. 19A-B) and PP (FIGS. 21A-B) are distributed randomly on the positive and negative quadrants of the x-axis, confirming the data validity of empirical model building. Data points for PE2 (FIGS. 20A-B) fall close to the x-axis and are biased toward the positive quadrant. The three data points that fall in the negative quadrant were center point runs, indicating a slight quadratic effect.

FIGS. 22A-F illustrate a set of graphs depicting the code factor effects for each of six test parameters: temperature (FIG. 22A), pressure (FIG. 22B), residence time (FIG. 22C), agitation rate (FIG. 22D), $CO_2$:S ratio (FIG. 22E), and methanol addition (FIG. 22F) for PE1 polymer samples. Each line represents the linear fit of the extraction data for the test parameter.

FIGS. 23A-F illustrate a set of graphs depicting the code factor effects for each of six test parameters: temperature (FIG. 23A), pressure (FIG. 23B), residence time (FIG. 23C), agitation rate (FIG. 23D), $CO_2$:S ratio (FIG. 23E), and methanol addition (FIG. 23F) for PE2 polymer samples. Each line represents the linear fit of the extraction data for the test parameter.

FIGS. 24A-F illustrate a set of graphs depicting the code factor effects for each of six test parameters: temperature (FIG. 24A), pressure (FIG. 24B), residence time (FIG. 24C), agitation rate (FIG. 24D), $CO_2$:S ratio (FIG. 24E), and methanol addition (FIG. 24F) for PP polymer samples. Each line represents the linear fit of the extraction data for the test parameter.

Figure 25A:
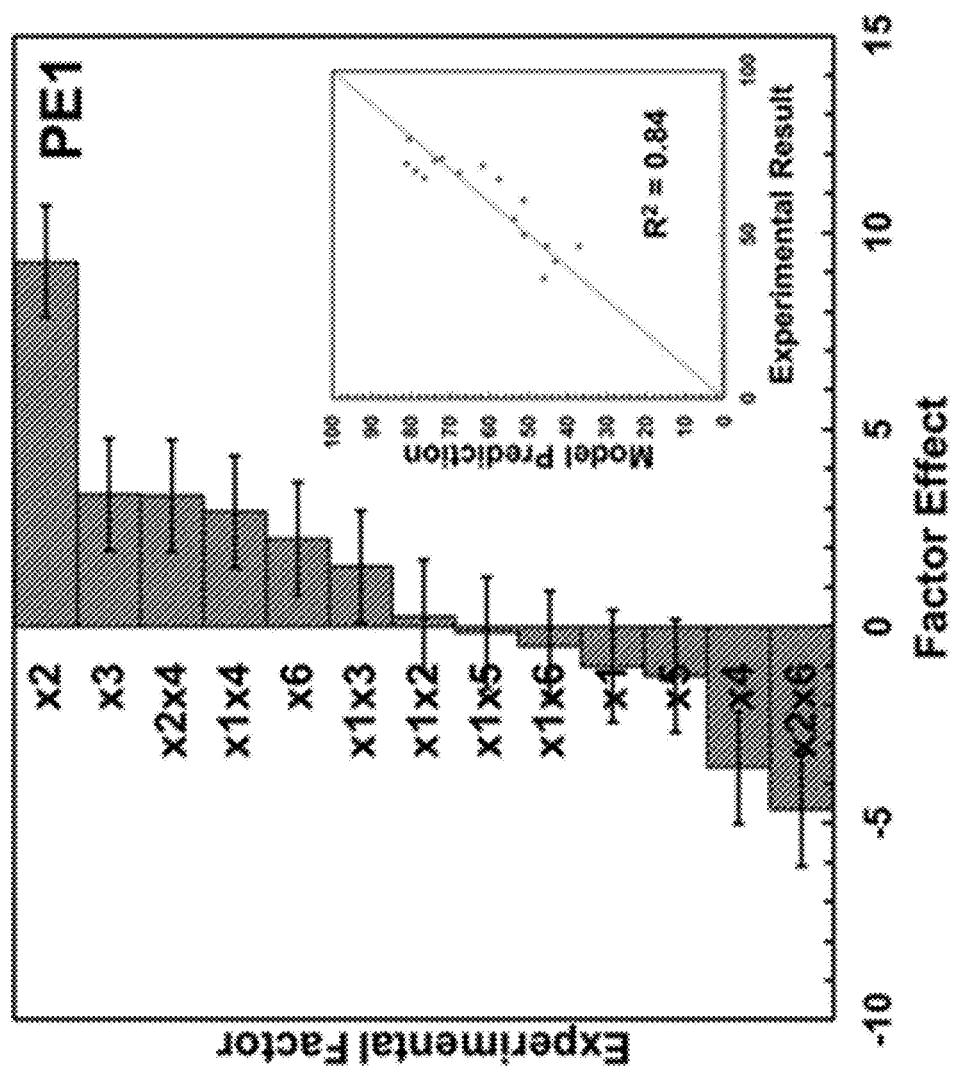
FIG. 25A is an ordered chart of factor effect coefficients for the empirical extraction models of PE1 polymer samples. The error bars represent the (1-α) confidence interval for each of the factors (n=3, t-distribution). The insert panel indicates the correlation between the empirical model and the experimental data, and the coefficient of determination for the empirical model.
Figure 25B:
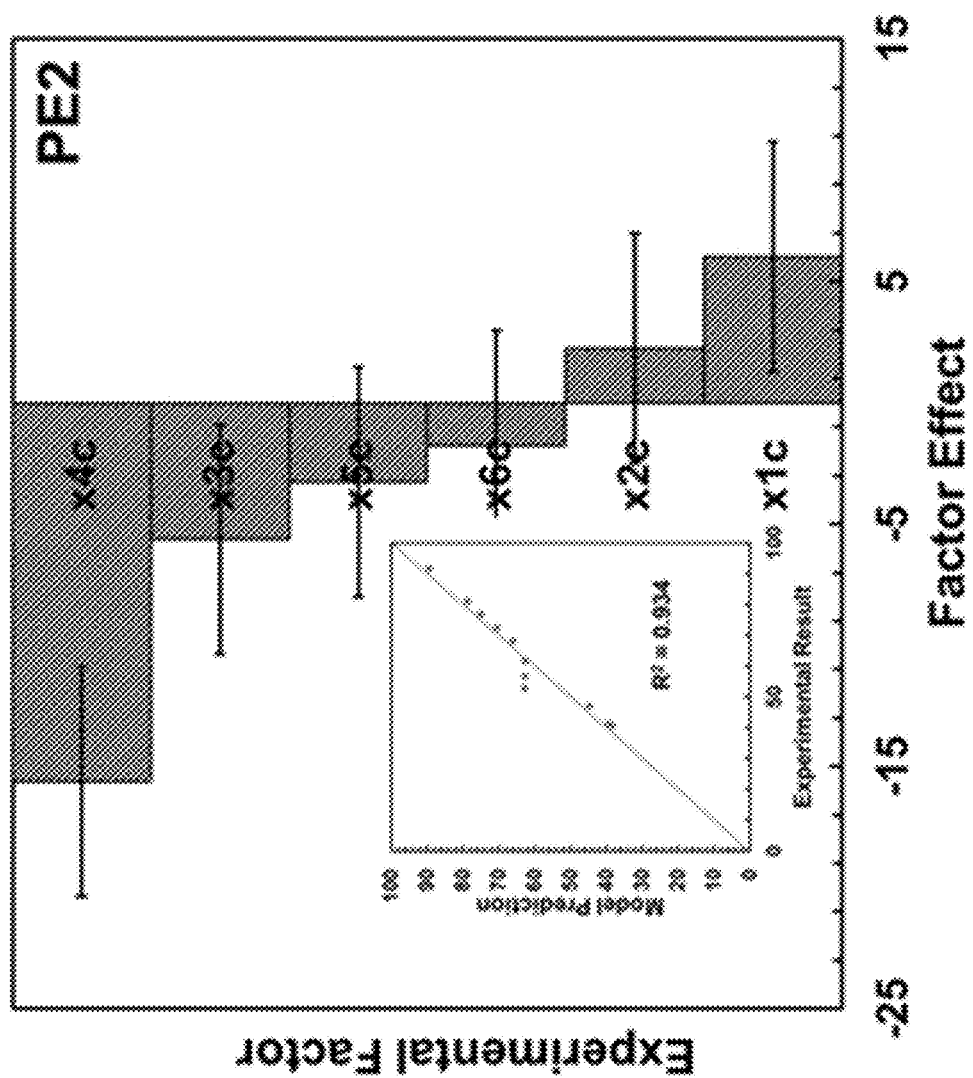
FIG. 25B is an ordered chart of factor effect coefficients for the empirical extraction models of PE2 polymer samples. The error bars represent the (1-α) confidence interval for each of the factors (n=3, t-distribution). The insert panel indicates the correlation between the empirical model and the experimental data, and the coefficient of determination for the empirical model.
Figure 25C:
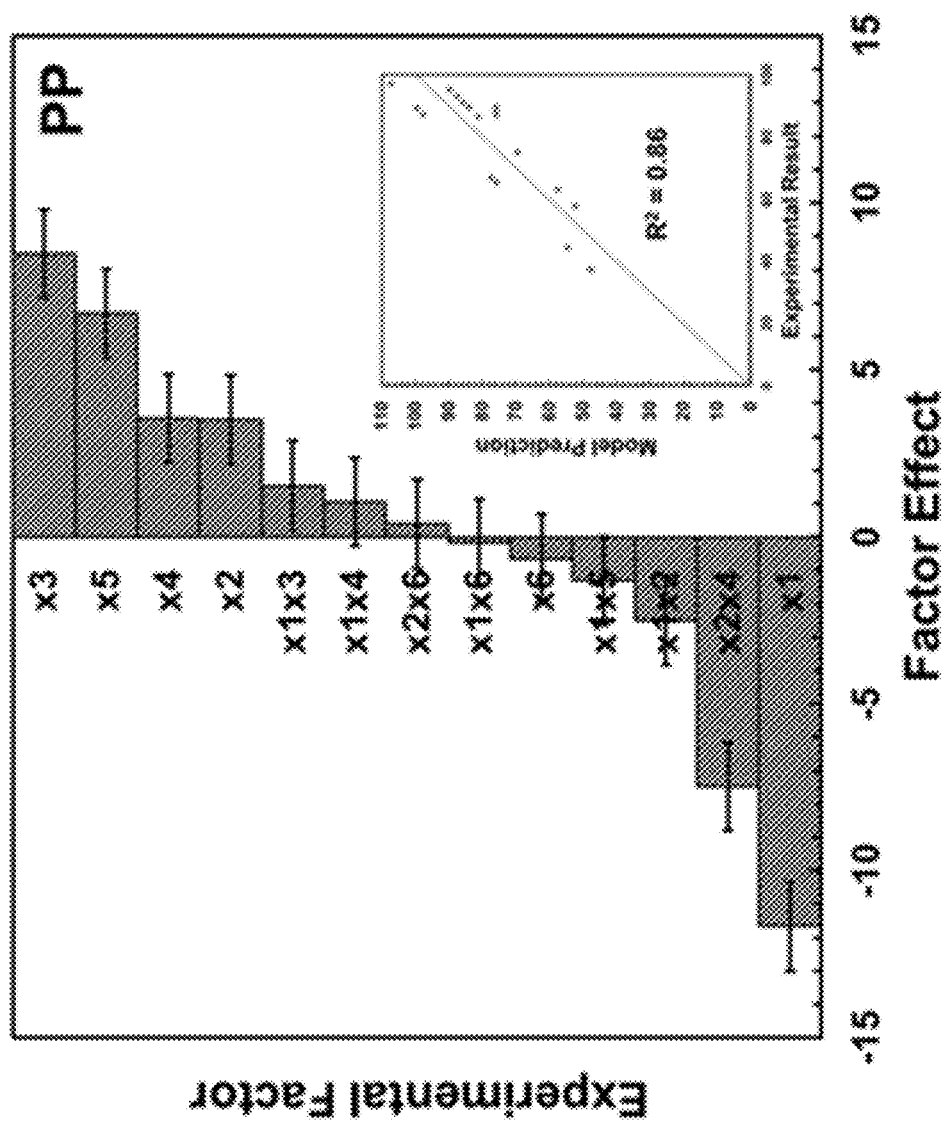
FIG. 25C is an ordered chart of factor effect coefficients for the empirical extraction models of PP polymer samples. The error bars represent the (1-α) confidence interval for each of the factors (n=3, t-distribution). The insert panel indicates the correlation between the empirical model and the experimental data, and the coefficient of determination for the empirical model.

FIGS. 25A-C are ordered charts of factor effect coefficients for the empirical extraction models for each polymer sample, PE1 (FIG. 25A), PE2 (FIG. 25B), and PP (FIG. 25C). The error bars represent the $(1-\alpha)$ confidence interval for each of the factors (n=3, t-distribution). The insert panels indicate the correlation between the empirical models and the experimental data, and the coefficient of determination for the models. (c=confounded with secondary order interactions).

For PE1, the following operating parameters from most to least significant are as follows: pressure, duration, and methanol addition. Each of these parameters improved extraction. Increasing the operating pressure effectively increases the density of $CO_2$. Therefore, the solvation power of supercritical $CO_2$ is increased allowing for improved removal of organic and inorganic impurities which are insoluble and chemically inert in the melted polymer during extraction. Lengthening the extraction run time (duration) can improve extraction efficiency by ensuring dissolution goes to completion. The addition of methanol to Supercritical Fluid Extraction increases the polarity of $CO_2$. As $CO_2$ polarity increases, its ability to bind and extract organic impurities, particularly larger n-alkanes, increases.

These data also identified high agitation rates to negatively affect extraction. This is likely due to the high shear environment weakening the CH—O interaction between the $CO_2$ solvent and organic impurities. As for second order interactions, simultaneously increasing pressure and agitation or simultaneously increasing temperature and agitation rate can increase organic extraction. Simultaneously increasing pressure and methanol addition were identified as a second order negatively significant parameter, that is, organic extraction was decreased.

For PE2, temperature was identified as the only operating parameter that improved extraction. This is likely due to the increased operating temperature ensuring organic impurities remain in the supercritical phase throughout extraction. These data also showed that the agitation rate and duration of extraction can negatively affect organic extraction. Specifically, this suggests a longer extraction time may not be beneficial under high temperature conditions as a longer duration can allow organic impurities to migrate out of the extraction solvent and back into the polymer matrix. Under the conditions described, polymerization can also occur, increasing the molecular weight or chain length of organic compounds and, in turn, decreasing their solubility in supercritical $CO_2$.

For PP, the following operating parameters from most to least significant are as follows: duration, $CO_2$:Sample ($CO_2$:S) ratio, agitation rate, and pressure. Each of these parameters improved extraction. For duration of extraction, 20 minutes was enough for most organic impurities to be extracted from the polymer samples into the supercritical phase. PP has a more complex organic impurity profile than PE1 and PE2. Specifically, the increased number of unsaturated organic compounds and alcohols increases the polarity of polypropylene polymer samples. During extraction, a longer extraction time is needed to establish sufficient bonding between the non-polar $CO_2$ extraction solvent and the polar organic impurities. Increasing the $CO_2$ to sample ratio enhances organic extraction by increasing the $CO_2$ solvation power and degree of solvation during extraction. Agitation rate had a positive effect on the extraction of polypropylene polymer likely due to enhanced interaction between the $CO_2$ solvent and organic compounds. Generally, the agitation rate should facilitate the degree of diffusion of organic compounds inside the melted polymer to create a local concentration gradient at the melted polymer and supercritical interphase. This promotes dissolution of organics into the supercritical phase. As described above, increasing the operating pressure effectively increases the solvation power of supercritical $CO_2$.

These data also identified temperature to negatively affect extraction. Polypropylene polymer has a higher melting point, therefore requiring a greater extraction temperature as compared to polyethylene polymer. This increased temperature would effectively decrease $CO_2$ density. Therefore, the solvation power of the $CO_2$ solvent is lowered causing lower extraction of organic impurities from the polypropylene polymer samples.

The following conclusions regarding operating parameters for supercritical extraction of organic and inorganic impurities from polymers derived via depolymerization of plastic feedstock can be made:

increasing pressure can improve extraction of organic impurities;

setting reaction temperatures higher than the melting point of the polymer being extracted, to balance the kinetics and vapor pressure of organic compounds with the density needed by the $CO_2$ solvent for solvation, can improve extraction of organic impurities;

extending the duration of extraction under high temperature conditions can result in organic compounds in the supercritical phase migrating back into the polymer matrix;

shorter extraction durations can avoid, or at least reduce, undesired side reactions, including but not limited to, thermally degrading the polymer;

an intermediate agitation rate can reduce the shear environment to maintain CH—O bonds between the $CO_2$ solvent and organic compounds while providing enough turbulence to create a local concentration gradient at the melted polymer and supercritical interphase;

increasing the $CO_2$ to sample ratio can improve extraction of organic impurities; and using methanol as a co-solvent can improve extraction of organic impurities from a polyethylene polymer.

A set of preferred operating parameters, and the resulting extraction efficiencies, for each polymer are detailed in Table 9. For PE1 and PP, the model-predicted preferred operating parameters matched the actual preferred operating parameters. For PE2, the actual preferred operating parameters were different than the model-predicted preferred operating parameters. This was due to the resolution three design in which primary factors are confounded with second order interactions. Specifically, secondary interactions possess a greater disturbance to the empirical model, as high as 17% (difference between model-predicted and actual extraction efficiency). Therefore, the actual preferred operating parameters are concluded to be better suited for Supercritical Fluid Extraction of PE2 polymer. The extraction efficiencies are 81% for PE1, 92% for PE2, and 97% for PP.

TABLE 9

Preferred Operating Parameters
(Model Predicted & Actual) & Extraction Efficiency

| Sample | Operating Parameter | | | | | | Extraction Efficiency | | |
|---|---|---|---|---|---|---|---|---|---|
| | Temp (° C.) | Pressure (MPa) | Duration (min) | Agitation Rate (rpm) | CO2:S ratio (wt/wt) | Methanol Addition (mol %) | Model Predicted (%) | Actual Organic (%) | Actual Inorganic (%) |
| PE1 Model-Predicted Preferred Conditions | 130 | 31 | 15 | 250 | 20 | 0 | 80 | 81 | Ca 93 Al 67 Na 72 |
| PE1 Actual Preferred Conditions | 130 | 31 | 15 | 250 | 20 | 0 | 80 | 81 | Ca 93 Al 6 Na 72 |
| PE2 Model-Predicted Preferred Conditions | 145 | 28.5 | 12.5 | 375 | 25 | 0.5 | 97 | 80 | Ca 8.6 S 48 Ti 52 Na 11, Mg 0 Fe 24 Al 0 |
| PE2 Actual Preferred Conditions | 145 | 23.3 | 7.5 | 375 | 25 | 1.5 | 90 | 92 | Ca 5 S 45 Ti 25 Na 0, Mg 0 Fe 2 Al 0 |
| PP Model-Predicted Preferred Conditions | 165 | 24.1 | 20 | 250 | 30 | 0 | 107 | 97 | Ca 0 Mg 0 Na 56 Al 61 Fe 9.5 Ti 65 |
| PP Actual Preferred Conditions | 165 | 24.1 | 20 | 250 | 30 | 0 | 107 | 97 | Ca 0 Mg 0 Na 56 Al 61 Fe 9.5 Ti 65 |

Figure 26A:
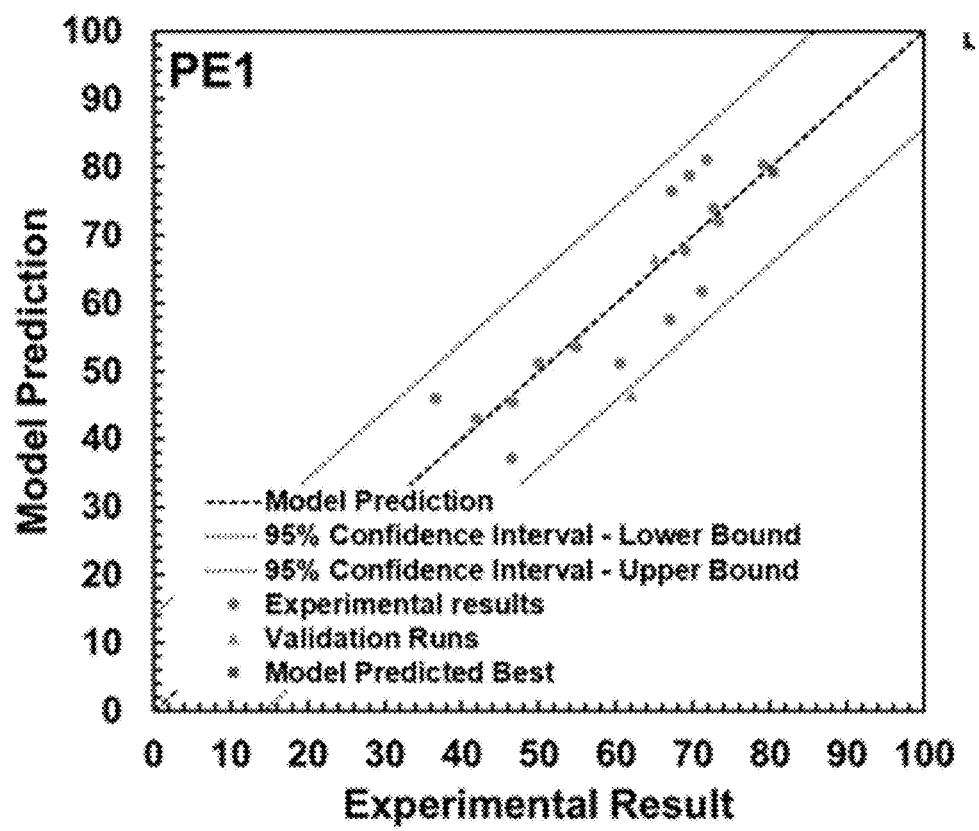
FIG. 26A is a graph illustrating the empirical model validation for PE1 polymer samples. The validation run experimental results are plotted against the corresponding model predictions.
Figure 26B:
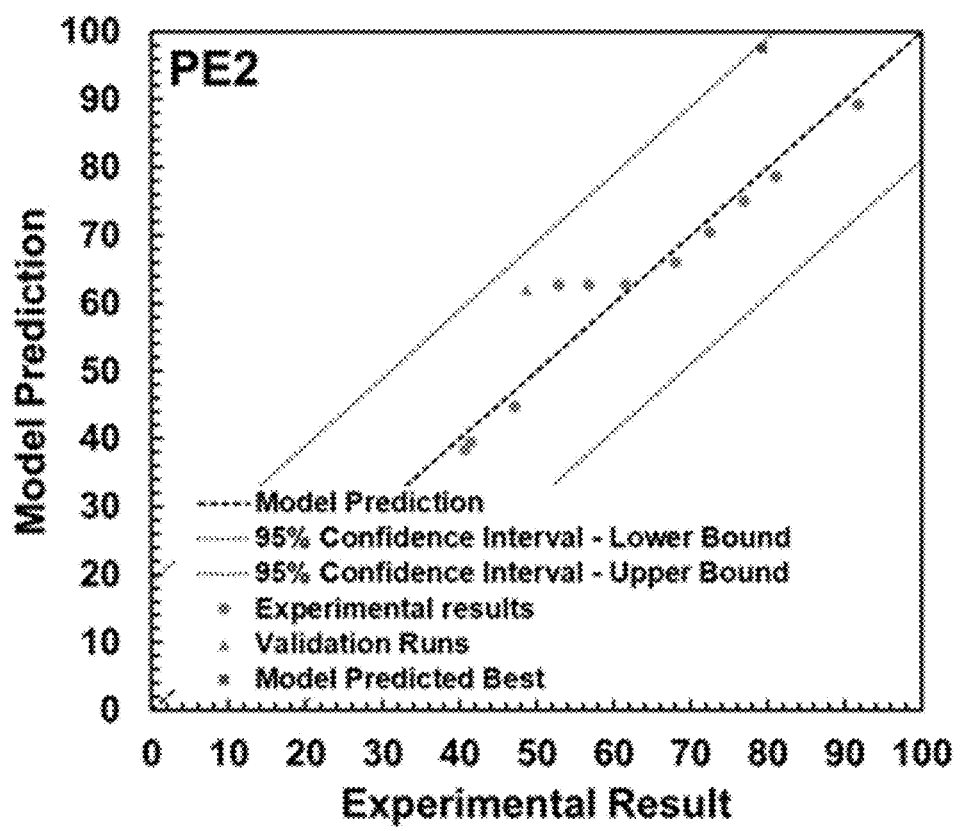
FIG. 26B is a graph illustrating the empirical model validation for PE2 polymer samples. The validation run experimental results are plotted against the corresponding model predictions.
Figure 26C:
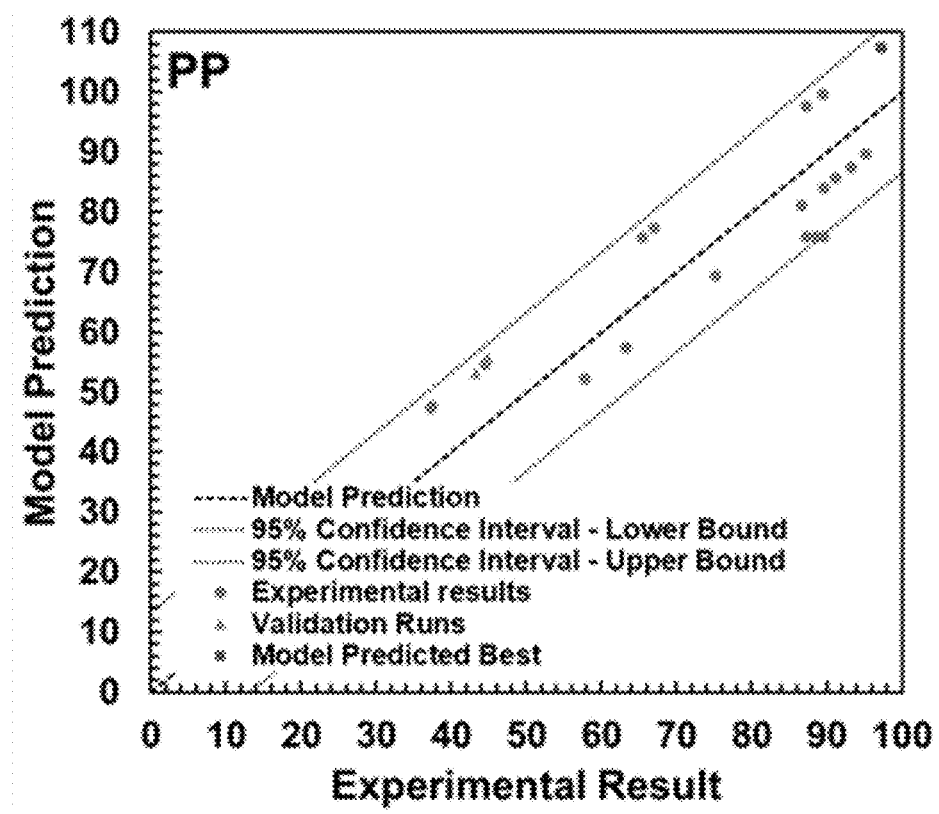
FIG. 26C is a graph illustrating the empirical model validation for PP polymer samples. The validation run experimental results are plotted against the corresponding model predictions.

FIGS. 26A-C illustrate results of additional validations of empirical model predictability. The validation run experimental results are plotted against the corresponding model prediction for PE1 (FIG. 26A), PE2 (FIG. 26B), and PP (FIG. 26C). Except validation run #2 for PE1, values fall within the 95% confidence interval.

In some embodiments, these data provide preferred operating parameters for supercritical fluid extraction of organic impurities from polyethylene and/or polypropylene polymers derived via depolymerization of plastic feedstock.

Morphology of Extracted Polymer Samples

As shown in the SEM images of FIGS. 6C, 7C, and 8C, the surface morphology of extracted polymer samples PE1 (FIG. 6C), PE2 (FIG. 7C), and PP (FIG. 8C) become more porous following Supercritical Fluid Extraction, with a large various in pore size from ~10-100 µm. All extracted polymers showed increased leveling in depth on the surface with pores distributed throughout compared to raw polymer samples. These data suggest that organic and inorganic impurities migrated out of the polymer matrix and into the supercritical phase during extraction resulting in a more porous matrix.

Mechanism of Organic Impurity Extraction Using Supercritical $CO_2$

Figure 27:
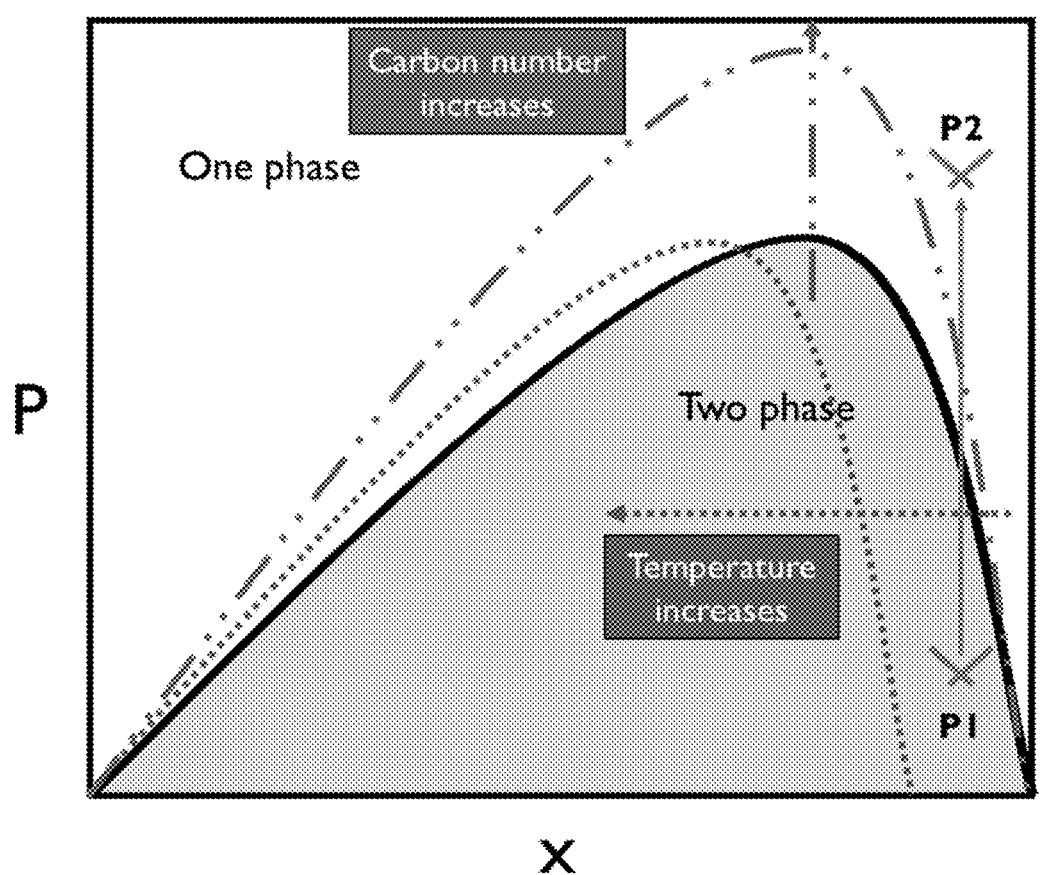
FIG. 27 is a schematic depicting an n-alkane and supercritical $CO_2$ phase diagram to examine the effect of temperature (dotted line), pressure (P), and carbon number (dashed line) on the phase equilibrium curve.

FIG. 27 is a schematic depicting an n-alkane and supercritical $CO_2$ phase diagram to examine the effect of temperature (dotted line), pressure (P), and carbon number (dashed line) on the phase equilibrium curve. At a high mole fraction of $CO_2$ (x), such as 0.99, increasing temperature shifts the two-phase line to the left and promotes retention of n-alkanes in supercritical $CO_2$ as one phase. As pressure increases, the two-phase line does not change, while the position of the condition will move up vertically to ensure n-alkanes stay in supercritical $CO_2$ as one phase. For carbon number increase, the two-phase lines shifts upward indicating when carbon number of n-alkane increases, pressure, temperature, or both must increase to ensure organic impurities and supercritical $CO_2$ remain in one phase.

Figure 28A:
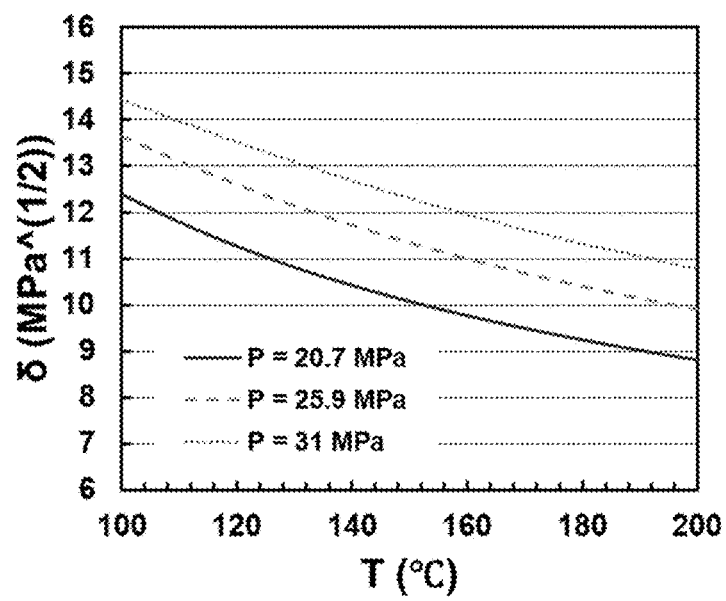
FIG. 28A is a graph illustrating the effect of temperature on Hildebrand solubility parameter of $CO_2$ above critical point.

FIGS. 28A,B-34A,B illustrate changes in various parameters on Hildebrand solubility parameter ($\delta$) (equation 4) of $CO_2$ above critical point. As the carbon number of n-alkane increases, $\delta$ does not vary significantly.

$$\delta = \sqrt{\frac{\Delta H_v - RT}{V_m}} \qquad \text{Equation 5}$$

Figure 28B:
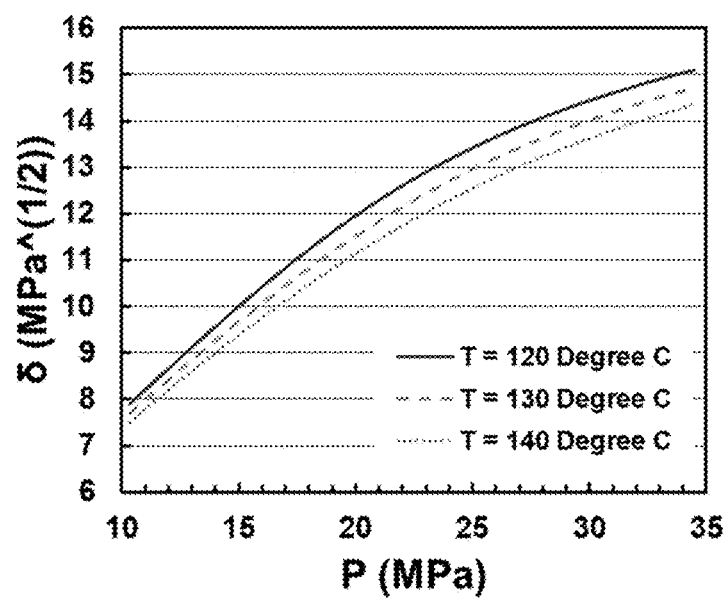
FIG. 28B is a graph illustrating the effect of pressure on Hildebrand solubility parameter of $CO_2$ above critical point.

FIGS. 28A-B are graphs illustrating the effect of temperature and pressure on Hildebrand solubility parameter of $CO_2$ above critical point. As pressure increases, $\delta_{CO2}$ increases. As temperature increases, $\delta_{CO2}$ decreases.

Figure 29A:
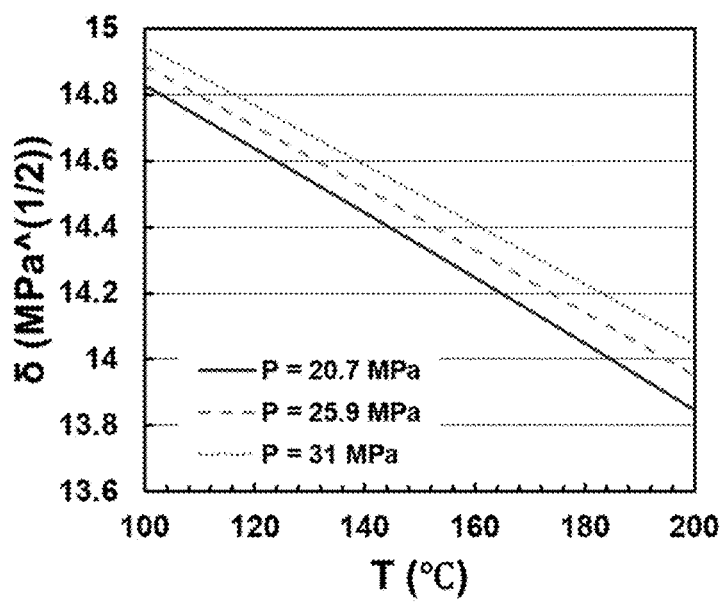
FIG. 29A is a graph illustrating the effect of temperature on Hildebrand solubility parameter of n-octane above $CO_2$ critical point.
Figure 29B:
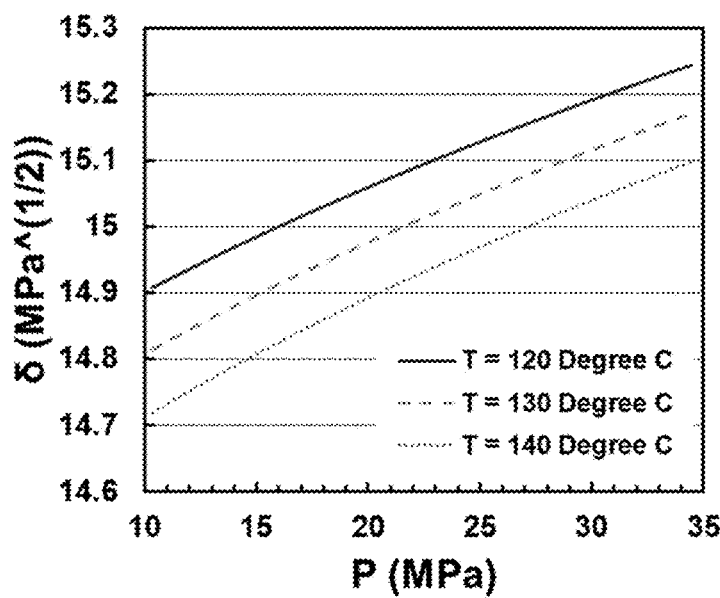
FIG. 29B is a graph illustrating the effect of pressure on Hildebrand solubility parameter of n-octane above $CO_2$ critical point.

FIGS. 29A-B are graphs illustrating the effect of temperature and pressure on Hildebrand solubility parameter of n-octane above $CO_2$ critical point. As pressure increases, $\delta_{CO2}$ increases. As temperature increases, $\delta_{CO2}$ decreases.

Figure 30A:
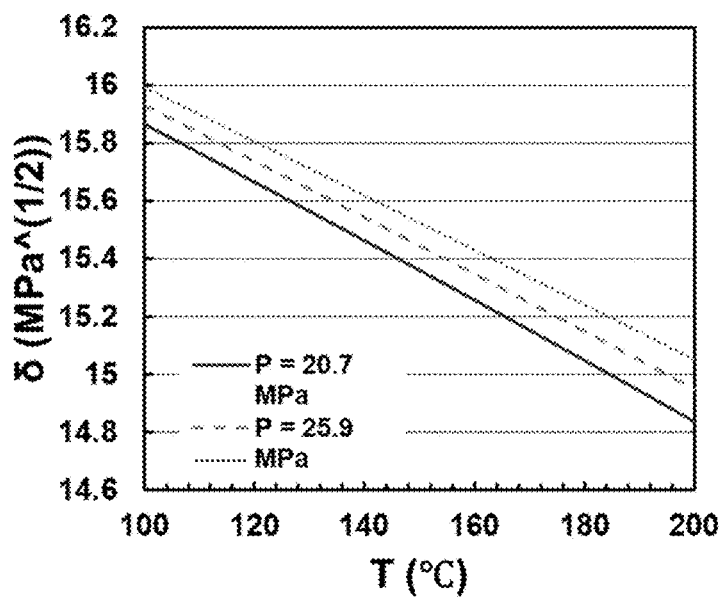
FIG. 30A is a graph illustrating the effect of temperature on Hildebrand solubility parameter of n-nonane above $CO_2$ critical point.
Figure 30B:
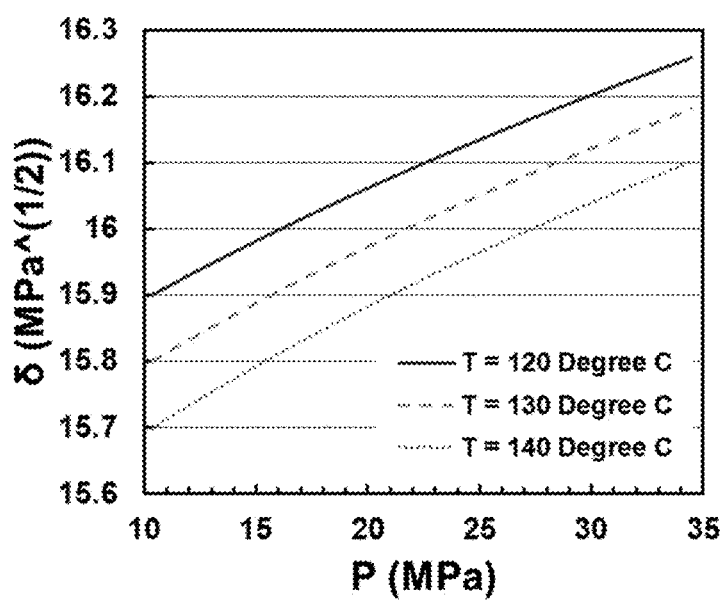
FIG. 30B is a graph illustrating the effect of pressure on Hildebrand solubility parameter of n-nonane above $CO_2$ critical point.

FIGS. 30A-B are graphs illustrating the effect of temperature and pressure on Hildebrand solubility parameter of n-nonane above $CO_2$ critical point. As pressure increases, $\delta_{CO2}$ increases. As temperature increases, $\delta_{CO2}$ decreases.

Figure 31A:
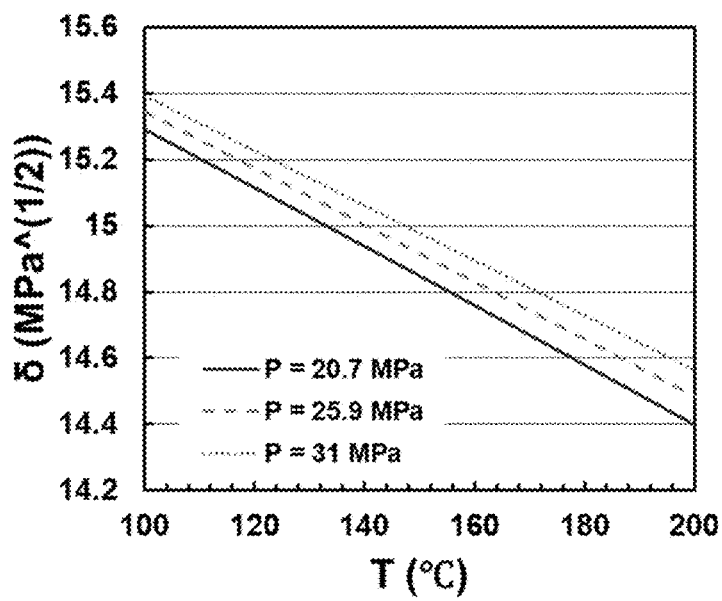
FIG. 31A is a graph illustrating the effect of temperature on Hildebrand solubility parameter of n-decane above $CO_2$ critical point.
Figure 31B:
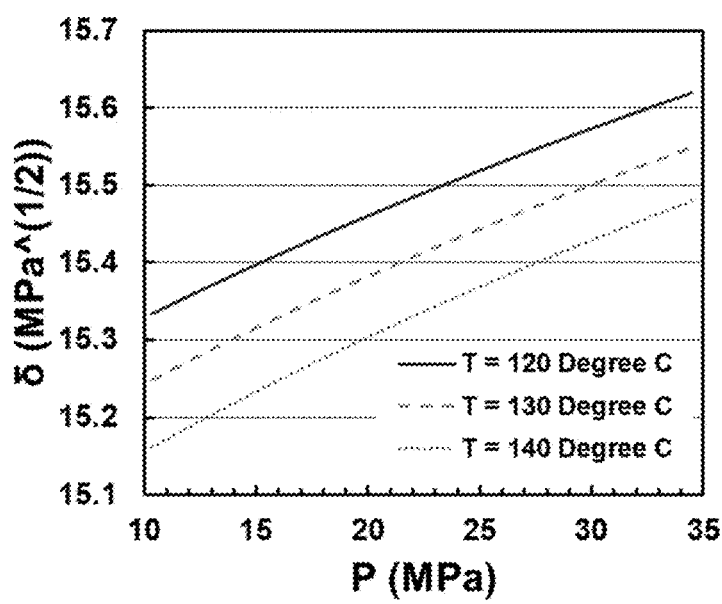
FIG. 31B is a graph illustrating the effect of pressure on Hildebrand solubility parameter of n-decane above $CO_2$ critical point.

FIGS. 31A-B are graphs illustrating the effect of temperature and pressure on Hildebrand solubility parameter of n-decane above $CO_2$ critical point. As pressure increases, $\delta_{CO2}$ increases. As temperature increases, $\delta_{CO2}$ decreases.

Figure 32A:
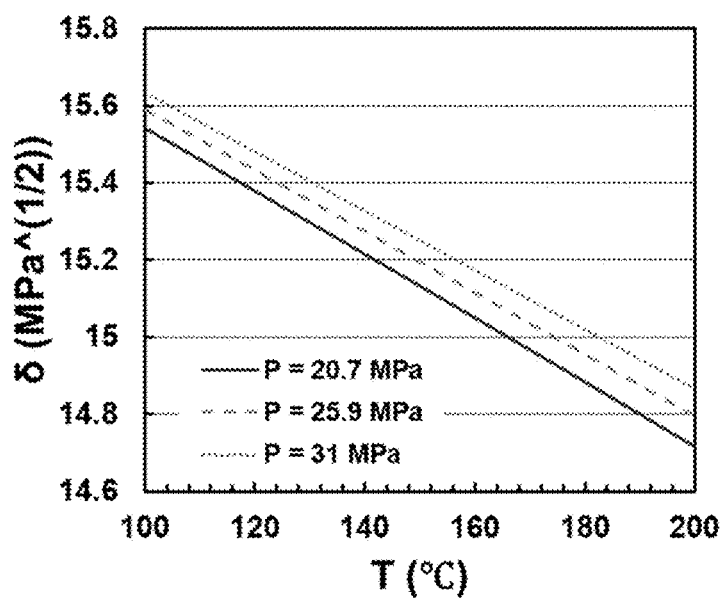
FIG. 32A is a graph illustrating the effect of temperature on Hildebrand solubility parameter of methanol above $CO_2$ critical point.
Figure 32B:
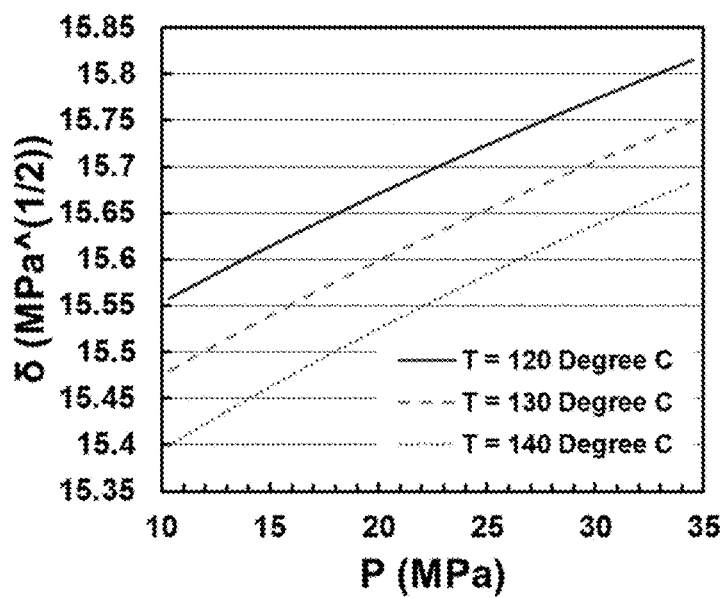
FIG. 32B is a graph illustrating the effect of pressure on Hildebrand solubility parameter of methanol above $CO_2$ critical point.

FIGS. 32A-B are graphs illustrating the effect of temperature and pressure on Hildebrand solubility parameter of methanol above $CO_2$ critical point. As pressure increases, $\delta_{CO2}$ increases. As temperature increases, $\delta_{CO2}$ decreases.

Figure 33A:
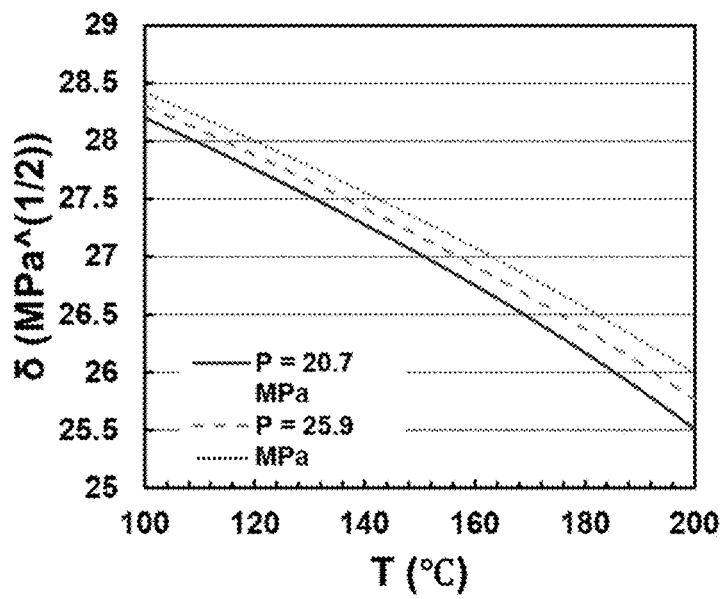
FIG. 33A is a graph illustrating the effect of temperature on Hildebrand solubility parameter of n-nonane above $CO_2$ critical point.
Figure 33B:
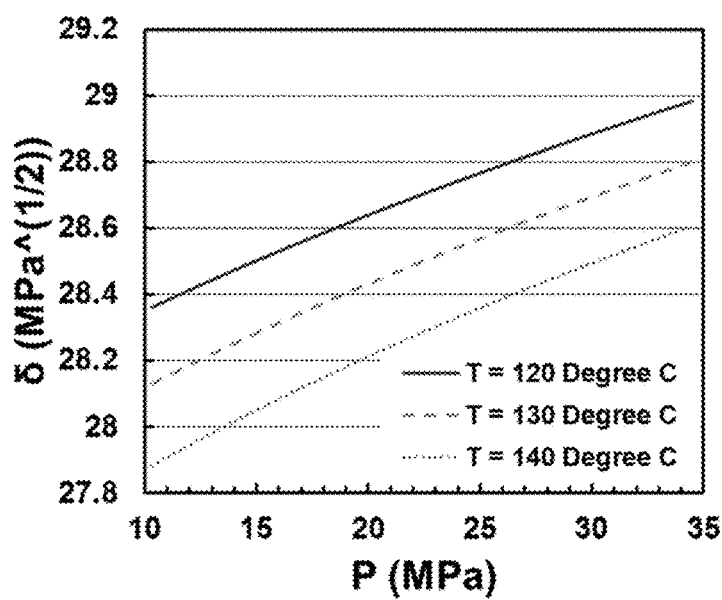
FIG. 33B is a graph illustrating the effect of pressure on Hildebrand solubility parameter of n-nonane above $CO_2$ critical point.

FIGS. 33A-B are graphs illustrating the effect of temperature and pressure on Hildebrand solubility parameter of n-nonane above $CO_2$ critical point. As pressure increases, $\delta_{CO2}$ increases. As temperature increases, $\delta_{CO2}$ decreases.

Figure 34A:
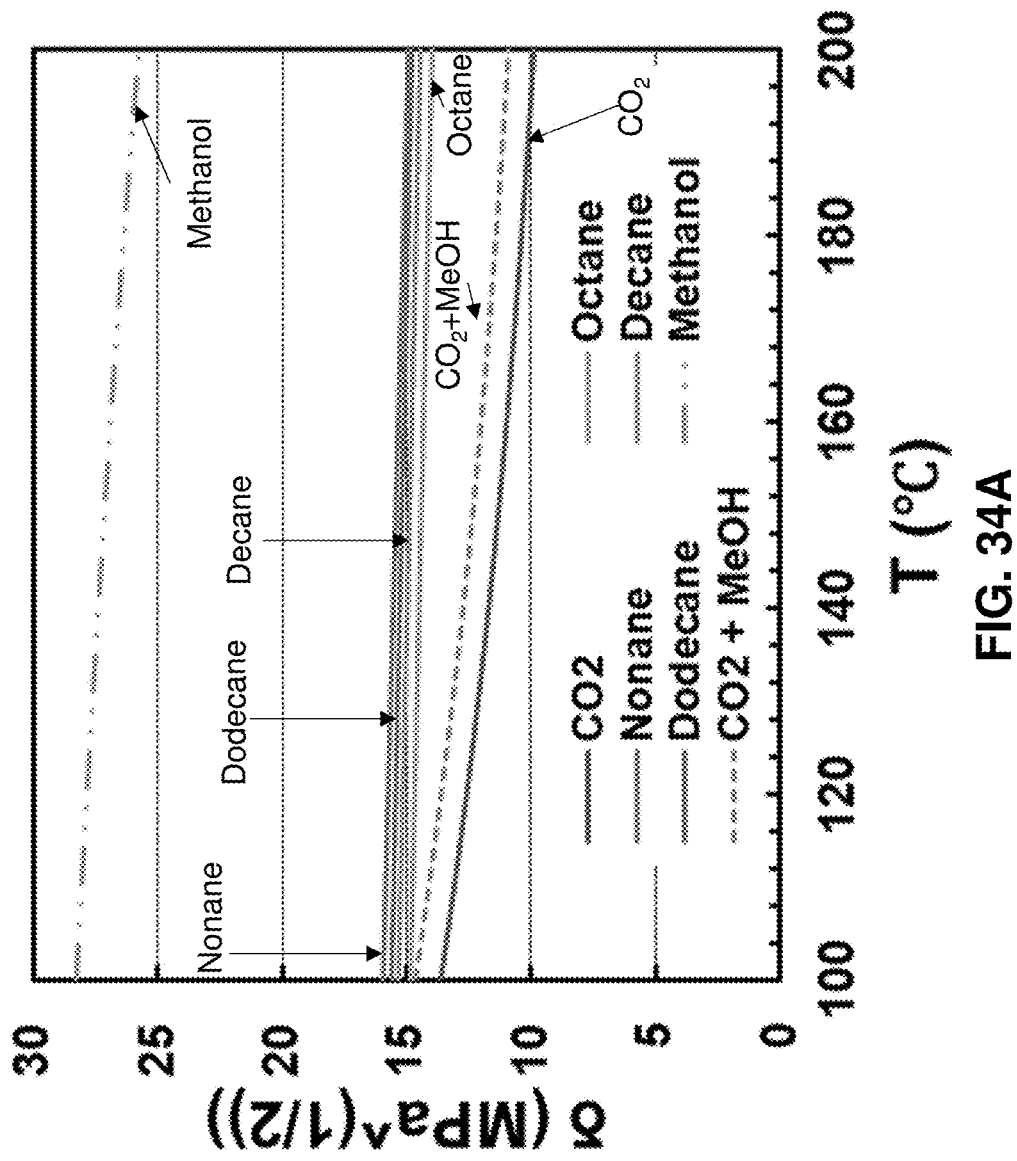
FIG. 34A is a graph illustrating the effect of temperature on Hildebrand solubility parameter of $CO_2$, n-octane, n-decane, n-dodecane, methanol, and projected $CO_2$+methanol above $CO_2$ critical point.
Figure 34B:
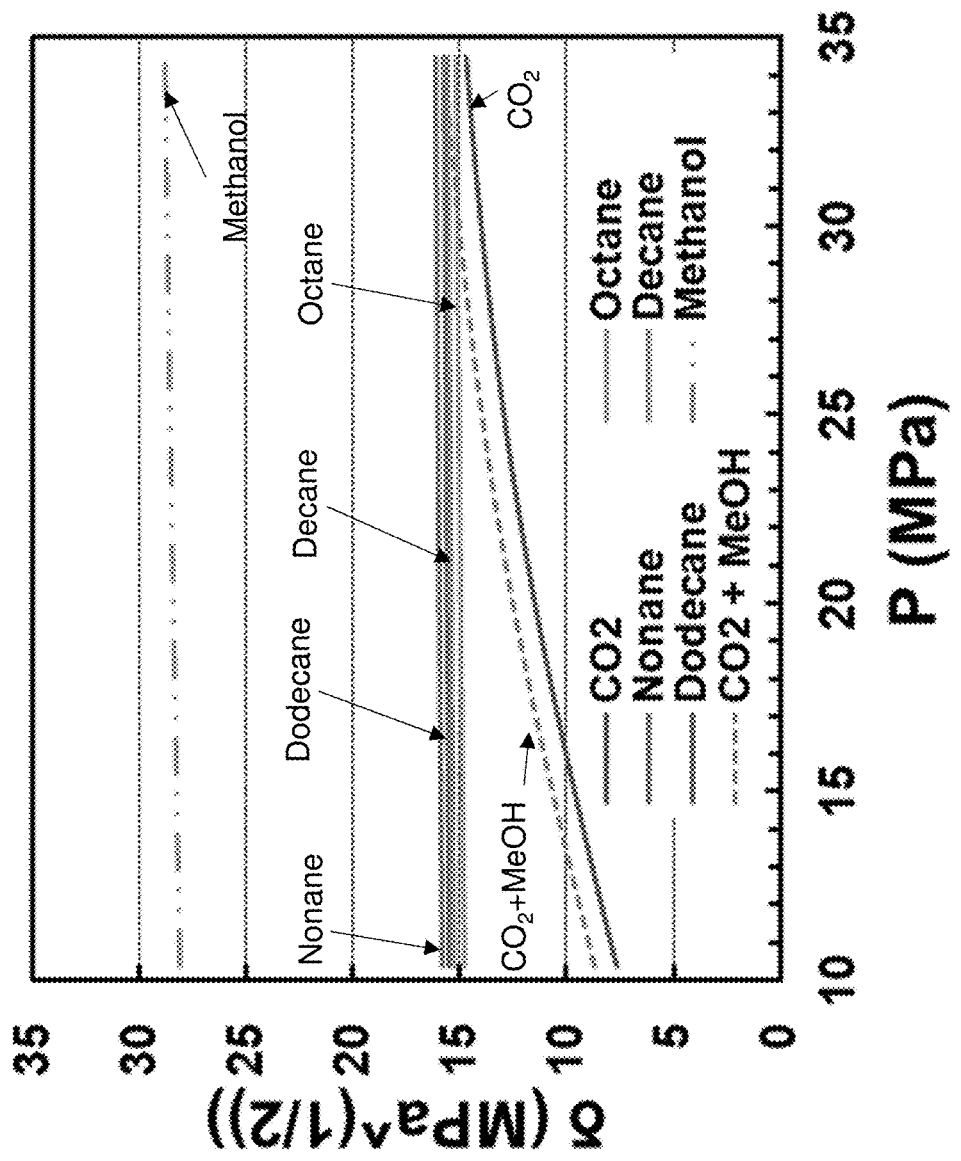
FIG. 34B is a graph illustrating the effect of pressure on Hildebrand solubility parameter of $CO_2$, n-octane, n-decane, n-dodecane, methanol, and projected $CO_2$+methanol above $CO_2$ critical point.

FIGS. 34A-B are graphs illustrating the effect of temperature and pressure on Hildebrand solubility parameter of $CO_2$, n-octane, n-decane, n-dodecane, methanol, and projected $CO_2$+methanol above $CO_2$ critical point. The $CO_2$+methanol parameter line is closer to the n-alkane solubility parameter lines indicating methanol increases n-alkane solubility in supercritical $CO_2$.

While particular elements, embodiments and applications of the present invention have been shown and described, it will be understood, that the invention is not limited thereto since modifications can be made without departing from the scope of the present disclosure, particularly in the light of the foregoing teachings.

What is claimed is:

1. A method for purifying a polymer made from depolymerization of plastic feedstock, said method comprising:
    (a) selecting a polymer for purification;
    (b) adding a solvent to said polymer in a reaction vessel;
    (c) heating said polymer and said solvent to promote dissolution of a plurality of contaminants from said polymer into said solvent;
    (d) performing an extraction technique to remove said plurality of contaminants from said polymer;
    (e) depressurizing said reaction vessel to remove said plurality of contaminants suspended in said solvent to isolate a purified polymer; and
    (f) cooling said purified polymer.

2. The method of claim 1, wherein said method is continuous or semi-continuous.

3. The method of claim 1, wherein said polymer is a polyethylene polymer.

4. The method of claim 1, wherein said polymer is a polypropylene polymer.

5. A method for purifying a polymer made from depolymerization of plastic feedstock, said method comprising:
    (a) selecting a polymer for purification;
    (b) adding an amount of supercritical $CO_2$ to said polymer in a reaction vessel;
    (c) heating said polymer and said amount of supercritical $CO_2$ to promote dissolution of a plurality of contaminants from said polymer into said amount of supercritical $CO_2$;
    (d) performing a supercritical fluid extraction to remove said plurality of contaminants from said polymer;
    (e) depressurizing said reaction vessel to remove said plurality of contaminants suspended in said amount of supercritical $CO_2$ to isolate a purified polymer; and
    (f) cooling said purified polymer.

6. The method of claim 5, further comprising:
    (g) selecting a temperature for said supercritical fluid extraction based on a plurality of properties of said polymer, wherein said temperature is higher than the melting point of said polymer.

7. The method of claim 6, further comprising:
    (h) selecting a pressure for said supercritical fluid extraction based on said plurality of properties of said polymer.

8. The method of claim 7, further comprising:
    (i) selecting a duration for said supercritical fluid extraction based on said plurality of properties of said polymer.

9. The method of claim 8, further comprising:

(j) selecting an agitation rate for said supercritical fluid extraction based on said plurality of properties of said polymer.

10. The method of claim 9, further comprising:

(k) selecting a starting volume for said solvent based on a starting weight of said polymer and said plurality of properties of said polymer.

11. The method of claim 10, further comprising:

(l) adding a co-solvent for said supercritical fluid extraction based on said plurality of properties of said polymer.

12. The method of claim 11, wherein said co-solvent is methanol.

13. The method of claim 1, wherein said plurality of contaminants comprises inorganic compounds.

14. The method of claim 1, wherein said plurality of contaminants comprises organic compounds.

15. The method of claim 1, wherein said polymer is a polystyrene polymer.

16. The method of claim 1, wherein said polymer is a wax.

17. The method of claim 1, wherein said polymer is a styrenic oligomer.

18. The method of claim 1, wherein said polymer has a molecular weight between 500-300,000 Da.

19. The method of claim 1, wherein said plurality of contaminants comprises metals.

20. The method of claim 1 wherein said fluid is a supercritical fluid.

* * * * *